(12) United States Patent
Van Drie

(10) Patent No.: US 11,482,343 B2
(45) Date of Patent: *Oct. 25, 2022

(54) SYSTEMS AND METHODS FOR IMPROVED SUSTAINMENT OF A HIGH PERFORMANCE FRC WITH MULTI-SCALED CAPTURE TYPE VACUUM PUMPING

(71) Applicant: TAE TECHNOLOGIES, INC., Foothill Ranch, CA (US)

(72) Inventor: Alan Van Drie, Orange, CA (US)

(73) Assignee: TAE TECHNOLOGIES, INC., Foothill Ranch, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,449

(22) Filed: Nov. 8, 2021

(65) Prior Publication Data
US 2022/0208398 A1 Jun. 30, 2022

Related U.S. Application Data

(63) Continuation of application No. 16/399,396, filed on Apr. 30, 2019, now Pat. No. 11,211,172, which is a
(Continued)

(51) Int. Cl.
*G21B 1/17* (2006.01)
*F04B 37/08* (2006.01)
(Continued)

(52) U.S. Cl.
CPC ............... *G21B 1/17* (2013.01); *F04B 37/08* (2013.01); *F04B 37/14* (2013.01); *G21B 1/052* (2013.01);
(Continued)

(58) Field of Classification Search
CPC . G21B 1/052; G21B 1/15; G21B 1/19; G21B 1/17; F04B 41/06; F04B 37/14;
(Continued)

(56) References Cited

U.S. PATENT DOCUMENTS

| 3,036,963 A | 5/1962 | Christofilos |
| 3,071,525 A | 1/1963 | Christofilos |

(Continued)

FOREIGN PATENT DOCUMENTS

| CN | 101320599 | 12/2008 |
| CN | 104751902 A | 7/2015 |

(Continued)

OTHER PUBLICATIONS

EP, 15854636.6 Supplementary Search Report, dated May 17, 2018.
(Continued)

*Primary Examiner* — Darlene M Ritchie
(74) *Attorney, Agent, or Firm* — One LLP

(57) ABSTRACT

Systems and methods that facilitate forming and maintaining FRCs with superior stability as well as particle, energy and flux confinement and, more particularly, systems and methods that facilitate forming and maintaining FRCs with elevated system energies and improved sustainment utilizing multi-scaled capture type vacuum pumping.

20 Claims, 34 Drawing Sheets

Related U.S. Application Data continuation of application No. PCT/US2017/060255, filed on Nov. 6, 2017.

(60) Provisional application No. 62/418,119, filed on Nov. 4, 2016.

(51) Int. Cl.

| | |
|---|---|
| *F04B 37/14* | (2006.01) |
| *G21B 1/05* | (2006.01) |
| *G21B 1/15* | (2006.01) |
| *G21B 1/19* | (2006.01) |
| *H05H 1/08* | (2006.01) |
| *H05H 1/14* | (2006.01) |
| *H05H 1/16* | (2006.01) |
| *F04B 41/06* | (2006.01) |

(52) U.S. Cl.
CPC ............. *G21B 1/15* (2013.01); *G21B 1/19* (2013.01); *H05H 1/08* (2013.01); *H05H 1/14* (2013.01); *H05H 1/16* (2013.01); *F04B 41/06* (2013.01)

(58) Field of Classification Search
CPC .......... F04B 37/08; F04B 37/04; F04B 37/12; Y02E 30/10; H05H 1/08; H05H 1/14; H05H 1/16
USPC ............... 376/107, 121, 130, 139, 140, 142; 417/48, 51
See application file for complete search history.

(56) References Cited

U.S. PATENT DOCUMENTS

| | | |
|---|---|---|
| 3,120,470 A | 2/1964 | Imhoff et al. |
| 3,132,996 A | 5/1964 | Baker et al. |
| 3,170,841 A | 2/1965 | Post |
| 3,182,213 A | 5/1965 | Rosa |
| 3,258,402 A | 6/1966 | Farnsworth |
| 3,339,106 A | 8/1967 | Redhead |
| 3,386,883 A | 6/1968 | Farnsworth |
| 3,527,977 A | 9/1970 | Ruark |
| 3,530,036 A | 9/1970 | Hirsch |
| 3,530,497 A | 9/1970 | Hirsch et al. |
| 3,577,317 A | 5/1971 | Woods |
| 3,621,310 A | 11/1971 | Takeuchi et al. |
| 3,663,362 A | 5/1972 | Stix |
| 3,664,921 A | 5/1972 | Christofilos |
| 3,668,065 A | 6/1972 | Moir |
| 3,859,164 A | 1/1975 | Nowak |
| 4,010,396 A | 3/1977 | Ress et al. |
| 4,054,846 A | 10/1977 | Smith et al. |
| 4,057,462 A | 11/1977 | Jassby et al. |
| 4,065,351 A | 12/1977 | Jassby et al. |
| 4,098,643 A | 7/1978 | Brown |
| 4,166,760 A | 9/1979 | Fowler et al. |
| 4,182,650 A | 1/1980 | Fischer |
| 4,189,346 A | 2/1980 | Jarnagin |
| 4,202,725 A | 5/1980 | Jarnagin |
| 4,233,537 A | 11/1980 | Limpaecher |
| 4,246,067 A | 1/1981 | Linlor |
| 4,267,488 A | 5/1981 | Wells |
| 4,274,919 A | 6/1981 | Jensen et al. |
| 4,303,467 A | 12/1981 | Scornavacca et al. |
| 4,314,879 A | 2/1982 | Hartman et al. |
| 4,317,057 A | 2/1982 | Bazarov et al. |
| 4,347,621 A | 8/1982 | Dow |
| 4,350,927 A | 9/1982 | Maschke |
| 4,371,808 A | 2/1983 | Urano et al. |
| 4,390,494 A | 6/1983 | Salisbury |
| 4,397,810 A | 8/1983 | Salisbury |
| 4,416,845 A | 11/1983 | Salisbury |
| 4,434,130 A | 2/1984 | Salisbury |
| 4,483,737 A | 11/1984 | Mantei |
| 4,512,721 A * | 4/1985 | Ayres .................... E21B 17/00 166/57 |
| 4,543,231 A | 9/1985 | Ohkawa |
| 4,543,465 A | 9/1985 | Sakudo et al. |
| 4,548,782 A | 10/1985 | Manheimer et al. |
| 4,560,528 A | 12/1985 | Ohkawa |
| 4,584,160 A | 4/1986 | Kageyama |
| 4,584,473 A | 4/1986 | Hashimoto et al. |
| 4,601,871 A | 7/1986 | Turner |
| 4,615,755 A | 10/1986 | Tracy et al. |
| 4,618,470 A | 10/1986 | Salisbury |
| 4,630,939 A | 12/1986 | Mayes |
| 4,639,348 A | 1/1987 | Jarnagin |
| H235 H | 3/1987 | Kugel et al. |
| 4,650,631 A | 3/1987 | Knorr |
| 4,687,616 A | 8/1987 | Moeller |
| 4,826,646 A | 5/1989 | Bussard |
| 4,853,173 A | 8/1989 | Stenbacka |
| 4,894,199 A | 1/1990 | Rostoker |
| 4,904,441 A | 2/1990 | Sorensen et al. |
| 5,015,432 A | 5/1991 | Koloc |
| 5,041,760 A | 8/1991 | Koloc |
| 5,083,445 A | 1/1992 | Saho et al. |
| 5,122,662 A | 6/1992 | Chen et al. |
| 5,160,694 A | 11/1992 | Steudtner |
| 5,160,695 A | 11/1992 | Bussard |
| 5,206,516 A | 4/1993 | Keller et al. |
| 5,207,760 A | 5/1993 | Dailey et al. |
| 5,301,511 A | 4/1994 | Bartlett et al. |
| 5,339,336 A | 8/1994 | Sudan |
| 5,355,399 A | 10/1994 | Golovanivsky et al. |
| 5,420,425 A | 5/1995 | Bier et al. |
| 5,422,481 A | 6/1995 | Louvet |
| 5,473,165 A | 12/1995 | Stinnett et al. |
| 5,483,077 A | 1/1996 | Glavish |
| 5,502,354 A | 3/1996 | Correa et al. |
| 5,537,005 A | 7/1996 | Goebel et al. |
| 5,557,172 A | 9/1996 | Tanaka |
| 5,656,519 A | 8/1997 | Mogami |
| 5,677,597 A | 10/1997 | Tanaka |
| 5,747,800 A | 5/1998 | Yano et al. |
| 5,764,715 A | 6/1998 | Maenchen et al. |
| 5,811,201 A | 9/1998 | Skowronski |
| 5,846,329 A | 12/1998 | Hori et al. |
| 5,848,110 A | 12/1998 | Maenchen et al. |
| 5,923,716 A | 7/1999 | Meacham |
| 6,000,360 A | 12/1999 | Koshimizu |
| 6,084,356 A | 7/2000 | Seki et al. |
| 6,245,190 B1 | 6/2001 | Masuda et al. |
| 6,248,251 B1 | 6/2001 | Sill |
| 6,255,648 B1 | 7/2001 | Littlejohn et al. |
| 6,271,529 B1 | 8/2001 | Farley et al. |
| 6,322,706 B1 | 11/2001 | Ohkawa |
| 6,330,801 B1 | 12/2001 | Whelan et al. |
| 6,335,535 B1 | 1/2002 | Miyake et al. |
| 6,345,537 B1 | 2/2002 | Salamitou |
| 6,390,019 B1 | 5/2002 | Grimbergen et al. |
| 6,396,213 B1 | 5/2002 | Koloc |
| 6,408,052 B1 | 6/2002 | McGeoch |
| 6,452,168 B1 | 9/2002 | McLuckey et al. |
| 6,477,216 B2 | 11/2002 | Koloc |
| 6,488,807 B1 | 12/2002 | Collins et al. |
| 6,593,539 B1 | 7/2003 | Miley et al. |
| 6,593,570 B2 | 7/2003 | Li et al. |
| 6,611,106 B2 | 8/2003 | Monkhorst et al. |
| 6,628,740 B2 | 9/2003 | Monkhorst et al. |
| 6,632,324 B2 | 10/2003 | Chan |
| 6,664,740 B2 | 12/2003 | Rostoker et al. |
| 6,712,927 B1 | 3/2004 | Grimbergen et al. |
| 6,755,086 B2 | 6/2004 | Salamitou et al. |
| 6,850,011 B2 | 2/2005 | Monkhorst et al. |
| 6,852,942 B2 | 2/2005 | Monkhorst et al. |
| 6,888,907 B2 | 5/2005 | Monkhorst et al. |
| 6,891,911 B2 | 5/2005 | Rostoker et al. |
| 6,894,446 B2 | 5/2005 | Monkhorst et al. |
| 6,911,649 B2 | 6/2005 | Hess et al. |
| 6,923,625 B2 * | 8/2005 | Sparks .................... B32B 9/00 417/51 |
| 6,995,515 B2 | 2/2006 | Rostoker et al. |

(56) References Cited

U.S. PATENT DOCUMENTS

| | | |
|---|---|---|
| 7,002,148 B2 | 2/2006 | Monkhorst et al. |
| 7,015,646 B2 | 3/2006 | Rostoker et al. |
| 7,026,763 B2 | 4/2006 | Rostoker et al. |
| 7,115,887 B1 | 10/2006 | Hassanein et al. |
| 7,119,491 B2 | 10/2006 | Rostoker et al. |
| 7,126,284 B2 | 10/2006 | Rostoker et al. |
| 7,129,656 B2 | 10/2006 | Rostoker et al. |
| 7,180,242 B2 | 2/2007 | Rostoker et al. |
| 7,232,985 B2 | 6/2007 | Monkhorst et al. |
| 7,391,160 B2 | 6/2008 | Monkhorst et al. |
| 7,439,678 B2 | 10/2008 | Rostoker et al. |
| 7,459,654 B2 | 12/2008 | Monkhorst et al. |
| 7,477,718 B2 | 1/2009 | Rostoker et al. |
| 7,569,995 B2 | 8/2009 | Rostoker et al. |
| 7,613,271 B2 | 11/2009 | Rostoker et al. |
| 7,719,199 B2 | 5/2010 | Monkhorst et al. |
| 8,031,824 B2 | 10/2011 | Bystriskii et al. |
| 8,193,738 B2 | 6/2012 | Chu et al. |
| 8,461,762 B2 | 6/2013 | Rostoker et al. |
| 8,537,958 B2 | 9/2013 | Laberge et al. |
| 8,587,215 B2 | 11/2013 | Roberts et al. |
| 9,060,401 B2 | 6/2015 | Shteynberg et al. |
| 9,078,327 B2 | 7/2015 | Livschitz et al. |
| 9,265,137 B2 | 2/2016 | Rostoker et al. |
| 9,370,086 B2 | 6/2016 | Rostoker et al. |
| 9,386,676 B2 | 7/2016 | Rostoker et al. |
| 9,408,269 B2 | 8/2016 | Zhu et al. |
| 9,426,856 B2 | 8/2016 | Shteynberg et al. |
| 9,474,122 B2 | 10/2016 | Kahlman et al. |
| 9,510,414 B2 | 11/2016 | Kim et al. |
| 9,538,591 B2 | 1/2017 | Kim |
| 9,538,595 B2 | 1/2017 | Chang et al. |
| 9,585,222 B2 | 2/2017 | Zhu et al. |
| 9,591,740 B2 | 3/2017 | Belchenko et al. |
| 9,672,943 B2 | 6/2017 | Rostoker et al. |
| 9,750,107 B2 | 8/2017 | Zhu et al. |
| 9,997,261 B2 | 6/2018 | Tuszewski et al. |
| 10,004,121 B2 | 6/2018 | Eum et al. |
| 10,049,774 B2 | 8/2018 | Tuszewski et al. |
| 2001/0006093 A1 | 7/2001 | Tabuchi et al. |
| 2003/0197129 A1 | 10/2003 | Murrell et al. |
| 2003/0230240 A1 | 12/2003 | Rostoker et al. |
| 2003/0230241 A1 | 12/2003 | Rostoker et al. |
| 2004/0213368 A1 | 10/2004 | Rostoker et al. |
| 2006/0064990 A1 | 3/2006 | Bartlett et al. |
| 2006/0198485 A1 | 9/2006 | Binderbauer |
| 2006/0267504 A1 | 11/2006 | Van Drie et al. |
| 2008/0226011 A1 | 9/2008 | Barnes |
| 2009/0079357 A1 | 3/2009 | Shteynberg et al. |
| 2011/0026657 A1 | 2/2011 | Laberge et al. |
| 2011/0142185 A1 | 6/2011 | Woodruff |
| 2011/0204820 A1 | 8/2011 | Tikkanen et al. |
| 2013/0249431 A1 | 9/2013 | Shteynberg et al. |
| 2013/0307431 A1 | 11/2013 | Zhu et al. |
| 2014/0139109 A1 | 5/2014 | Morales |
| 2014/0239833 A1 | 8/2014 | McCune, Jr. |
| 2014/0346973 A1 | 11/2014 | Zhu et al. |
| 2015/0187443 A1 | 7/2015 | Tuszewski et al. |
| 2015/0245461 A1 | 8/2015 | Belchenko et al. |
| 2015/0294742 A1 | 10/2015 | Cohen |
| 2016/0098058 A1 | 4/2016 | Morehouse et al. |
| 2016/0276044 A1 | 9/2016 | Tuszewski et al. |
| 2016/0338163 A1 | 11/2016 | Zhu et al. |
| 2017/0135194 A1 | 5/2017 | Belchenko et al. |
| 2017/0236599 A1 | 8/2017 | Bystriskii et al. |
| 2017/0311409 A1 | 10/2017 | Zhu et al. |
| 2017/0359880 A1 | 12/2017 | Zhu et al. |
| 2017/0359886 A1 | 12/2017 | Binderbauer et al. |
| 2018/0195501 A1* | 7/2018 | Watanabe ........... H01J 7/18 |
| 2019/0035509 A1 | 1/2019 | Tuszewski et al. |
| 2019/0101110 A1* | 4/2019 | Anantharaman ....... F04B 37/08 |

FOREIGN PATENT DOCUMENTS

| | | |
|---|---|---|
| EP | 2389048 A2 | 11/2011 |
| FR | 2 270 733 A1 | 12/1975 |
| GB | 1 387 098 A | 3/1975 |
| RU | 2 056 649 C1 | 3/1996 |
| WO | WO 02/062112 A2 | 8/2002 |
| WO | WO 2006/096772 A2 | 9/2006 |
| WO | WO 2014/114986 A1 | 7/2014 |
| WO | WO 2016/070126 A1 | 5/2016 |
| WO | WO 2017/083796 A1 | 5/2017 |

OTHER PUBLICATIONS

EP, 16865181.8 Extended Search Report, dated Oct. 15, 2018.
EP, 17867631.8 Supplementary Search Report, dated Apr. 15, 2020.
IN, 201917017259 First Examination Report, dated Mar. 16, 2021.
SG, 11201903447W Written Opinion, dated May 13, 2020.
WO, PCT/US2016/061730 ISR and Written Opinion, dated Mar. 9, 2017.
WO, PCT/US2017/060255 ISR and Written Opinion, dated Jan. 12, 2018.
Anderson, M., et al., "Plasma and Ion Beam Injection into an FRC", Plasma Physics Reports, 2005, vol. 31, No. 10, pp. 809-817.
Arsenin, V.V., et al., "Suppression of plasma instabilities by the feedback method", Soviet Physics Uspekhi, 1977, vol. 20, No. 9, pp. 736-745.
Artsimovich, L.A., "Controlled Thermonuclear Reactions", English Edition, 1964, Gordon and Breach, Science Publishers, Inc., New York, pp. 1-9.
Asai, T., et al., "End Loss Measurement of Neutral-Beam-Injected Field-Reversed Configuration Plasma", J. Plasma Fusion Res. Series, vol. 5, 2002, pp. 220-224.
Avanzini, P.G., "Feasibility of Fusion Power Generation by Accelerated Ion Beams", ICENES, Jun. 30-Jul. 4, 1986, Geneva, Italy, pp. 305-309.
Becker, H.W., et al., "Low-Energy Cross Sections for $^{11}B(p,3\alpha)$", Z. Physics A—Atomic Nuclei, 1987, vol. 217, No. 3, pp. 341-355.
Binderbauer, M.W., et al., "Turbulent transport in magnetic confinement: how to avoid it", Journal of Plasma Physics, 1996, vol. 56, No. 3, pp. 451-465.
Binderbauer, M.W., et al., "Dynamic Formation of a Hot Field Reversed Configuration with Improved Confinement by Supersonic Merging of Two Colliding High-β Compact Toroids", Phys. Rev. Lett., 2010, vol. 105, No. 4, pp. 045003-1-045003-4.
Bohm, D., "Quantum Theory", 1951, Dover Publications, Inc., New York, Chapter 12—Applications to Simple Systems, The Classical Limit and the WKB Approximation, pp. 277-283.
Bystritskii, V., et al., "Generation and Transport of a Low-Energy Intense Ion Beam", IEEE Transactions on Plasma Science, 2004, vol. 32, No. 5, pp. 1986-1992.
Bystritskii, V., et al., "Study of Dense FRCs Formation and Their Transport With Multistage Compression", IEEE 2013 IEEE Pulsed Power and Plasma Science Conference (PPPS 2013)—San Francisco, CA, USA, Jun. 2013, 1 page.
Carlson, A., "Re: Boron/Proton colliding beam reactor?", 1997, retrieved from http://groups.google.com/groups?q=rostok...opuo.fsf%40s4awc.aug.ipp-garching.mpg.de, pp. 1-3.
Carlson, A., "Fundamental Limitations on Plasma Fusion Systems Not in Thermodynamic Equilibrium", 1997, retrieved from http://www.ipp.mpg.de/~Arthur.Carlson/rider.html, pp. 1-3.
Carlson, A., "Annotated Bibliography of p-B11 Fusion", 1998, retrieved from http://www.ipp.mpg.de/~Arthur.carlson/p-B11-bib.html, pp. 1-4.
Carlson, A., "Home Page of Dr. A. Carlson", 2000, retrieved from http://www/rzg/mpg.de/~awc/home.html, pp. 1-2.
Carlson, A., "Re: Lithium Fission—why not?," 2000, retrieved from http://groups.google.com/groups?q=rostok...v35u.fsi%40suawc.aug.ipp-garching.mpg.de, pp. 1-2.
Chao, A.W., et al., Handbook of Accelerator Physics and Engineering, 2nd Printing, 1998, World Scientific, Chapter 2, pp. 53, 119-120.

(56) References Cited

OTHER PUBLICATIONS

Cohen, S.A., et al., "Formation of Collisionless High-β Plasmas by Odd-Parity Rotating Magnetic Fields", Physical Review Letters, vol. 98, 2007, pp. 125002-1-145002-4.
Cohen, S.A., et al., "RMFo-Formed Collisionless High-β Plasmas: Yesterday, Today and Tomorrow", AIP Conference Proceedings, vol. 1154, 2009, pp. 165-166.
Cox, JR., L/T., et al., "Thermonuclear Reaction Listing With Cross-Section Data for Four Advanced Reactions", Fusion Technology, 1990, vol. 18, No. 2, pp. 325-339.
Davis, H.A., et al., "Generation of Field-Reversing E Layers with Millisecond Lifetimes", Physical Review Letters, 1976, vol. 37, No. 9, pp. 542-545.
Dawson, J.M., "Advanced Fuels for CTR", Four Workshops in Alternate Concepts in Controlled Fusion, EPRI ER-429-SR, Special Report, Part B: Extended Summaries, 1977, pp. 143-147.
Dawson, J.M., "Alternate Concepts in Controlled Fusion", EPRI ER-429-SR, Special Report, Part C: CTR Using the p-$^{11}$B Reaction, 1977, pp. ii-30.
Day, C., "Basics and applications of cryopumps", 2007, retrieved from https://cds.cern.ch/record/1047069/files/p241.pdf, pp. 241-274.
Dobrott, D., "Alternate Fuels in Fusion Reactors", Nuclear Technology/Fusion, 1983, vol. 4, pp. 339-347.
Dolan, T.J, "Fusion Research", 1982, vol. II—Experiments, Pergamon Press, New York, pp. 277-309.
Feldbacher, R., et al., "Basic Cross Section Data for Aneutronic Reactor", Nuclear Instruments and Methods in Physics Research A271, 1988, pp. 55-64.
Finn, J.M., et al., "Field-Reversed Configurations With a Component of Energetic Particles", Nuclear Fusion, 1982, vol. 22, No. 11, pp. 1443-1518.
Goldston, R.J., et al., "Fusion Alternatives", Science, 1997, vol. 278, No. 5346, pp. 2031-2037.
Gota, H., et al., A Well-Confined Field-Reversed Configuration Plasma Formed by Dynamic Merging of Two Colliding Compact Toroids in C-2, ICC and CT Workshops, Aug. 16, 2011, retrieved from http://www.iccworkshops.org/icc2011/uploads/241/icc2011_gota_talk_8_16_11.pdf, pp. 1-19.
Gota, H., et al., "Overview of C-2U Field-Reversed Configuration Experiments", Exploratory Plasma and Fusion Science Research Workshop, Auburn, Alabama, Feb. 25, 2016, retrieved from http://www.iccworkshops.org/epr2016/uploads/455/epr2016_hgota_2_25_16.pdf on Apr. 25, 2019, pp. 1-31.
Guo, H. Y., et al., "Flux Conversion and Evidence of Relaxation in a High-β Plasma Formed by High-Speed Injection into a Mirror Confinement Structure", Phys. Rev. Lett., 2004, vol. 92, No. 24, pp. 245001-1-245001-4.
Guo, H. Y., et al., "Formation of a long-lived hot field reversed configuration by dynamically merging two colliding high-β compact toroids", Physics of Plasmas, 2011, vol. 18, pp. 056110-1-056110-10.
Heidbrink, W.W., et al., "Comparison of Experimental and Theoretical Fast Ion Slowing-Down Times in DIII-D", Nuclear Fusion, 1988, vol. 28, No. 1, pp. 1897-1901.
Heidbrink, W.W., "Measurements of classical deceleration of beam ions in the DIII-D tokamak", Phys. Fluids B. 1990, vol. 2, No. 1, pp. 4-5.
Heidbrink, W.W., et al., "The diffusion of fast ions in Ohmic TFTR discharges", Phys. Fluids B, 1991, vol. 3, No. 11, pp. 3167-3170.
Heidbrink, W.W., et al., "The Behaviour of Fast Ions in Tokamak Experiments", Nuclear Fusion, 1994, vol. 34, No. 4, pp. 535-618.
Himura, H., et al., "Rethermalization of a field-reversed configuration plasma in translation experiments", Phys. Plasmas, 1995, vol. 2, No. 1, pp. 191-197.
Hoffman, A.L., et al., "Field Reversed Configuration Lifetime Scaling Based on Measurements From the Large s Experiment", Nucl. Fusion, 1993, vol. 33, No. 1, pp. 27-38.
Iwanenko, D., et al., "On the Maximal Energy Attainable in a Betatron", Physical Review, 1944, vol. 65, Nos. 11 and 12, p. 343.
Jeffries, C.D., "A Direct Determination of the Magnetic Moment of the Protons in Units of the Nuclear Magneton", Physical Review, 1951, vol. 81, No. 6, pp. 1040-1055.
Jones, I. R., "A review of rotating magnetic field current drive and the operation of the rotamak as a field-reversed configuration (Rotamak-FRC) and a spherical tokamak (Rotamak-ST)", Physics of Plasmas, 1999, vol. 6, No. 5, pp. 1950-1957.
Kalinowsky, H., "Deceleration of antiprotons from MeV to keV energies", Hyperfine Interactions, 1993, vol. 76, pp. 73-80.
Lampe, M., et al., "Comments on the Colliding Beam Fusion Reactor Proposed by Rostoker, Binderbauer and Monkhorst for Use with the p-$^{11}$B Fusion Reaction", Naval Research Lab., Plasma Physics Division, Oct. 30, 1998, pp. 1-37.
"Laval nozzle", 1992, Academic Press Dictionary of Science and Technology, retrieved from http://www.credoreference.com/entry/3122475/.
Lawson, J.D., "Some Criteria for a Power Producing Thermonuclear Reactor", Proc. Phys. Soc. B70, 1957, pp. 6-10.
Lifschitz, A.F., et al., "Calculations of tangential neutral beam injection current drive efficiency for present moderate flux FRCs", Nucl. Fusion, 2004, vol. 44, pp. 1015-1026.
Majeski, R., et al., "Enhanced Energy Confinement and Performance in a Low-Recycling Tokamak", Physical Review Letters, 2006, vol. 97, pp. 075002-1-075002-4.
Matsumoto, T., et al., "Development of Compact Toroid Injector for C-2 FRCs", retrieved from https://tae.com/development-of-compact-toroid-injector-for-c-2-frcs/ on Jun. 12, 2018, 1 page.
Miley, G.H., et al., "A possible route to small, flexible fusion units", Energy, 1979, vol. 4, pp. 163-170.
Miley, G.H., et al., "On design and development issues for the FRC and related alternate confinement concepts", Fusion Engineering and Design, 2000, vol. 48, pp. 327-337.
Naitou, H., et al., "Kinetic Effects on the Convective Plasma Diffusion and the Heat Transport", Journal of the Physical Society of Japan, 1979, vol. 46, No. 1, pp. 258-264.
Nevins, W.M., "Feasibility of a Colliding Beam Fusion Reactor", Science, 1998, vol. 281, No. 5375, p. 307.
Okada, S., et al., "Experiments on additional heating of FRC plasmas", Nucl. Fusion, 2001, vol. 41, No. 5, pp. 625-629.
Ono, Y., et al., "New relaxation of merging spheromaks to a field reversed configuration", Nucl. Fusion, 1999, vol. 39, No. 11Y, pp. 2001-2008.
Phelps, D.A., et al., "Observations of the stable equilibrium and classical diffusion of field reversing relativistic electron coils", The Physics of Fluids, 1974, vol. 17, No. 12, pp. 2226-2235.
"Summary", Plasma Science—Advancing Knowledge in the National Interest, National Research Counsel of the National Academies, 2007, The National Academies Press, Washington, D.C., pp. 1-5.
Post, R.F., "Nuclear Fusion", McGraw-Hill Encyclopedia of Science & Technology, 6$^{th}$ Edition, 1987, pp. 142-153.
Raman, R., "Fuelling Requirements for Advanced Tokamak operation", 32$_{nd}$ EPS Conference on Plasma Phys. Tarragona, 2005, pp. 1-4.
Rider, T.H., "A general critique of inertial-electrostatic confinement fusion systems", Physics Plasmas, 1995, vol. 2, No. 6, pp. 1853-1872.
Rider, T.H., "Fundamental limitations on plasma fusion systems not in thermodynamic equilibrium", Physics Plasmas, 1997, vol. 4, No. 4, pp. 1039-1046.
Robinson, JR., C.A., "Army Pushes New Weapons Effort", Aviation Week & Space Technology, 1978, vol. 109, pp. 42-53.
Rosenbluth, M.N., et al., "Fokker-Planck Equation for an Inverse-Square Force", The Physical Review, 1957, vol. 107, No. 1, pp. 1-6.
Rostoker, N., "Large Orbit Magnetic Confinement Systems for Advanced Fusion Fuels", Final Technical Report, U.S. Dept. of Commerce, National Technical Information Service, Apr. 1, 1990-Feb. 29, 1992, pp. i-80.
Rostoker, N., et al., "Self-Colliding Systems for Aneutronic Fusion", Comments on Plasma Physics and Controlled Fusion, 1992, vol. 15, No. 2, pp. 105-120.

(56) References Cited

OTHER PUBLICATIONS

Rostoker, N., et al., "Large Orbit Confinement for Aneutronic Systems", Non-Linear and Relativistic Effects in Plasmids, editor V. Stefan, 1992, American Institute of Physics, New York, pp. 116-135.
Rostoker, N., et al., "Magnetic Fusion with High Energy Self-Colliding Ion Beams", Physical Review Letters, 1993, vol. 70, No. 12, pp. 1818-1821.
Rostoker, N., et al., "Self-Colliding Beams as an Alternative Fusion System", 10th International Conference on High Power Particle Beams, San Diego, CA, Jun. 20-24, 1994, pp. 195-201.
Rostoker, N., et al., "Classical Scattering in a High Beta Self-Collider/FRC", AIP Conference Proceedings 311, 1994, Physics of High Energy Particles in Toroidal Systems, Irvine, CA 1993, pp. 168-185.
Rostoker, N., et al., "Self-Colliding Beams as an Alternative Fusion System for D-He$^3$ Reactors", Current Trends in International Fusion Research, edited by Panarella, Plenum Press, New York, 1997, Chapter 4, pp. 33-41.
Rostoker, N., et al., "Alternative Fusion Concepts", Current Trends in International Fusion Research, edited by Panarella, Plenum Press, New York, 1997, Chapter 32, pp. 489-495.
Rostoker, N., et al., "Fusion Reactors Based on Colliding Beams in a Field Reversed Configuration Plasma", Comments on Plasma Physics and Controlled Fusion, 1997, vol. 18, No. 1, pp. 11-23.
Rostoker, N., "Colliding Beam Fusion Reactor", 12th International Conference on High-Power Particle Beams, Proceedings—vol. 1, Jun. 7-12, 1997, Haifa, Israel.
Rostoker, N., et al., "Colliding Beam Fusion Reactor", Science, 1997, vol. 278, No. 5342, pp. 1419-1422.
Rostoker, N., "Advanced Fusion Energy and Future Energy Mix Scenarios", Abstracts with Programs, 1999 Annual Meeting & Exposition, Oct. 25-28, 1999, Denver, CO.
Ruggiero, A.G., "Proton-Boron Colliding Beams for Nuclear Fusion", Proceedings of ICONE 8, 8th International Conference on Nuclear Engineering, Apr. 2-6, 2000, Baltimore, MD, pp. 1-11.
Shishlov, A.V., et al., "Long time implosion experiments with double gas puffs", Physics of Plasmas, 2000, vol. 7, No. 4, pp. 1252-1262.
Slough, J.T., et al., "Confinement and Stability of Plasmas in a Field-Reversed Configuration", Physical Review Letters, 1992, vol. 69, No. 15, pp. 2212-2215.
Slough, J.T., et al., "Enhanced Confinement and Stability of a Field-Reversed Configuration with Rotating Magnetic Field Current Drive", Physical Review Letters, 2000, vol. 85, No. 7. pp. 1444-1447.
Smirnov, A., et al., "Neutral Beam Dump Utilizing Cathodic Arc Titanium Evaporation", Fusion Science and Technology, vol. 59, No. 1, 2010, pp. 271-273.
Smirnov, A., et al., "Neutral beam dump with cathodic arc titanium gettering", Rev. Sci. Instr., 2011, vol. 82, pp. 033509-1-033509-6.
Song, Y., et al., "Electron trapping and acceleration in a modified elongated betatron", Phys. Fluids B, 1992, vol. 4, No. 11, pp. 3771-3780.
Speth, E., et al., "Overview of RF Source Development at IPP", CCNB-Meeting at Padua, Jun. 5-6, 2003, pp. 1-29.
Steinhauer, L.C., et al., "FRC 2001: A White Paper on FRC Development in the Next Five Years", Fusion Technology, 1996, vol. 30, No. 1, pp. 116-127.
Tandem Energy Corporation Presentation, Dec. 12, 1997, Washington, D.C., pp. 1-47.
Tomita, Y., et al., "Direct Energy Conversion System for D-$^3$He Fusion", 7th International Conference on Emerging Nuclear Energy Systems, ICENES '93, 1994, pp. 522.526.
Tuszewski, M., "Field Reversed Configurations", Nuclear Fusion, 1988, vol. 28, No. 11, pp. 2033-2092.
Tuszewski, M., "Status of the Field-Reversed Configuration as an Alternate Confinement Concept", Fusion Technology, 1989, vol. 15, No. 11, pp. 1148-1153.
Tuszewski, M., et al. "Combined FRC and mirror plasma studies in the C-2 device", Fusion Science and Technology, 2011, vol. 59, No. 1, pp. 23-26.
Van Drie, A., "Session VT-TuM-4 Multi Scaled Titanium Gettered Surfaces for Enhance Pumping of $H_2$", Abstracts of the AVS 63$^{rd}$ International Symposium & Exhibition, 2016, retrieved from https://www.avssymposium.org/AVS2016/Sessions/Overview/28703, p. 2.
Vinyar, I., et al., "Pellett Injectors Developed at PELIN for JET, TAE, and HL-2A", Fusion Engineering and Design, 2011, vol. 86, pp. 2208-2211.
Watanabe, T., et al., "Computation of Neutral Gas Flow Generation From a CT Neutralization Fuel-Injector", Plasma and Fusion Research: Regular Articles, 2012, vol. 7, pp. 2405042-1-2405042-4.
Ware, A.A., et al., "Electrostatic Plugging of Open-Ended Magnetic Containment Systems", Nuclear Fusion, 1969, vol. 9, No. 4, pp. 353-361.
Weaver, T., et al., "Exotic CTR Fuels for Direct Conversion-Utilizing Fusion Reactors", Talk before the AEC CTR Staff, Mar. 16, 1973, AEC/Germantown.
Weaver, T., et al., "Fusion Microexplosions, Exotic Fusion Fuels, Direct Conversion: Advanced Technology Options for CTR", Annual Meeting of the Committee on Advance Development and the Fusion Task Force of the Edison Electric Institute, Apr. 27, 1973, Los Alamos Scientific Laboratory, CA.
Weaver, T., et al., "Exotic CTR Fuels: Non-Thermal Effects and Laser Fusion Applications", 1973 Annual Meeting of the American Physical Society Division of Plasma Physics, Oct. 31-Nov. 3, 1973, Philadelphia, PA, pp. 1-12.
"Welcome to Colliding Beam Fusion", retrieved from http://fusion.ps.uci.edu/beam/introb.html on Oct. 11, 2000, pp. 1-3.
Wells, D. R., "Injection and Trapping of Plasma Vortex Structures", Phys. Fluids, 1966, vol. 9, No. 5, pp. 1010-1021.
Wessel, F.J., et al., "D-T Beam Fusion Reactor", Journal of Fusion Energy, 1998, vol. 17, No. 3, pp. 209-211.
Wessel, F.J., et al., "Colliding Beam Fusion Reactor Space Propulsion System", AIP Conference Proceedings 504, 2000, pp. 1425-1430.
"A White Paper on FRC Development", Apr. 1998, retrieved from http://depts.washington.edu/rppl/programs/wpr98.pdf, pp. 1-26.
Wong, H.V., et al., "Stability of annular equilibrium of energetic large orbit ion beam", Phys. Fluids B, 1991, vol. 3, No. 11, pp. 2973-2986.
Zweben, S.J., et al., "Radial Diffusion Coefficient for Counter-Passing MeV Ions in the TFTR Tokamak", Nuclear Fusion, 1991, vol. 31, No. 12, pp. 2219-2245.

* cited by examiner

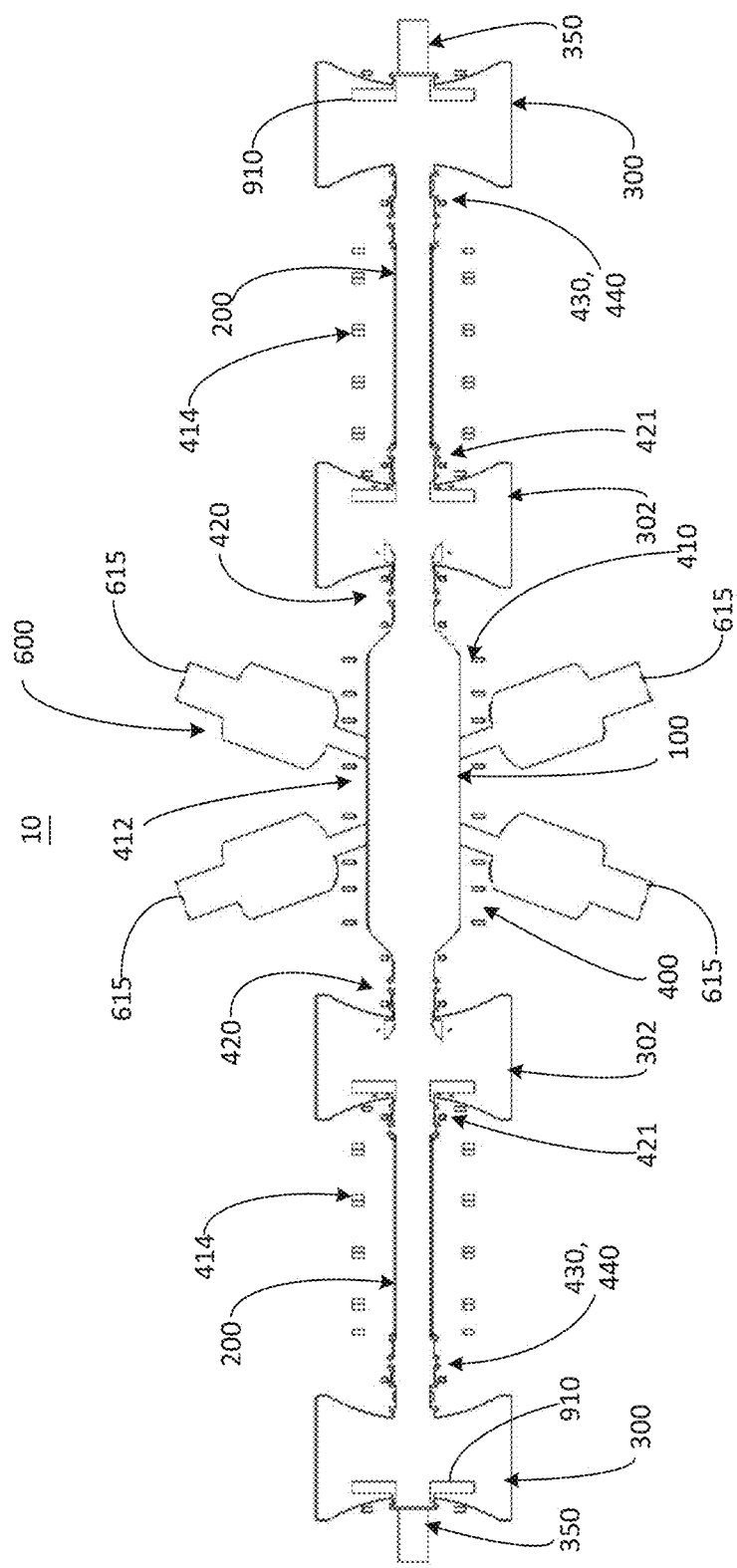

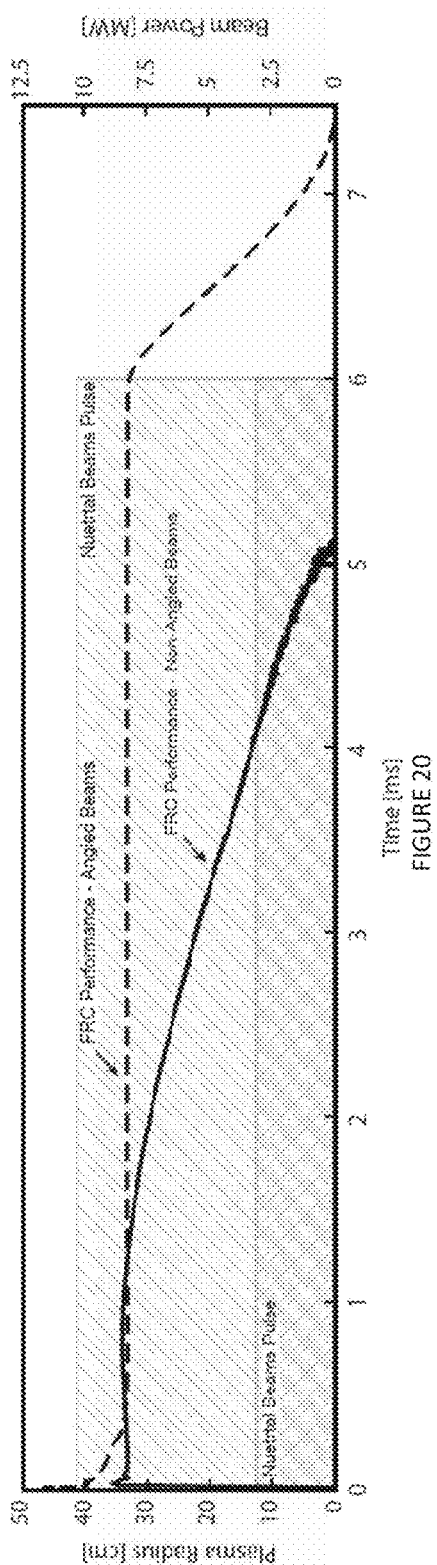
FIGURE 20
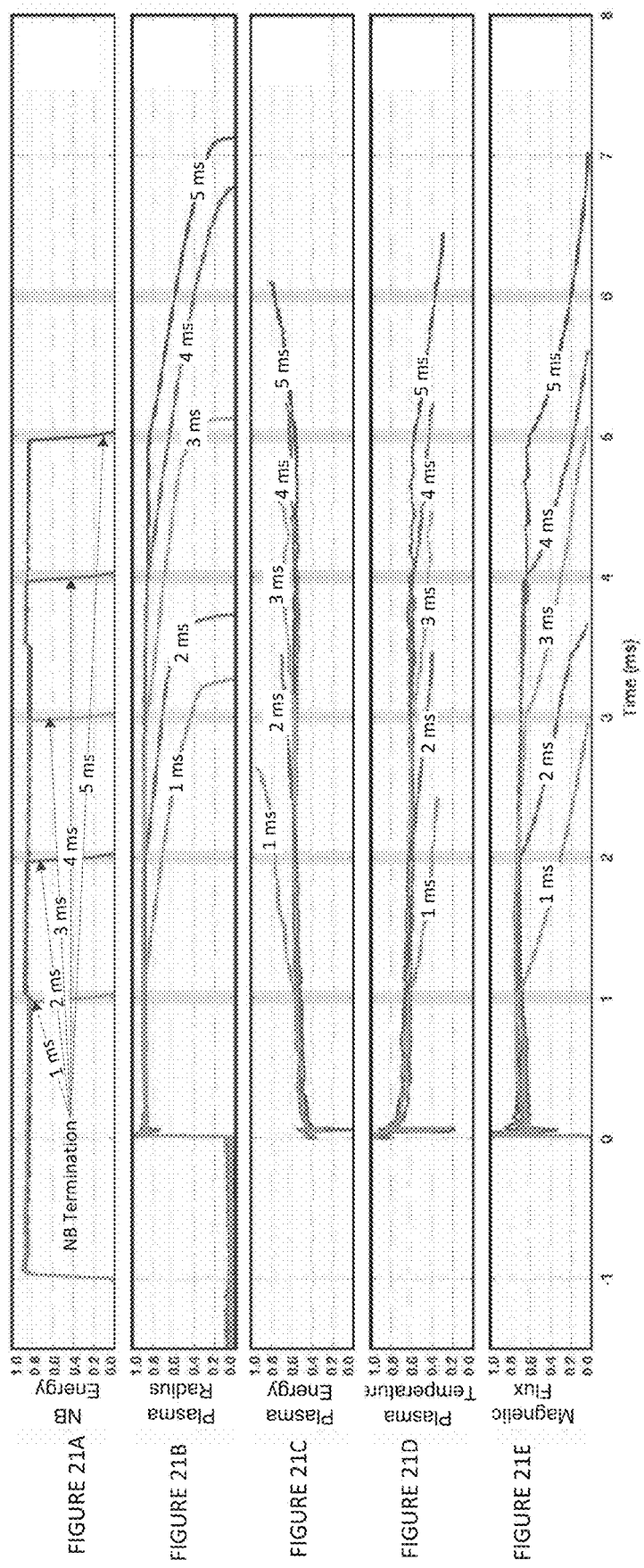
FIGURE 21A
FIGURE 21B
FIGURE 21C
FIGURE 21D
FIGURE 21E

SYSTEMS AND METHODS FOR IMPROVED SUSTAINMENT OF A HIGH PERFORMANCE FRC WITH MULTI-SCALED CAPTURE TYPE VACUUM PUMPING

CROSS-REFERENCE TO RELATED APPLICATIONS

The subject application is a continuation of U.S. patent application Ser. No. 16/399,396, filed Apr. 30, 2019, which is a continuation of International Patent Application No. PCT/US17/60255, filed Nov. 6, 2017, which claims priority to U.S. Provisional Patent Application No. 62/418,119, filed on Nov. 4, 2016, all of which are incorporated by reference herein in their entireties for all purposes.

FIELD

The subject matter described herein relates generally to magnetic plasma confinement systems having a field reversed configuration (FRC) and, more particularly, more particularly, to systems and methods that facilitate forming and maintaining FRCs with elevated system energies and improved sustainment utilizing multi-scaled capture type vacuum pumping.

BACKGROUND INFORMATION

The Field Reversed Configuration (FRC) belongs to the class of magnetic plasma confinement topologies known as compact toroids (CT). It exhibits predominantly poloidal magnetic fields and possesses zero or small self-generated toroidal fields (see M. Tuszewski, Nucl. Fusion 28, 2033 (1988)). The attractions of such a configuration are its simple geometry for ease of construction and maintenance, a natural unrestricted divertor for facilitating energy extraction and ash removal, and very high $\beta$ ($\beta$ is the ratio of the average plasma pressure to the average magnetic field pressure inside the FRC), i.e., high power density. The high $\beta$ nature is advantageous for economic operation and for the use of advanced, aneutronic fuels such as D-He$^3$ and p-B$^{11}$.

The traditional method of forming an FRC uses the field-reversed θ-pinch technology, producing hot, high-density plasmas (see A. L. Hoffman and J. T. Slough, Nucl. Fusion 33, 27 (1993)). A variation on this is the translation-trapping method in which the plasma created in a theta-pinch "source" is more-or-less immediately ejected out one end into a confinement chamber. The translating plasmoid is then trapped between two strong mirrors at the ends of the chamber (see, for instance, H. Himura, S. Okada, S. Sugimoto, and S. Goto, Phys. Plasmas 2, 191 (1995)). Once in the confinement chamber, various heating and current drive methods may be applied such as beam injection (neutral or neutralized), rotating magnetic fields, RF or ohmic heating, etc. This separation of source and confinement functions offers key engineering advantages for potential future fusion reactors. FRCs have proved to be extremely robust, resilient to dynamic formation, translation, and violent capture events. Moreover, they show a tendency to assume a preferred plasma state (see e.g. H. Y. Guo, A. L. Hoffman, K. E. Miller, and L. C. Steinhauer, Phys. Rev. Lett. 92, 245001 (2004)). Significant progress has been made in the last decade developing other FRC formation methods: merging spheromaks with oppositely-directed helicities (see e.g. Y. Ono, M. Inomoto, Y. Ueda, T. Matsuyama, and T. Okazaki, Nucl. Fusion 39, 2001 (1999)) and by driving current with rotating magnetic fields (RMF) (see e.g. I. R. Jones, Phys. Plasmas 6, 1950 (1999)) which also provides additional stability.

Recently, the collision-merging technique, proposed long ago (see e.g. D. R. Wells, Phys. Fluids 9, 1010 (1966)) has been significantly developed further: two separate theta-pinches at opposite ends of a confinement chamber simultaneously generate two plasmoids and accelerate the plasmoids toward each other at high speed; they then collide at the center of the confinement chamber and merge to form a compound FRC. In the construction and successful operation of one of the largest FRC experiments to date, the conventional collision-merging method was shown to produce stable, long-lived, high-flux, high temperature FRCs (see e.g. M. Binderbauer, H. Y. Guo, M. Tuszewski et al., Phys. Rev. Lett. 105, 045003 (2010)).

FRCs consist of a torus of closed field lines inside a separatrix, and of an annular edge layer on the open field lines just outside the separatrix. The edge layer coalesces into jets beyond the FRC length, providing a natural divertor. The FRC topology coincides with that of a Field-Reversed-Mirror plasma. However, a significant difference is that the FRC plasma has $\beta$ of about 10. The inherent low internal magnetic field provides for a certain indigenous kinetic particle population, i.e. particles with large larmor radii, comparable to the FRC minor radius. It is these strong kinetic effects that appear to at least partially contribute to the gross stability of past and present FRCs, such as those produced in the collision-merging experiment.

Typical past FRC experiments have been dominated by convective losses with energy confinement largely determined by particle transport. Particles diffuse primarily radially out of the separatrix volume, and are then lost axially in the edge layer. Accordingly, FRC confinement depends on the properties of both closed and open field line regions. The particle diffusion time out of the separatrix scales as $\tau_\perp \sim a^2/D_\perp$ ($a \sim r_s/4$, where $r_s$ is the central separatrix radius), and $D_\perp$ is a characteristic FRC diffusivity, such as $D_\perp \sim 12.5 \, \rho_{ie}$, with pie representing the ion gyroradius, evaluated at an externally applied magnetic field. The edge layer particle confinement time $\tau_\|$ is essentially an axial transit time in past FRC experiments. In steady-state, the balance between radial and axial particle losses yields a separatrix density gradient length $\delta \sim (D_\perp \tau_\|)^{1/2}$. The FRC particle confinement time scales as $(\tau_\perp \tau_\|)^{1/2}$ for past FRCs that have substantial density at the separatrix (see e.g. M. Tuszewski, "Field Reversed Configurations," Nucl. Fusion 28, 2033 (1988)).

In light of the foregoing, it is, therefore, desirable to improve the sustainment of FRCs in order to use steady state FRCs with elevated energy systems as a pathway to a reactor core for fusion of light nuclei for the future generation of energy.

SUMMARY

The present embodiments provided herein are directed to systems and methods that facilitate forming and maintaining FRCs with elevated system energies and improved sustainment utilizing multi-scaled capture type vacuum pumping. According to an embodiment of the present disclosure, a method for generating and maintaining a magnetic field with a field reversed configuration (FRC) comprising forming an FRC about a plasma in a confinement chamber, injecting a plurality of neutral beams into the FRC plasma at an angle toward the mid-plane of the confinement chamber, pumping neutralized gas molecules accumulating in first and second diametrically opposed divertors coupled to the confinement chamber with first and second capture vacuum pumps positioned in the first and second divertors and comprising two or more sides with surfaces having a view of each other and an open side, wherein the first and second capture vacuum pumps having a sticking factor more than four (4) times greater than a sticking factor of a flat plate defining an area equivalent to the open side of the first and second capture pumps.

According to a further embodiment of the present disclosure, at least one of the two or more sides of the first and second capture vacuum pumps comprising an array of individual capture vacuum pumps.

According to a further embodiment of the present disclosure, each of the individual capture vacuum pumps comprising two or more sides with surfaces having a view of each other and an open side, wherein each of the individual capture vacuum pumps having a sticking factor greater than a sticking factor of a flat plate defining an area equivalent to the open side of each of the individual capture vacuum pumps.

According to a further embodiment of the present disclosure, the first and second capture vacuum pumps having a sticking factor that is N times greater than a sticking factor of a flat plate defining an area equivalent to the open side of the first and second capture pumps, wherein N is 4<N<16.

According to a further embodiment of the present disclosure, the surfaces of the flat plate and the first and second vacuum pumps includes a film of titanium deposited thereon.

According to a further embodiment of the present disclosure, the method further comprising injecting compact toroid (CT) plasmas from first and second CT injectors into the FRC plasma at an angle towards the mid-plane of the confinement chamber, wherein the first and second CT injectors are diametrically opposed on opposing sides of the mid-plane of the confinement chamber.

According to a further embodiment of the present disclosure, a capture vacuum pump comprises two or more sides with surfaces having a view of each other and an open side, wherein capture vacuum pump having a sticking factor more than four (4) times greater than a sticking factor of a flat plate defining an area equivalent to the open side of the capture pump.

According to a further embodiment of the present disclosure, at least one of the two or more sides of the first and second capture vacuum pumps comprising an array of individual capture vacuum pumps.

According to a further embodiment of the present disclosure, each of the individual capture vacuum pumps comprising two or more sides with surfaces having a view of each other and an open side, wherein each of the individual capture vacuum pumps having a sticking factor greater than a sticking factor of a flat plate defining an area equivalent to the open side of each of the individual capture vacuum pumps.

According to a further embodiment of the present disclosure, the first and second capture vacuum pumps having a sticking factor that is N times greater than a sticking factor of a flat plate defining an area equivalent to the open side of the first and second capture pumps, wherein N is 4<N<16.

According to a further embodiment of the present disclosure, the surfaces of the flat plate and the first and second vacuum pumps includes a film of titanium deposited thereon.

According to a further embodiment of the present disclosure, a system for generating and maintaining a magnetic field with a field reversed configuration (FRC) comprising a confinement chamber, first and second diametrically opposed FRC formation sections coupled to the confinement chamber and including first and second capture vacuum pumps positioned within the first and second divertors and comprising two or more sides with surfaces having a view of each other and an open side, wherein the first and second capture vacuum pumps having a sticking factor more than four (4) times greater than a sticking factor of a flat plate defining an area equivalent to the open side of the first and second capture pumps, one or more of a plurality of plasma guns, one or more biasing electrodes and first and second mirror plugs, wherein the plurality of plasma guns includes first and second axial plasma guns operably coupled to the first and second divertors, the first and second formation sections and the confinement chamber, wherein the one or more biasing electrodes being positioned within one or more of the confinement chamber, the first and second formation sections, and the first and second outer divertors, and wherein the first and second mirror plugs being position between the first and second formation sections and the first and second divertors, a gettering system coupled to the confinement chamber and the first and second divertors, a plurality of neutral atom beam injectors coupled to the confinement chamber and angled toward a mid-plane of the confinement chamber.

According to a further embodiment of the present disclosure, the system further comprising first and second compact toroid (CT) injectors coupled to the confinement chamber at an angle towards the mid-plane of the confinement chamber, wherein the first and second CT injectors are diametrically opposed on opposing sides of the mid-plane of the confinement chamber.

The systems, methods, features and advantages of the example embodiments will be or will become apparent to one with skill in the art upon examination of the following figures and detailed description. It is intended that all such additional methods, features and advantages be included within this description, and be protected by the accompanying claims. It is also intended that the claims are not limited to require the details of the example embodiments.

BRIEF DESCRIPTION OF THE FIGURES

The accompanying drawings, which are included as part of the present specification, illustrate the presently example embodiments and, together with the general description given above and the detailed description of the example embodiments given below, serve to explain and teach the principles of the present invention.

FIGS. 3D and 3E illustrate top and perspective views, respectively, of the basic layout of an alternative embodiment of the present FRC system, including the preferred arrangement of the central confinement vessel, formation section, inner and outer divertors, neutral beams arranged at an angle less than normal to the major axis of symmetry in the central confinement vessel, electrodes, plasma guns and mirror plugs.

FIG. 20 illustrates the FRC lifetime corresponding to the pulse length of non-angled and angled injected neutral beams.

FIGS. 21A, 21B, 21C, 21D and 21E illustrate the pulse length of angled injected neutral beams and the lifetime of FRC plasma parameters of plasma radius, plasma density, plasma temperature, and magnetic flux corresponding to the pulse length of angled injected neutral beams.

Figure 1:
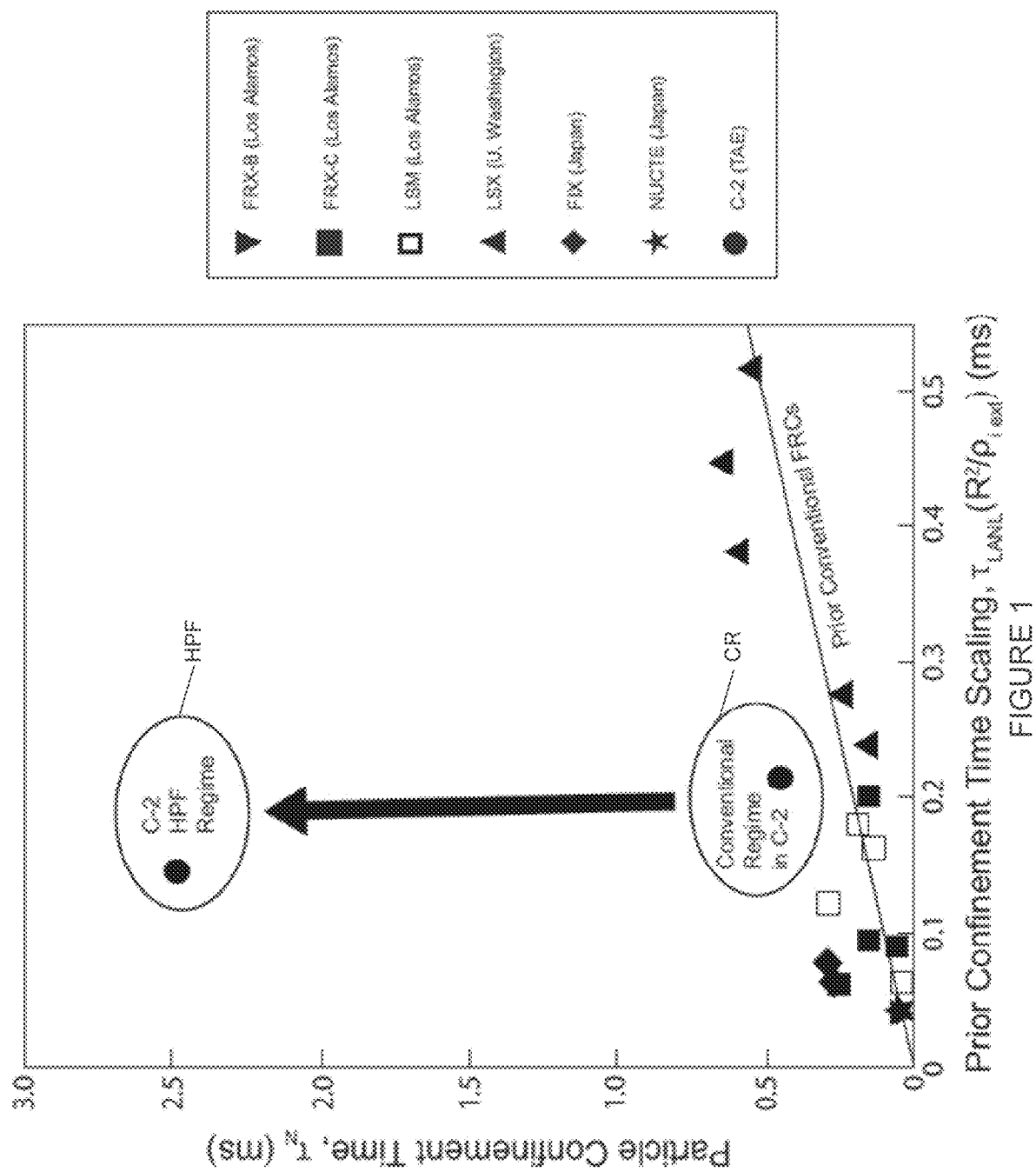
FIG. 1 illustrates particle confinement in the present FRC system under a high performance FRC regime (HPF) versus under a conventional FRC regime (CR), and versus other conventional FRC experiments.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not necessarily describe every aspect of the teachings disclosed herein and do not limit the scope of the claims.

DETAILED DESCRIPTION

The present embodiments provided herein are directed to systems and methods that facilitate forming and maintaining FRCs with superior stability as well as particle, energy and flux confinement. Some of the present embodiments are directed to systems and methods that facilitate forming and maintaining FRCs with improved sustainment utilizing multi-scaled capture type vacuum pump.

Representative examples of the embodiments described herein, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Before turning to the systems and methods that facilitate sustainment an FRC plasma utilizing multi-scaled capture type vacuum pumping, a discussion of systems and methods for forming and maintaining high performance FRCs with superior stability as well as superior particle, energy and flux confinement over conventional FRCs is provided. Such high performance FRCs provide a pathway to a whole variety of applications including compact neutron sources (for medical isotope production, nuclear waste remediation, materials research, neutron radiography and tomography), compact photon sources (for chemical production and processing), mass separation and enrichment systems, and reactor cores for fusion of light nuclei for the future generation of energy.

Various ancillary systems and operating modes have been explored to assess whether there is a superior confinement regime in FRCs. These efforts have led to breakthrough discoveries and the development of a High Performance FRC paradigm described herein. In accordance with this new paradigm, the present systems and methods combine a host of novel ideas and means to dramatically improve FRC confinement as illustrated in FIG. 1 as well as provide stability control without negative side-effects. As discussed in greater detail below, FIG. 1 depicts particle confinement in an FRC system 10 described below (see FIGS. 2 and 3), operating in accordance with a High Performance FRC regime (HPF) for forming and maintaining an FRC versus operating in accordance with a conventional regime CR for forming and maintaining an FRC, and versus particle confinement in accordance with conventional regimes for forming and maintaining an FRC used in other experiments. The present disclosure will outline and detail the innovative individual components of the FRC system 10 and methods as well as their collective effects.

FRC System

Vacuum System

Figure 2:
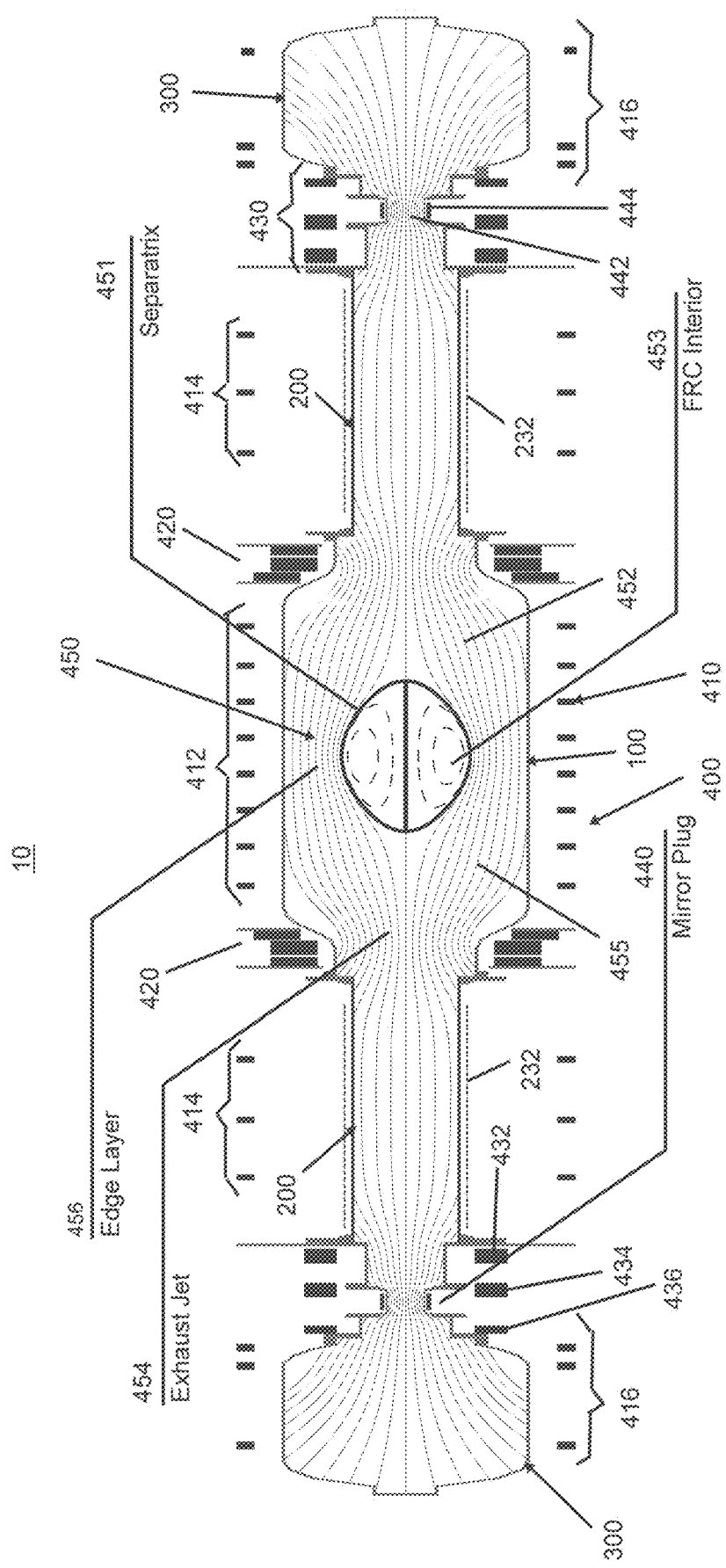
FIG. 2 illustrates the components of the present FRC system and the magnetic topology of an FRC producible in the present FRC system.

FIGS. 2 and 3 depict a schematic of the present FRC system 10. The FRC system 10 includes a central confinement vessel 100 surrounded by two diametrically opposed reversed-field-theta-pinch formation sections 200 and, beyond the formation sections 200, two divertor chambers 300 to control neutral density and impurity contamination. The present FRC system 10 was built to accommodate ultrahigh vacuum and operates at typical base pressures of $10^{-8}$ torr. Such vacuum pressures require the use of double-pumped mating flanges between mating components, metal O-rings, high purity interior walls, as well as careful initial surface conditioning of all parts prior to assembly, such as physical and chemical cleaning followed by a 24 hour 250° C. vacuum baking and Hydrogen glow discharge cleaning.

Figure 4:
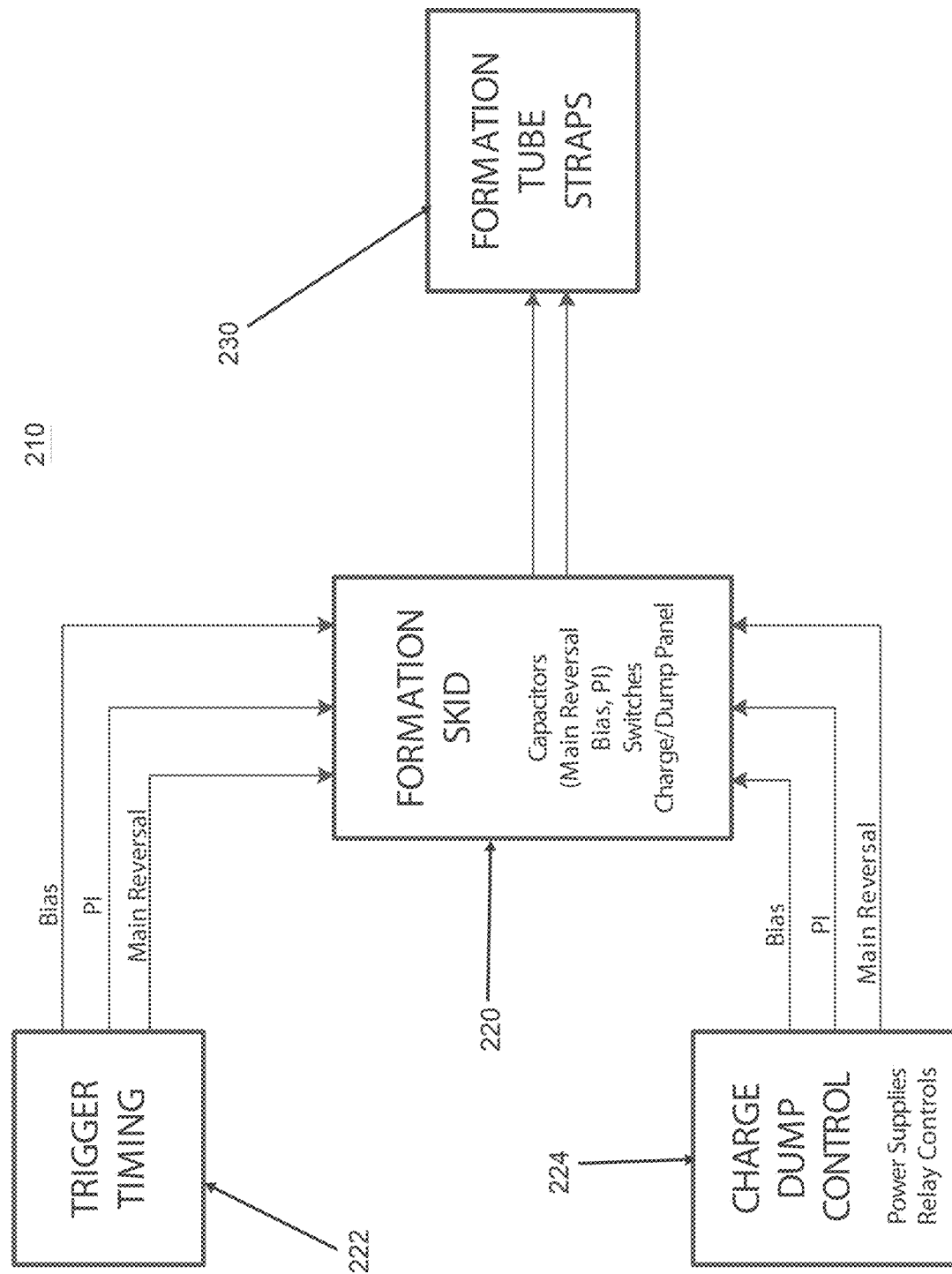
FIG. 4 illustrates a schematic of the components of a pulsed power system for the formation sections.
Figure 5:
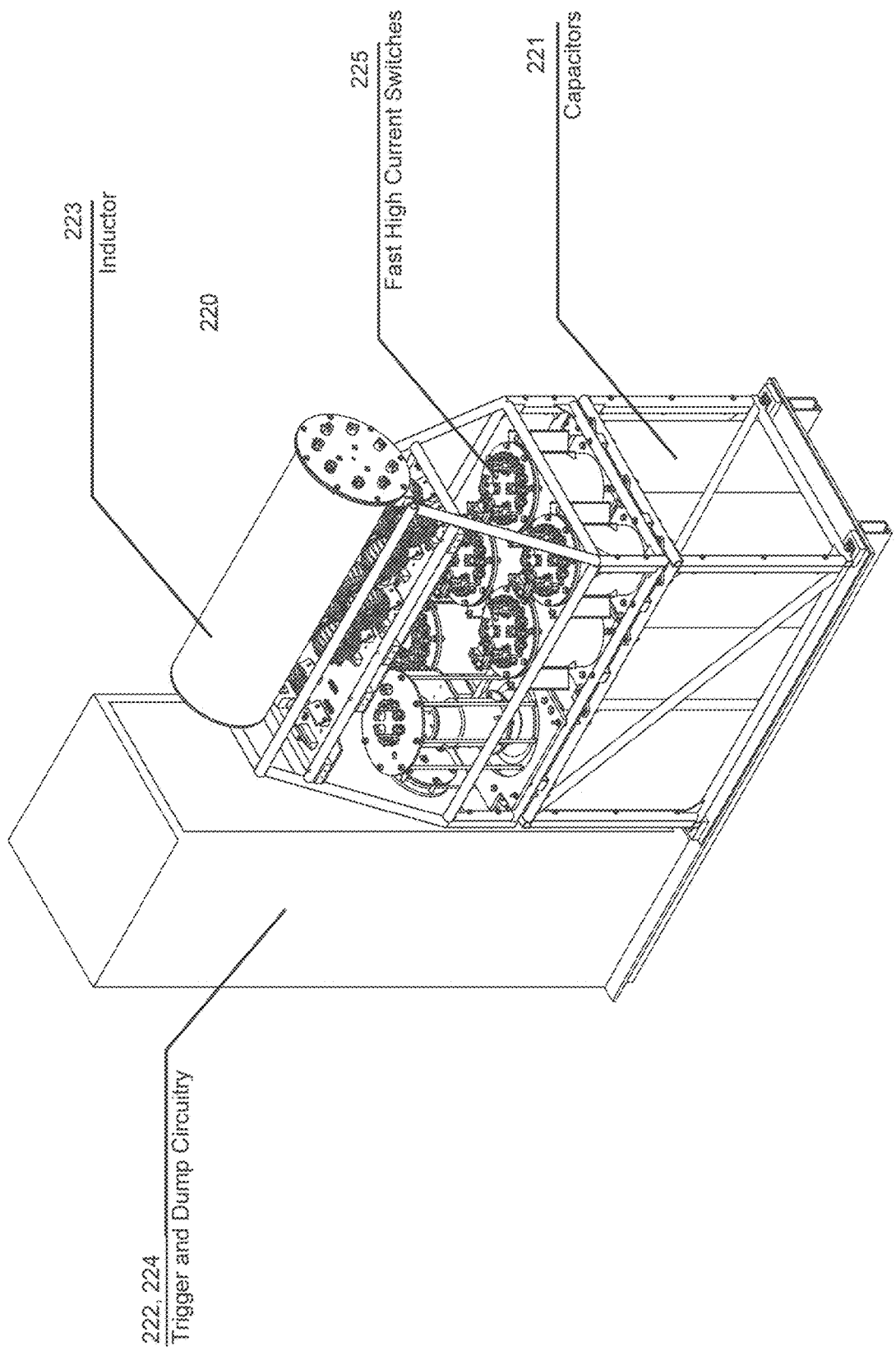
FIG. 5 illustrates an isometric view of an individual pulsed power formation skid.
Figure 6:
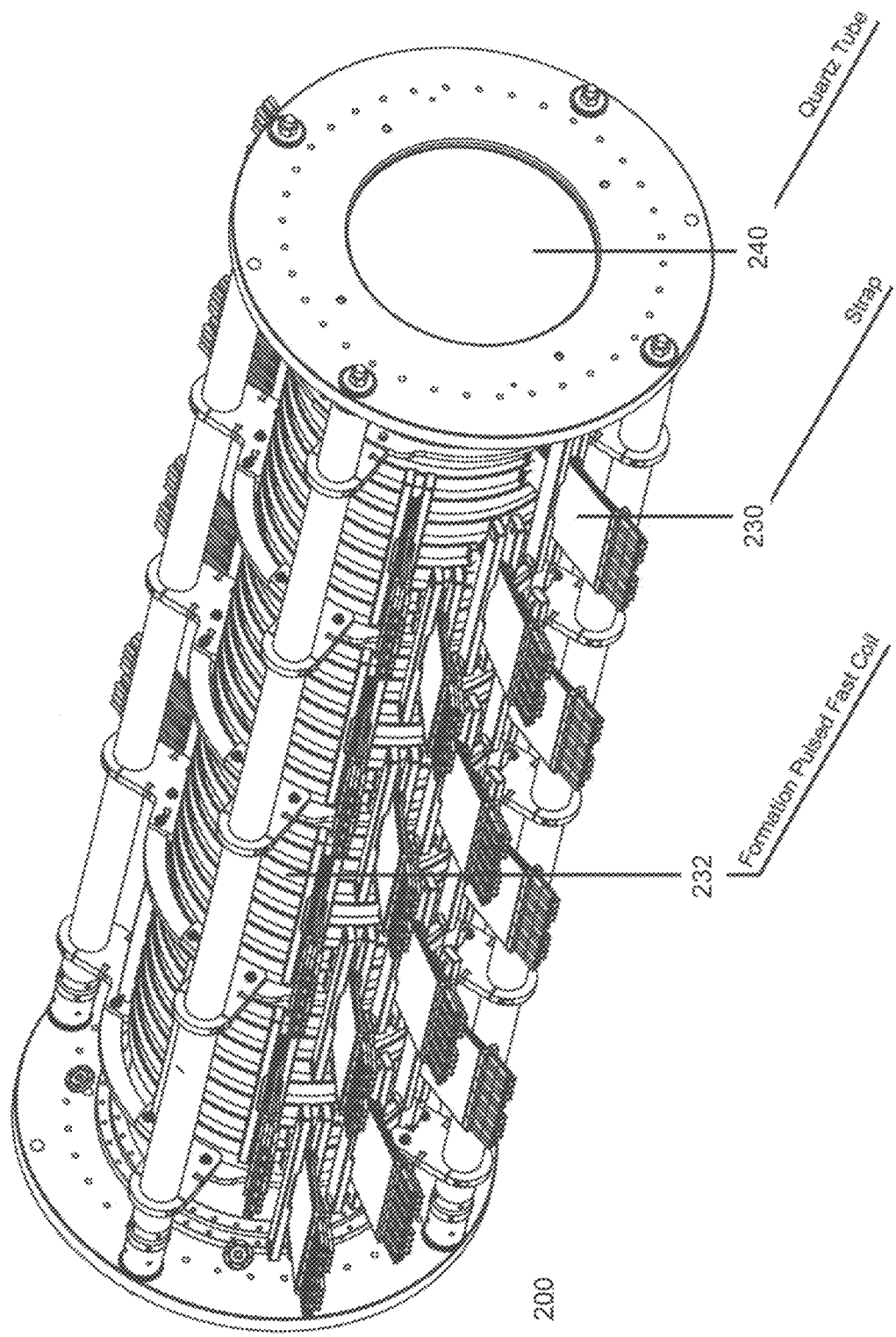
FIG. 6 illustrates an isometric view of a formation tube assembly.

The reversed-field-theta-pinch formation sections 200 are standard field-reversed-theta-pinches (FRTPs), albeit with an advanced pulsed power formation system discussed in detail below (see FIGS. 4 through 6). Each formation section 200 is made of standard opaque industrial grade quartz tubes that feature a 2 millimeter inner lining of ultrapure quartz. The confinement chamber 100 is made of stainless steel to allow a multitude of radial and tangential ports; it also serves as a flux conserver on the timescale of the experiments described below and limits fast magnetic transients. Vacuums are created and maintained within the FRC system 10 with a set of dry scroll roughing pumps, turbo molecular pumps and cryo pumps.

Magnetic System

The magnetic system 400 is illustrated in FIGS. 2 and 3. FIG. 2, amongst other features, illustrates an FRC magnetic flux and density contours (as functions of the radial and axial coordinates) pertaining to an FRC 450 producible by the FRC system 10. These contours were obtained by a 2-D resistive Hall-MHD numerical simulation using code developed to simulate systems and methods corresponding to the FRC system 10, and agree well with measured experimental data. As seen in FIG. 2, the FRC 450 consists of a torus of closed field lines at the interior 453 of the FRC 450 inside a separatrix 451, and of an annular edge layer 456 on the open field lines 452 just outside the separatrix 451. The edge layer 456 coalesces into jets 454 beyond the FRC length, providing a natural divertor.

Figure 15:
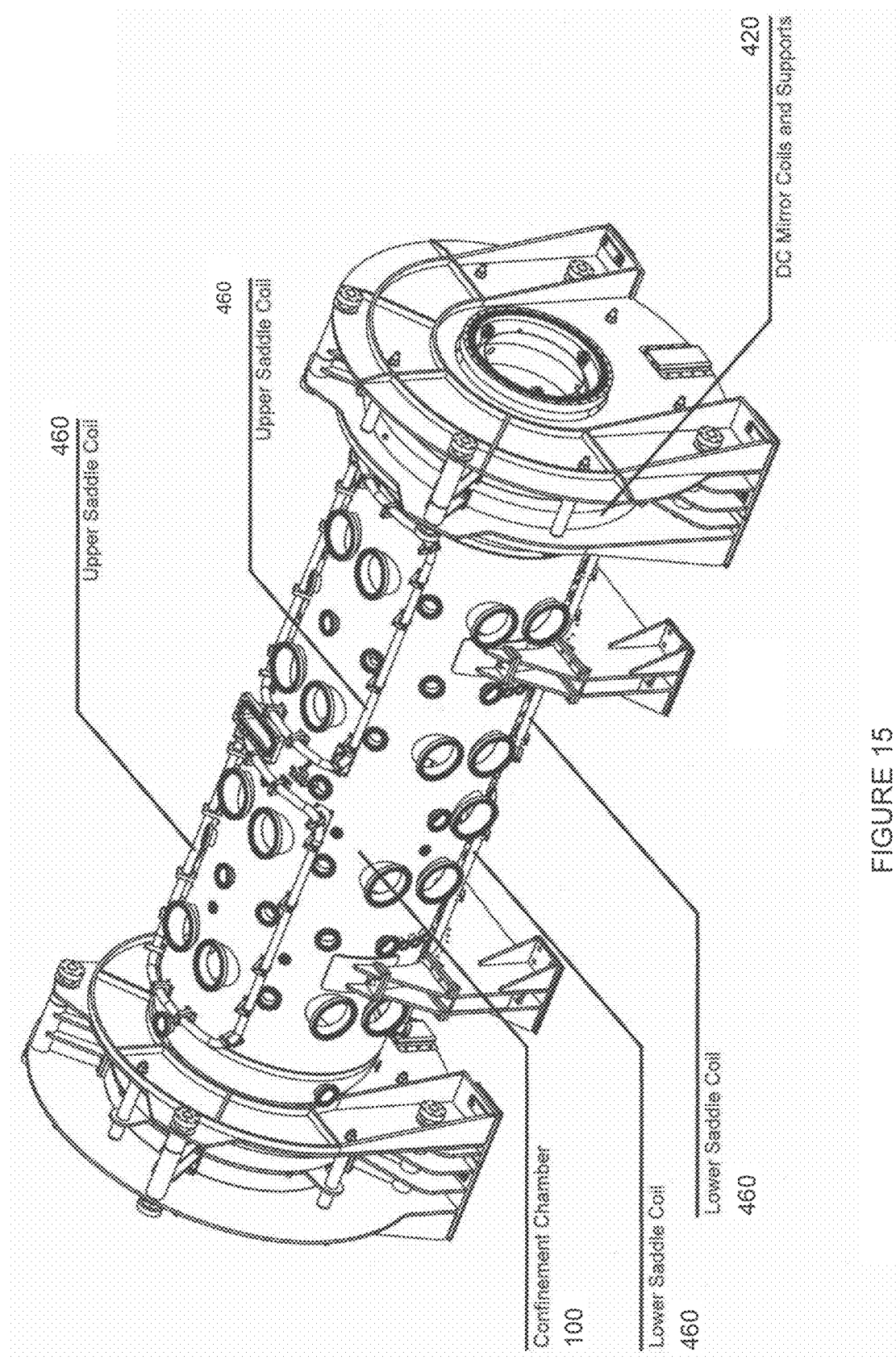
FIG. 15 illustrates an isometric view of the saddle coils mounted outside of the confinement chamber.
Figure 16A:
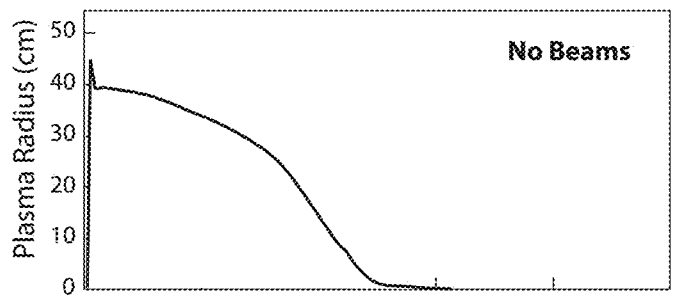
FIGS. 16A, 16B, 16C and 16D illustrate the correlations of FRC lifetime and pulse length of injected neutral beams. As shown, longer beam pulses produce longer lived FRCs.
Figure 16B:
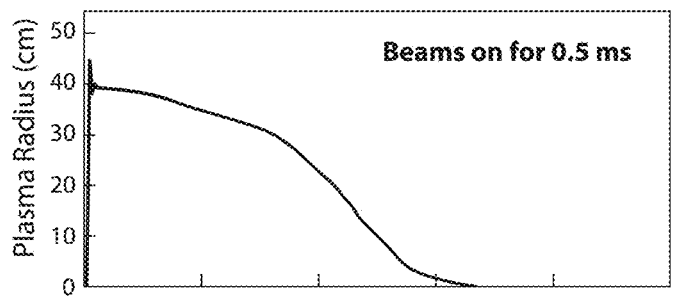
Figure 16C:
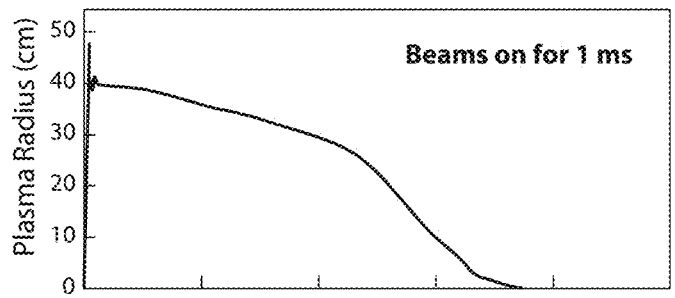
Figure 16D:
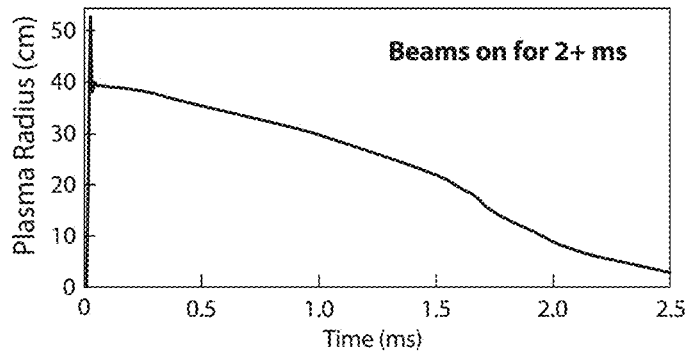
Figure 17A:
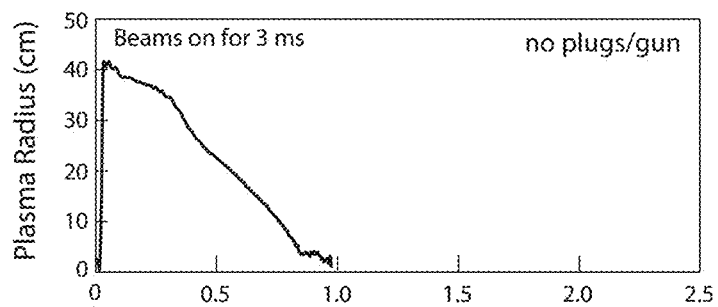
FIGS. 17A, 17B, 17C and 17D illustrate the individual and combined effects of different components of the FRC system on FRC performance and the attainment of the HPF regime.
Figure 17B:
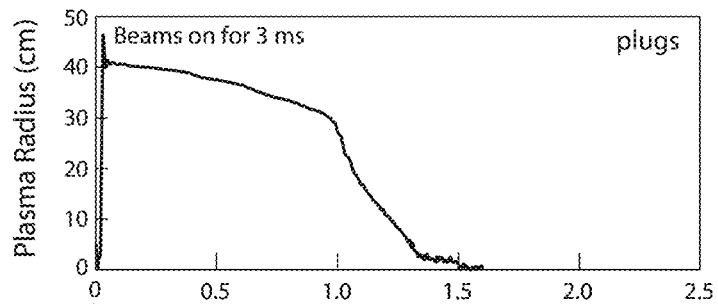
Figure 17C:
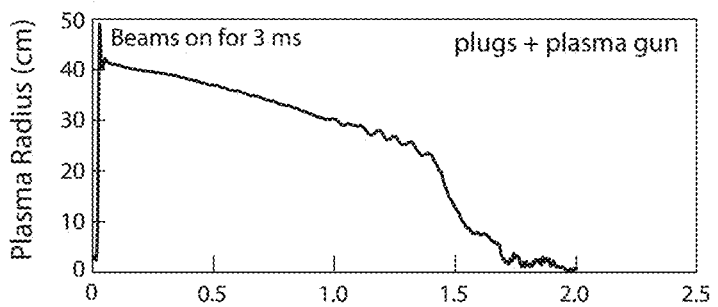
Figure 17D:
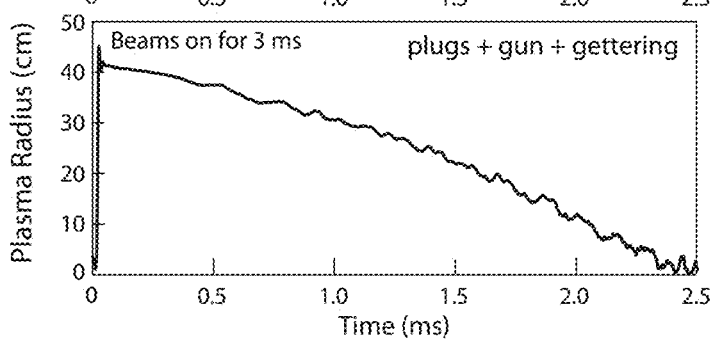

The main magnetic system 410 includes a series of quasi-dc coils 412, 414, and 416 that are situated at particular axial positions along the components, i.e., along the confinement chamber 100, the formation sections 200 and the divertors 300, of the FRC system 10. The quasi-dc coils 412, 414 and 416 are fed by quasi-dc switching power supplies and produce basic magnetic bias fields of about 0.1 T in the confinement chamber 100, the formation sections 200 and the divertors 300. In addition to the quasi-dc coils 412, 414 and 416, the main magnetic system 410 includes quasi-dc mirror coils 420 (fed by switching supplies) between either end of the confinement chamber 100 and the adjacent formation sections 200. The quasi-dc mirror coils 420 provide magnetic mirror ratios of up to 5 and can be independently energized for equilibrium shaping control. In addition, mirror plugs 440, are positioned between each of the formation sections 200 and divertors 300. The mirror plugs 440 comprise compact quasi-dc mirror coils 430 and mirror plug coils 444. The quasi-dc mirror coils 430 include three coils 432, 434 and 436 (fed by switching supplies) that produce additional guide fields to focus the magnetic flux surfaces 455 towards the small diameter passage 442 passing through the mirror plug coils 444. The mirror plug coils 444, which wrap around the small diameter passage 442 and are fed by LC pulsed power circuitry, produce strong magnetic mirror fields of up to 4 T. The purpose of this entire coil arrangement is to tightly bundle and guide the magnetic flux surfaces 455 and end-streaming plasma jets 454 into the remote chambers 310 of the divertors 300. Finally, a set of saddle-coil "antennas" 460 (see FIG. 15) are located outside the confinement chamber 100, two on each side of the mid-plane, and are fed by dc power supplies. The saddle-coil antennas 460 can be configured to provide a quasi-static magnetic dipole or quadrupole field of about 0.01 T for controlling rotational instabilities and/or electron current control. The saddle-coil antennas 460 can flexibly provide magnetic fields that are either symmetric or antisymmetric about the machine's midplane, depending on the direction of the applied currents.

Pulsed Power Formation Systems

The pulsed power formation systems 210 operate on a modified theta-pinch principle. There are two systems that each power one of the formation sections 200. FIGS. 4 through 6 illustrate the main building blocks and arrangement of the formation systems 210. The formation system 210 is composed of a modular pulsed power arrangement that consists of individual units (=skids) 220 that each energize a sub-set of coils 232 of a strap assembly 230 (=straps) that wrap around the formation quartz tubes 240. Each skid 220 is composed of capacitors 221, inductors 223, fast high current switches 225 and associated trigger 222 and dump circuitry 224. In total, each formation system 210 stores between 350-400 kJ of capacitive energy, which provides up to 35 GW of power to form and accelerate the FRCs. Coordinated operation of these components is achieved via a state-of-the-art trigger and control system 222 and 224 that allows synchronized timing between the formation systems 210 on each formation section 200 and minimizes switching jitter to tens of nanoseconds. The advantage of this modular design is its flexible operation: FRCs can be formed in-situ and then accelerated and injected (=static formation) or formed and accelerated at the same time (=dynamic formation).

Neutral Beam Injectors

Figure 3A:
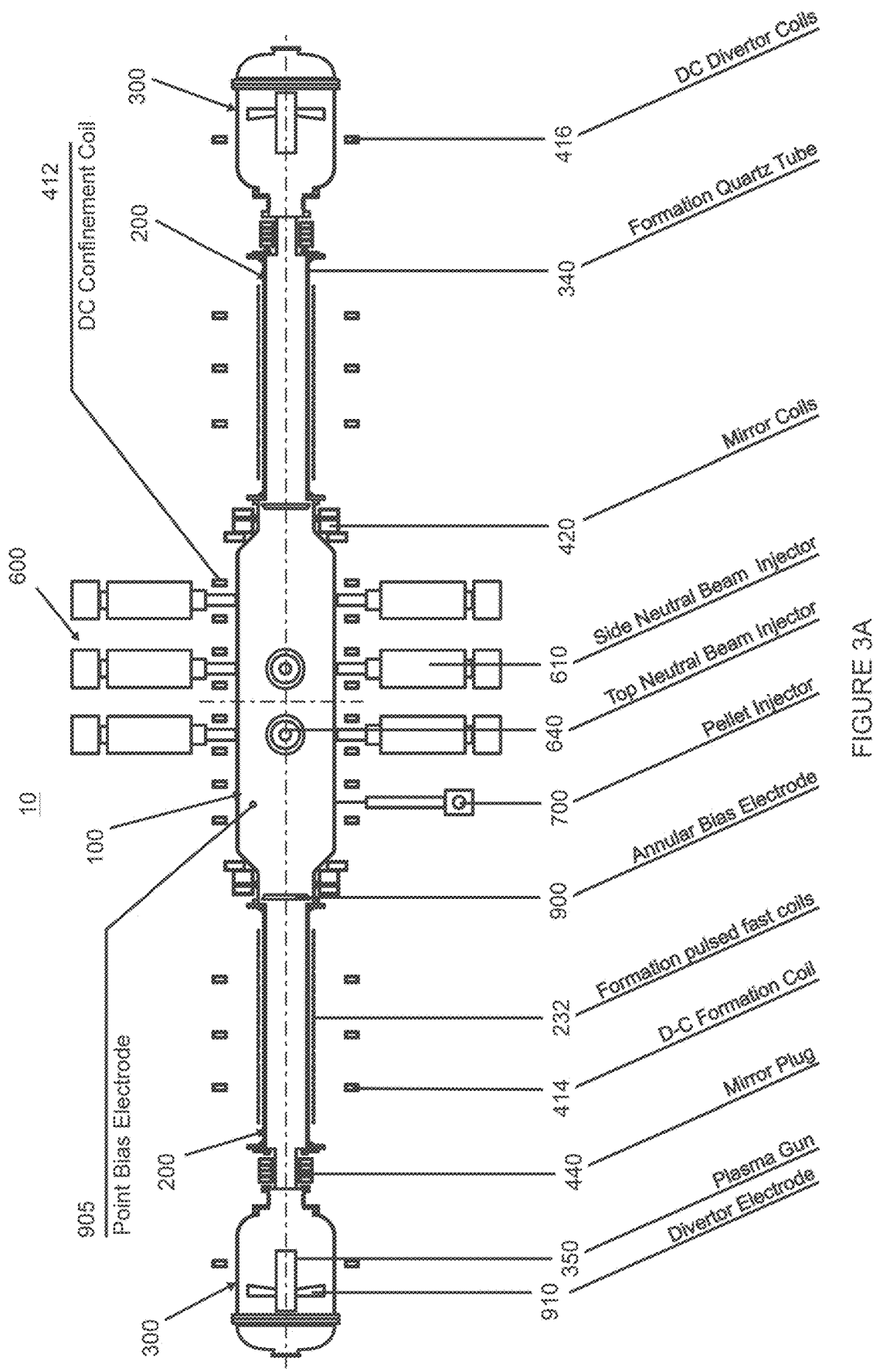
FIG. 3A illustrates the basic layout of the present FRC system as viewed from the top, including the preferred arrangement of the central confinement vessel, formation section, divertors, neutral beams, electrodes, plasma guns, mirror plugs and pellet injector.
Figure 3B:
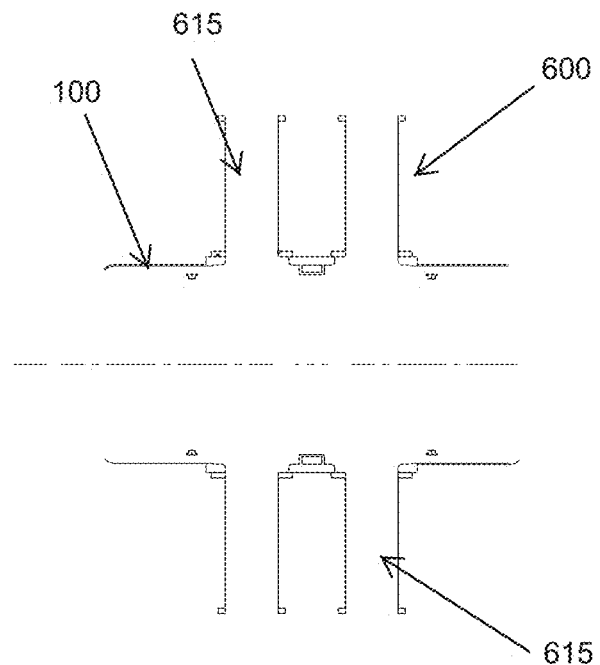
FIG. 3B illustrates the central confinement vessel as viewed from the top and showing the neutral beams arranged at an angle normal to the major axis of symmetry in the central confinement vessel.
Figure 7:
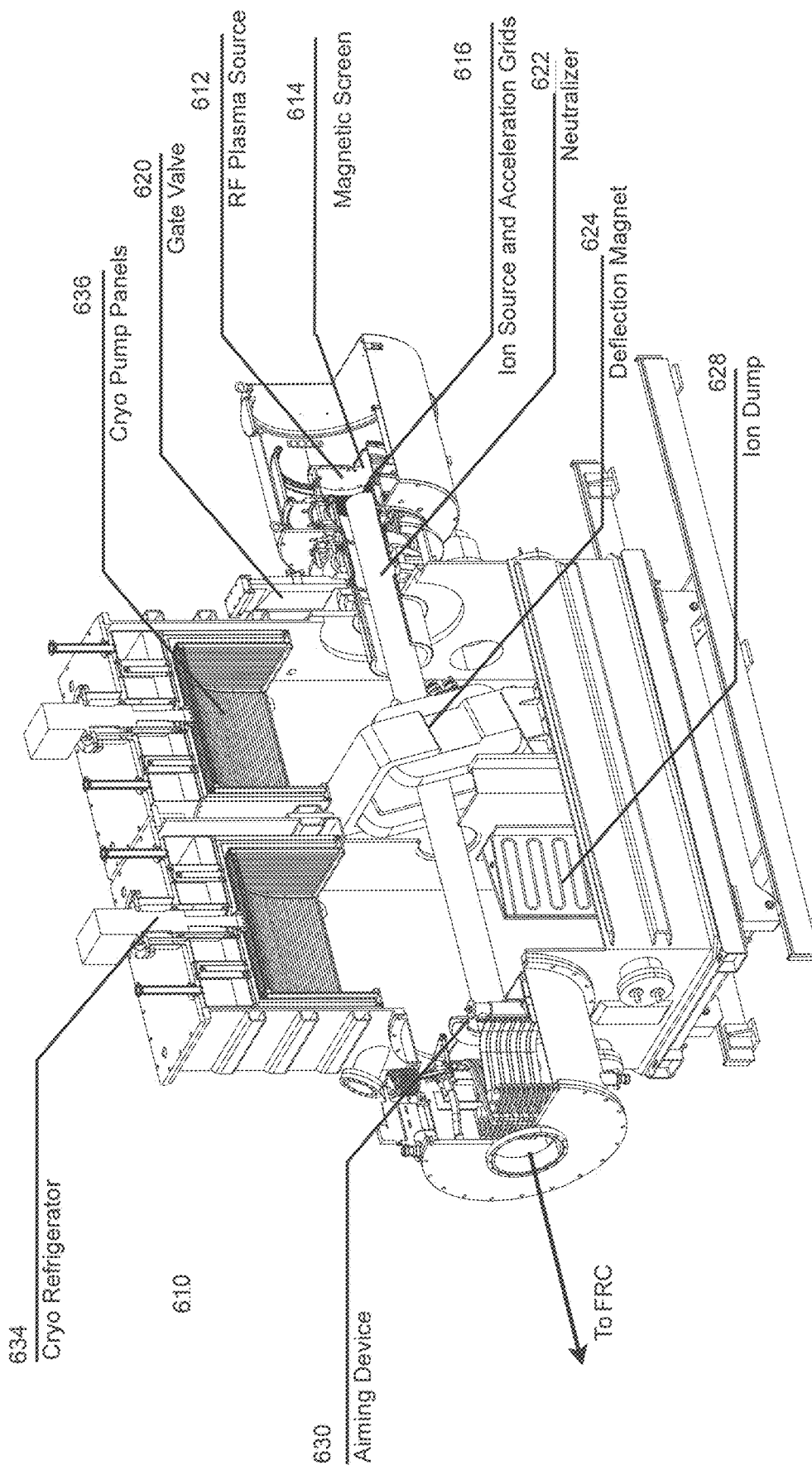
FIG. 7 illustrates a partial sectional isometric view of neutral beam system and key components.
Figure 8:
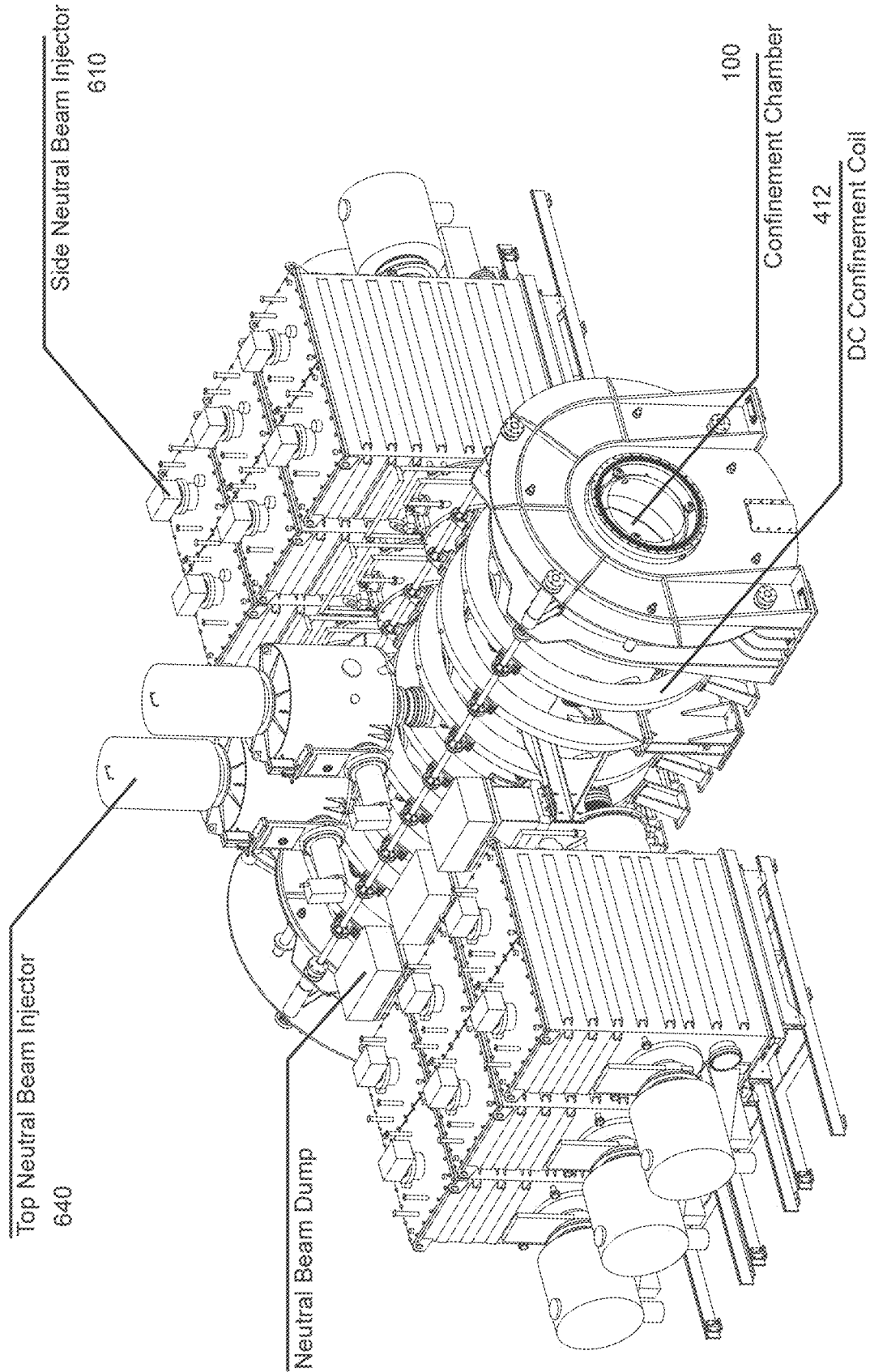
FIG. 8 illustrates an isometric view of the neutral beam arrangement on confinement chamber.

Neutral atom beams 600 are deployed on the FRC system 10 to provide heating and current drive as well as to develop fast particle pressure. As shown in FIGS. 3A, 3B and 8, the individual beam lines comprising neutral atom beam injector systems 610 and 640 are located around the central confinement chamber 100 and inject fast particles tangentially to the FRC plasma (and perpendicular or at an angel normal to the major axis of symmetry in the central confinement vessel 100) with an impact parameter such that the target trapping zone lies well within the separatrix 451 (see FIG. 2). Each injector system 610 and 640 is capable of injecting up to 1 MW of neutral beam power into the FRC plasma with particle energies between 20 and 40 keV. The systems 610 and 640 are based on positive ion multi-aperture extraction sources and utilize geometric focusing, inertial cooling of the ion extraction grids and differential pumping. Apart from using different plasma sources, the systems 610 and 640 are primarily differentiated by their physical design to meet their respective mounting locations, yielding side and top injection capabilities. Typical components of these neutral beam injectors are specifically illustrated in FIG. 7 for the side injector systems 610. As shown in FIG. 7, each individual neutral beam system 610 includes an RF plasma source 612 at an input end (this is substituted with an arc source in systems 640) with a magnetic screen 614 covering the end. An ion optical source and acceleration grids 616 is coupled to the plasma source 612 and a gate valve 620 is positioned between the ion optical source and acceleration grids 616 and a neutralizer 622. A deflection magnet 624 and an ion dump 628 are located between the neutralizer 622 and an aiming device 630 at the exit end. A cooling system comprises two cryo-refrigerators 634, two cryopanels 636 and a LN2 shroud 638. This flexible design allows for operation over a broad range of FRC parameters.

Figure 3C:
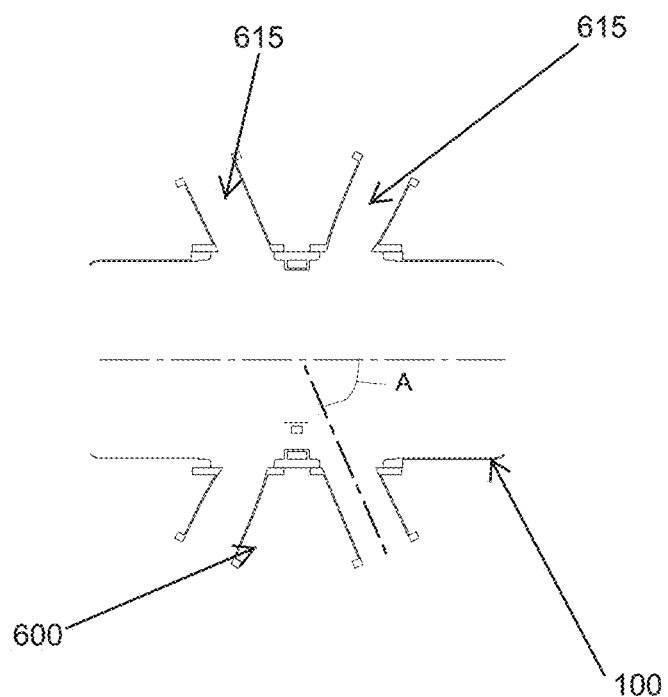
FIG. 3C illustrates the central confinement vessel as viewed from the top and showing the neutral beams arranged at an angle less than normal to the major axis of symmetry in the central confinement vessel and directed to inject particles toward the mid-plane of the central confinement vessel.

An alternative configuration for the neutral atom beam injectors 600 is that of injecting the fast particles tangentially to the FRC plasma, but with an angle A less than 90° relative to the major axis of symmetry in the central confinement vessel 100. These types of orientation of the beam injectors 615 are shown in FIG. 3C. In addition, the beam injectors 615 may be oriented such that the beam injectors 615 on either side of the mid-plane of the central confinement vessel 100 inject their particles towards the mid-plane. Finally, the axial position of these beam systems 600 may be chosen closer to the mid-plane. These alternative injection embodiments facilitate a more central fueling option, which provides for better coupling of the beams and higher trapping efficiency of the injected fast particles. Furthermore, depending on the angle and axial position, this arrangement of the beam injectors 615 allows more direct and independent control of the axial elongation and other characteristics of the FRC 450. For instance, injecting the beams at a shallow angle A relative to the vessel's major axis of symmetry will create an FRC plasma with longer axial extension and lower temperature while picking a more perpendicular angle A will lead to an axially shorter but hotter plasma. In this fashion the injection angle A and location of the beam injectors 615 can be optimized for different purposes. In addition, such angling and positioning of the beam injectors 615 can allow beams of higher energy (which is generally more favorable for depositing more power with less beam divergence) to be injected into lower magnetic fields than would otherwise be necessary to trap such beams. This is due to the fact that it is the azimuthal component of the energy that determines fast ion orbit scale (which becomes progressively smaller as the injection angle relative to the vessel's major axis of symmetry is reduced at constant beam energy). Furthermore, angled injection towards the mid-plane and with axial beam positions close to the mid-plane improves beam-plasma coupling, even as the FRC plasma shrinks or otherwise axially contracts during the injection period.

Figure 3E:
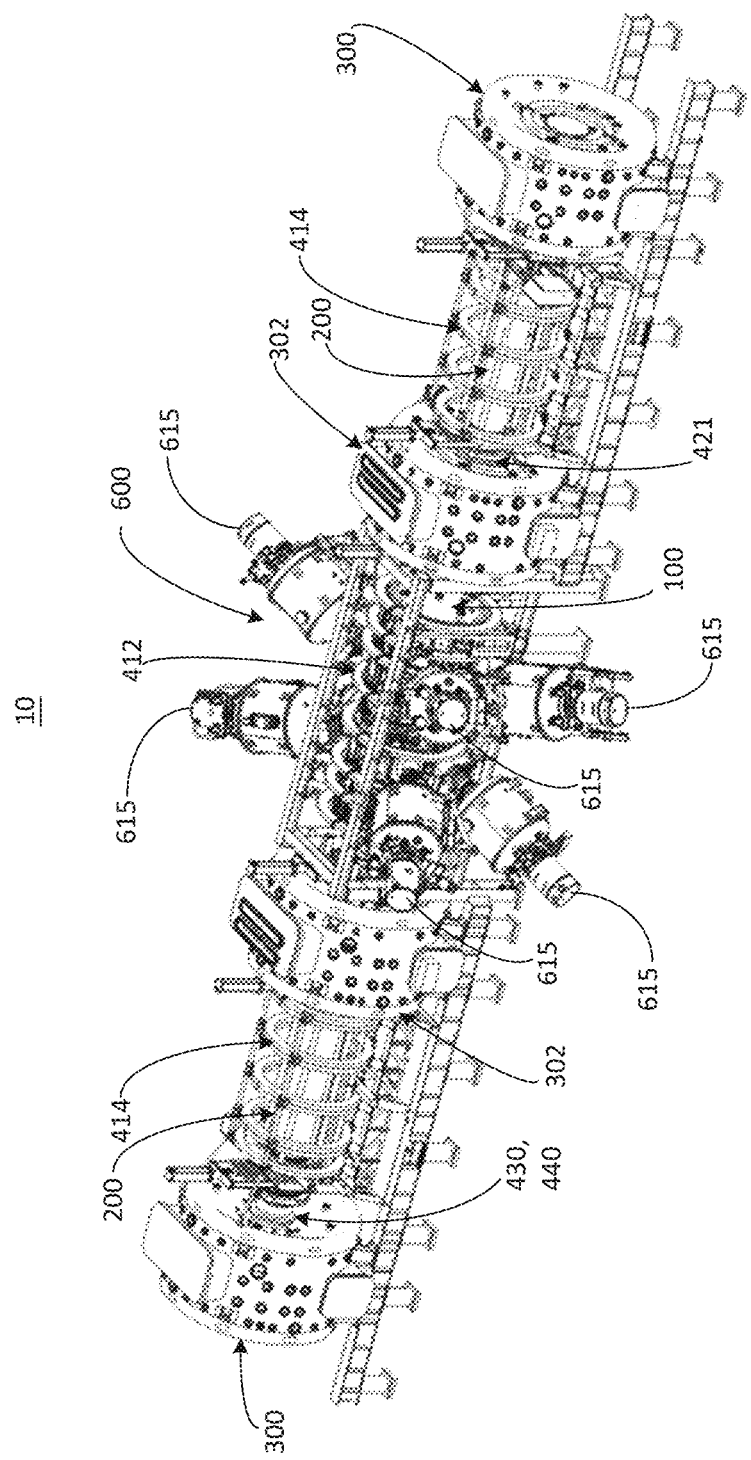

Turning to FIGS. 3D and 3E, another alternative configuration of the FRC system 10 includes inner divertors 302 in addition to the angled beam injectors 615. The inner divertors 302 are positioned between the formation sections 200 and the confinement chamber 100, and are configured and operate substantially similar to the outer divertors 300. The inner divertors 302, which include fast switching magnetic coils therein, are effectively inactive during the formation process to enable the formation FRCs to pass through the inner divertors 302 as the formation FRCs translate toward the mid-plane of the confinement chamber 100. Once the formation FRCs pass through the inner divertors 302 into the confinement chamber 100, the inner divertors are activated to operate substantially similar to the outer divertors and isolate the confinement chamber 100 from the formation sections 200.

Pellet Injector

To provide a means to inject new particles and better control FRC particle inventory, a 12-barrel pellet injector 700 (see e.g. I. Vinyar et al., "Pellet Injectors Developed at PELIN for JET, TAE, and HL-2A," Proceedings of the 26$^{th}$ Fusion Science and Technology Symposium, 09/27 to 10/01 (2010)) is utilized on FRC system 10. FIG. 3 illustrates the layout of the pellet injector 700 on the FRC system 10. The cylindrical pellets (D~1 mm, L~1-2 mm) are injected into the FRC with a velocity in the range of 150-250 km/s. Each individual pellet contains about $5\times10^{19}$ hydrogen atoms, which is comparable to the FRC particle inventory.

Gettering Systems

It is well known that neutral halo gas is a serious problem in all confinement systems. The charge exchange and recycling (release of cold impurity material from the wall) processes can have a devastating effect on energy and particle confinement. In addition, any significant density of neutral gas at or near the edge will lead to prompt losses of or at least severely curtail the lifetime of injected large orbit (high energy) particles (large orbit refers to particles having orbits on the scale of the FRC topology or at least orbit radii much larger than the characteristic magnetic field gradient length scale)—a fact that is detrimental to all energetic plasma applications, including fusion via auxiliary beam heating.

Figure 9:
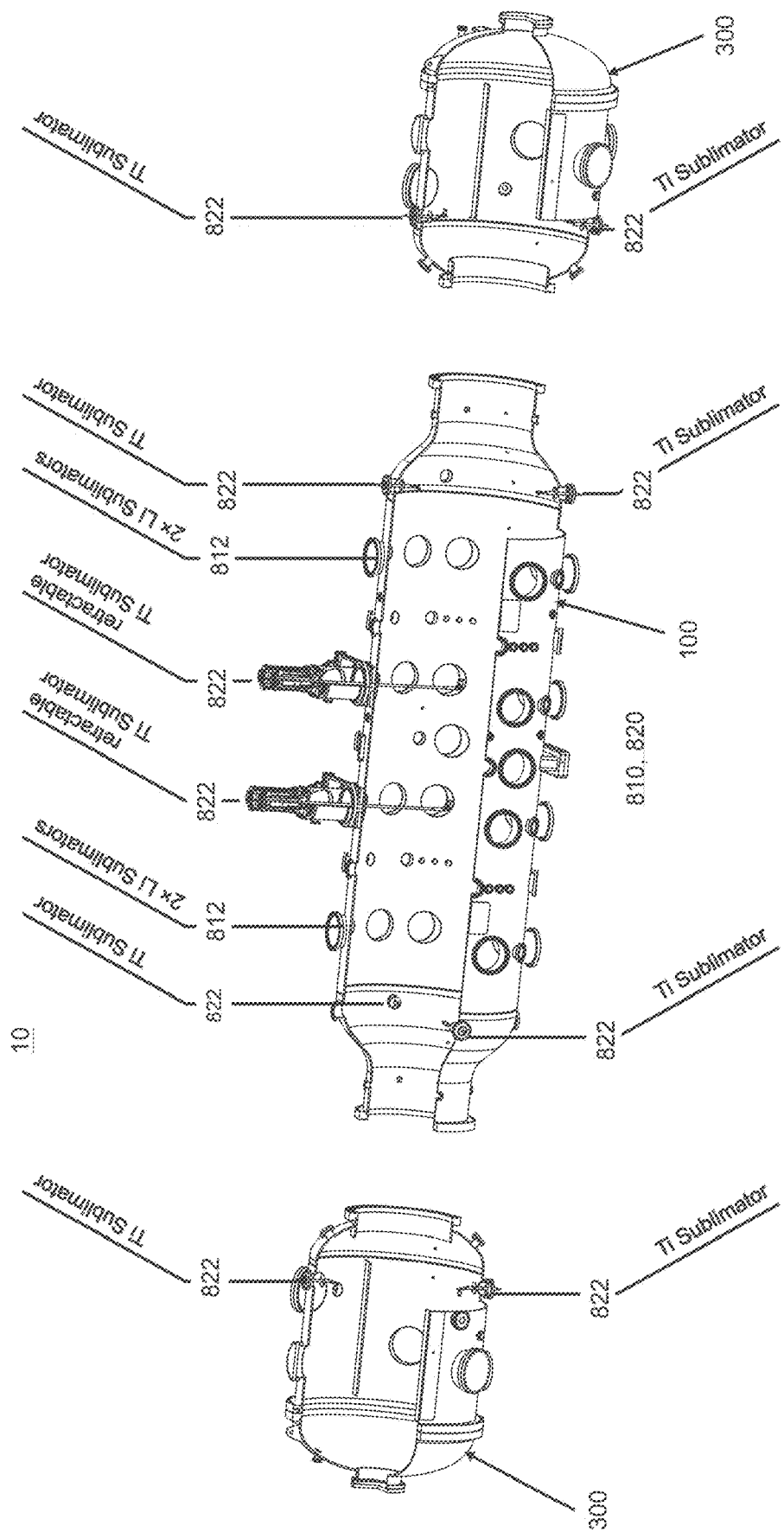
FIG. 9 illustrates a partial sectional isometric view of a preferred arrangement of the Ti and Li gettering systems.

Surface conditioning is a means by which the detrimental effects of neutral gas and impurities can be controlled or reduced in a confinement system. To this end the FRC system 10 provided herein employs Titanium and Lithium deposition systems 810 and 820 that coat the plasma facing surfaces of the confinement chamber (or vessel) 100 and divertors 300 and 302 with films (tens of micrometers thick) of Ti and/or Li. The coatings are achieved via vapor deposition techniques. Solid Li and/or Ti are evaporated and/or sublimated and sprayed onto nearby surfaces to form the coatings. The sources are atomic ovens with guide nozzles (in case of Li) 822 or heated spheres of solid with guide shrouding (in case of Ti) 812. Li evaporator systems typically operate in a continuous mode while Ti sublimators are mostly operated intermittently in between plasma operation. Operating temperatures of these systems are above 600° C. to obtain fast deposition rates. To achieve good wall coverage, multiple strategically located evaporator/sublimator systems are necessary. FIG. 9 details a preferred arrangement of the gettering deposition systems 810 and 820 in the FRC system 10. The coatings act as gettering surfaces and effectively pump atomic and molecular hydrogenic species (H and D). The coatings also reduce other typical impurities such as carbon and oxygen to insignificant levels.

Mirror Plugs

As stated above, the FRC system 10 employs sets of mirror coils 420, 430, and 444 as shown in FIGS. 2 and 3. A first set of mirror coils 420 is located at the two axial ends of the confinement chamber 100 and is independently energized from the DC confinement, formation and divertor coils 412, 414 and 416 of the main magnetic system 410. The first set of mirror coils 420 primarily helps to steer and axially contain the FRC 450 during merging and provides equilibrium shaping control during sustainment. The first mirror coil set 420 produces nominally higher magnetic fields (around 0.4 to 0.5 T) than the central confinement field produced by the central confinement coils 412. The second set of mirror coils 430, which includes three compact quasi-dc mirror coils 432, 434 and 436, is located between the formation sections 200 and the divertors 300 and are driven by a common switching power supply. The mirror coils 432, 434 and 436, together with the more compact pulsed mirror plug coils 444 (fed by a capacitive power supply) and the physical constriction 442 form the mirror plugs 440 that provide a narrow low gas conductance path with very high magnetic fields (between 2 to 4 T with rise times of about 10 to 20 ms). The most compact pulsed mirror coils 444 are of compact radial dimensions, bore of 20 cm and similar length, compared to the meter-plus-scale bore and pancake design of the confinement coils 412, 414 and 416. The purpose of the mirror plugs 440 is multifold: (1) The coils 432, 434, 436 and 444 tightly bundle and guide the magnetic flux surfaces 452 and end-streaming plasma jets 454 into the remote divertor chambers 300. This assures that the exhaust particles reach the divertors 300 appropriately and that there are continuous flux surfaces 455 that trace from the open field line 452 region of the central FRC 450 all the way to the divertors 300. (2) The physical constrictions 442 in the FRC system 10, through which that the coils 432, 434, 436 and 444 enable passage of the magnetic flux surfaces 452 and plasma jets 454, provide an impediment to neutral gas flow from the plasma guns 350 that sit in the divertors 300. In the same vein, the constrictions 442 prevent back-streaming of gas from the formation sections 200 to the divertors 300 thereby reducing the number of neutral particles that has to be introduced into the entire FRC system 10 when commencing the startup of an FRC. (3) The strong axial mirrors produced by the coils 432, 434, 436 and 444 reduce axial particle losses and thereby reduce the parallel particle diffusivity on open field lines.

In the alternative configuration shown in FIGS. 3D and 3E, a set of low profile necking coils 421 are positions between the inner divertors 302 and the formations sections 200.

Axial Plasma Guns

Figure 10:
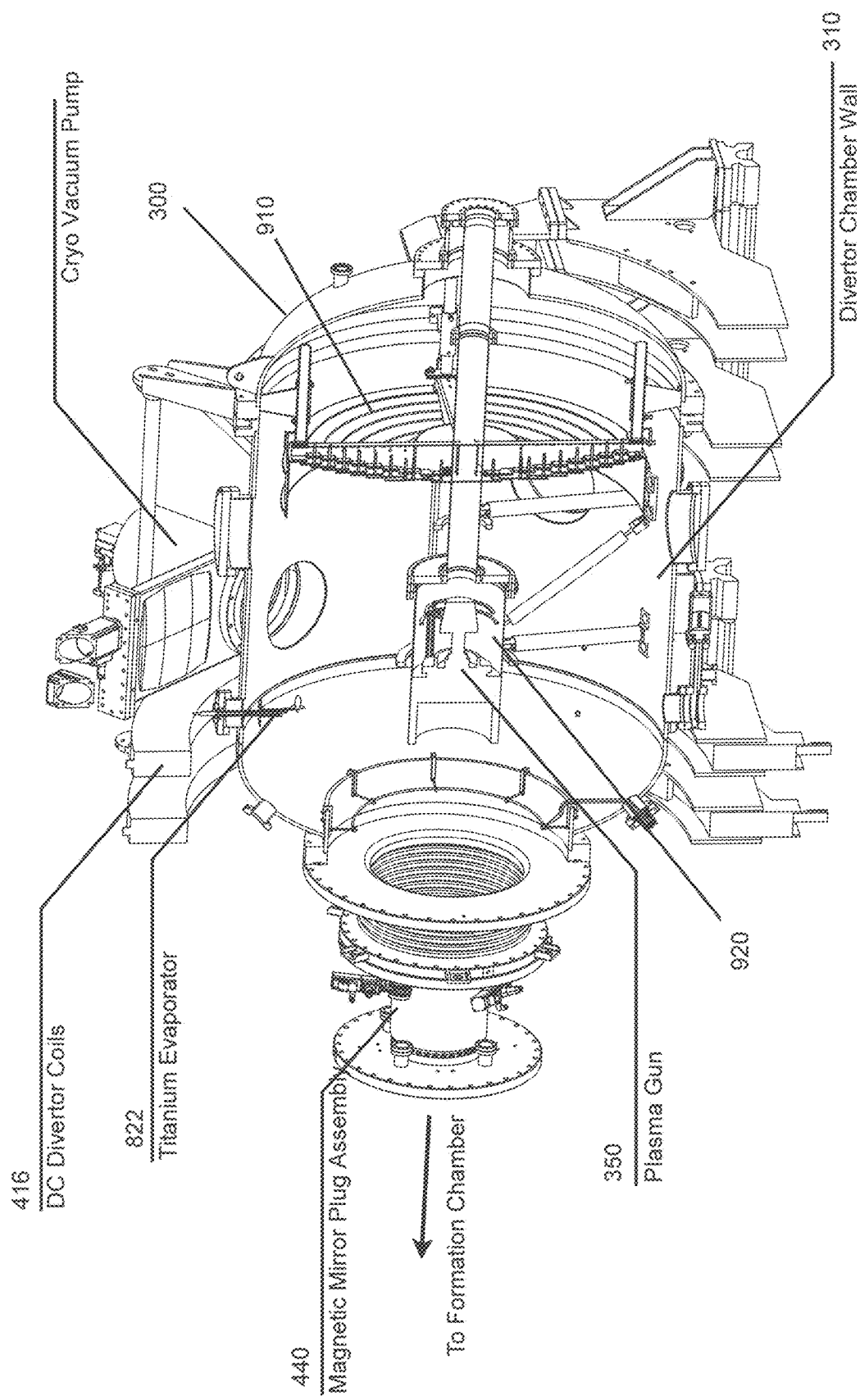
FIG. 10 illustrates a partial sectional isometric view of a plasma gun installed in the divertor chamber. Also shown are the associated magnetic mirror plug and a divertor electrode assembly.

Plasma streams from guns 350 mounted in the divertor chambers 310 of the divertors 300 are intended to improve stability and neutral beam performance. The guns 350 are mounted on axis inside the chamber 310 of the divertors 300 as illustrated in FIGS. 3 and 10 and produce plasma flowing along the open flux lines 452 in the divertor 300 and towards the center of the confinement chamber 100. The guns 350 operate at a high density gas discharge in a washer-stack channel and are designed to generate several kiloamperes of fully ionized plasma for 5 to 10 ms. The guns 350 include a pulsed magnetic coil that matches the output plasma stream with the desired size of the plasma in the confinement chamber 100. The technical parameters of the guns 350 are characterized by a channel having a 5 to 13 cm outer diameter and up to about 10 cm inner diameter and provide a discharge current of 10-15 kA at 400-600 V with a gun-internal magnetic field of between 0.5 to 2.3 T.

The gun plasma streams can penetrate the magnetic fields of the mirror plugs 440 and flow into the formation section 200 and confinement chamber 100. The efficiency of plasma transfer through the mirror plug 440 increases with decreasing distance between the gun 350 and the plug 440 and by making the plug 440 wider and shorter. Under reasonable conditions, the guns 350 can each deliver approximately $10^{22}$ protons/s through the 2 to 4 T mirror plugs 440 with high ion and electron temperatures of about 150 to 300 eV and about 40 to 50 eV, respectively. The guns 350 provide significant refueling of the FRC edge layer 456, and an improved overall FRC particle confinement.

To further increase the plasma density, a gas box could be utilized to puff additional gas into the plasma stream from the guns 350. This technique allows a several-fold increase in the injected plasma density. In the FRC system 10, a gas box installed on the divertor 300 side of the mirror plugs 440 improves the refueling of the FRC edge layer 456, formation of the FRC 450, and plasma line-tying.

Given all the adjustment parameters discussed above and also taking into account that operation with just one or both guns is possible, it is readily apparent that a wide spectrum of operating modes is accessible.

Biasing Electrodes

Electrical biasing of open flux surfaces can provide radial potentials that give rise to azimuthal E×B motion that provides a control mechanism, analogous to turning a knob, to control rotation of the open field line plasma as well as the actual FRC core 450 via velocity shear. To accomplish this control, the FRC system 10 employs various electrodes strategically placed in various parts of the machine. FIG. 3 depicts biasing electrodes positioned at preferred locations within the FRC system 10.

Figure 11:
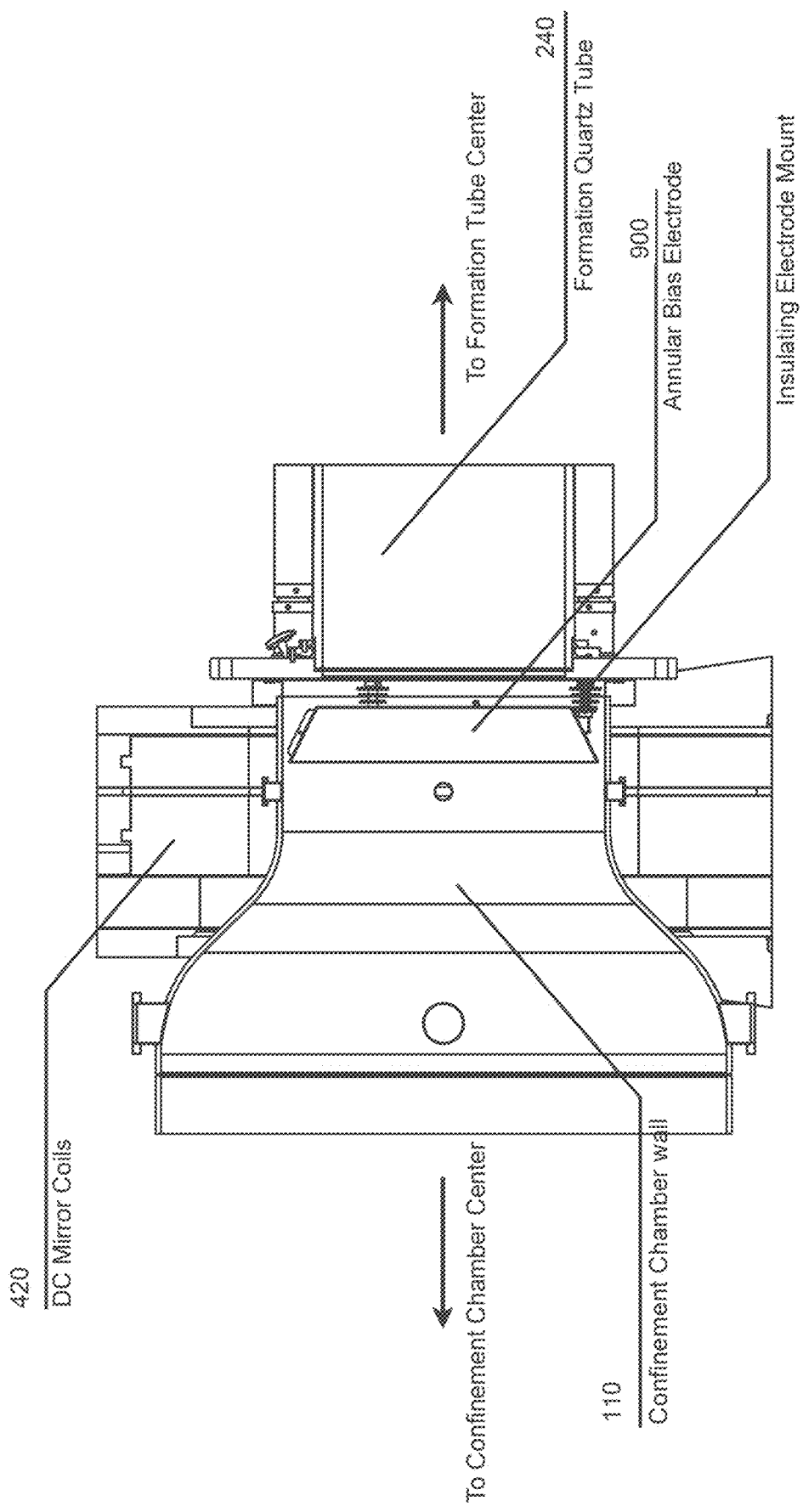
FIG. 11 illustrates a preferred layout of an annular bias electrode at the axial end of the confinement chamber.

In principle, there are 4 classes of electrodes: (1) point electrodes 905 in the confinement chamber 100 that make contact with particular open field lines 452 in the edge of the FRC 450 to provide local charging, (2) annular electrodes 900 between the confinement chamber 100 and the formation sections 200 to charge far-edge flux layers 456 in an azimuthally symmetric fashion, (3) stacks of concentric electrodes 910 in the divertors 300 to charge multiple concentric flux layers 455 (whereby the selection of layers is controllable by adjusting coils 416 to adjust the divertor magnetic field so as to terminate the desired flux layers 456 on the appropriate electrodes 910), and finally (4) the anodes 920 (see FIG. 10) of the plasma guns 350 themselves (which intercept inner open flux surfaces 455 near the separatrix of the FRC 450). FIGS. 10 and 11 show some typical designs for some of these.

In all cases these electrodes are driven by pulsed or dc power sources at voltages up to about 800 V. Depending on electrode size and what flux surfaces are intersected, currents can be drawn in the kilo-ampere range.

Un-Sustained Operation of FRC System—Conventional Regime

The standard plasma formation on the FRC system 10 follows the well-developed reversed-field-theta-pinch technique. A typical process for starting up an FRC commences by driving the quasi-dc coils 412, 414, 416, 420, 432, 434 and 436 to steady state operation. The RFTP pulsed power circuits of the pulsed power formation systems 210 then drive the pulsed fast reversed magnet field coils 232 to create a temporary reversed bias of about −0.05 T in the formation sections 200. At this point a predetermined amount of neutral gas at 9-20 psi is injected into the two formation volumes defined by the quartz-tube chambers 240 of the (north and south) formation sections 200 via a set of azimuthally-oriented puff-vales at flanges located on the outer ends of the formation sections 200. Next a small RF (~hundreds of kilo-hertz) field is generated from a set of antennas on the surface of the quartz tubes 240 to create pre-ionization in the form of local seed ionization regions within the neutral gas columns. This is followed by applying a theta-ringing modulation on the current driving the pulsed fast reversed magnet field coils 232, which leads to more global pre-ionization of the gas columns. Finally, the main pulsed power banks of the pulsed power formation systems 210 are fired to drive pulsed fast reversed magnet field coils 232 to create a forward-biased field of up to 0.4 T. This step can be time-sequenced such that the forward-biased field is generated uniformly throughout the length of the formation tubes 240 (static formation) or such that a consecutive peristaltic field modulation is achieved along the axis of the formation tubes 240 (dynamic formation).

In this entire formation process, the actual field reversal in the plasma occurs rapidly, within about 5 µs. The multi-gigawatt pulsed power delivered to the forming plasma readily produces hot FRCs which are then ejected from the formation sections 200 via application of either a time-sequenced modulation of the forward magnetic field (magnetic peristalsis) or temporarily increased currents in the last coils of coil sets 232 near the axial outer ends of the formation tubes 210 (forming an axial magnetic field gradient that points axially towards the confinement chamber 100). The two (north and south) formation FRCs so formed and accelerated then expand into the larger diameter confinement chamber 100, where the quasi-dc coils 412 produce a forward-biased field to control radial expansion and provide the equilibrium external magnetic flux.

Once the north and south formation FRCs arrive near the midplane of the confinement chamber 100, the FRCs collide. During the collision the axial kinetic energies of the north and south formation FRCs are largely thermalized as the FRCs merge ultimately into a single FRC 450. A large set of plasma diagnostics are available in the confinement chamber 100 to study the equilibria of the FRC 450. Typical operating conditions in the FRC system 10 produce compound FRCs with separatrix radii of about 0.4 m and about 3 m axial extend. Further characteristics are external magnetic fields of about 0.1 T, plasma densities around $5 \times 10^{19}$ m$^{-3}$ and total plasma temperature of up to 1 keV. Without any sustainment, i.e., no heating and/or current drive via neutral beam injection or other auxiliary means, the lifetime of these FRCs is limited to about 1 ms, the indigenous characteristic configuration decay time.

Experimental Data of Unsustained Operation—Conventional Regime

Figure 12:
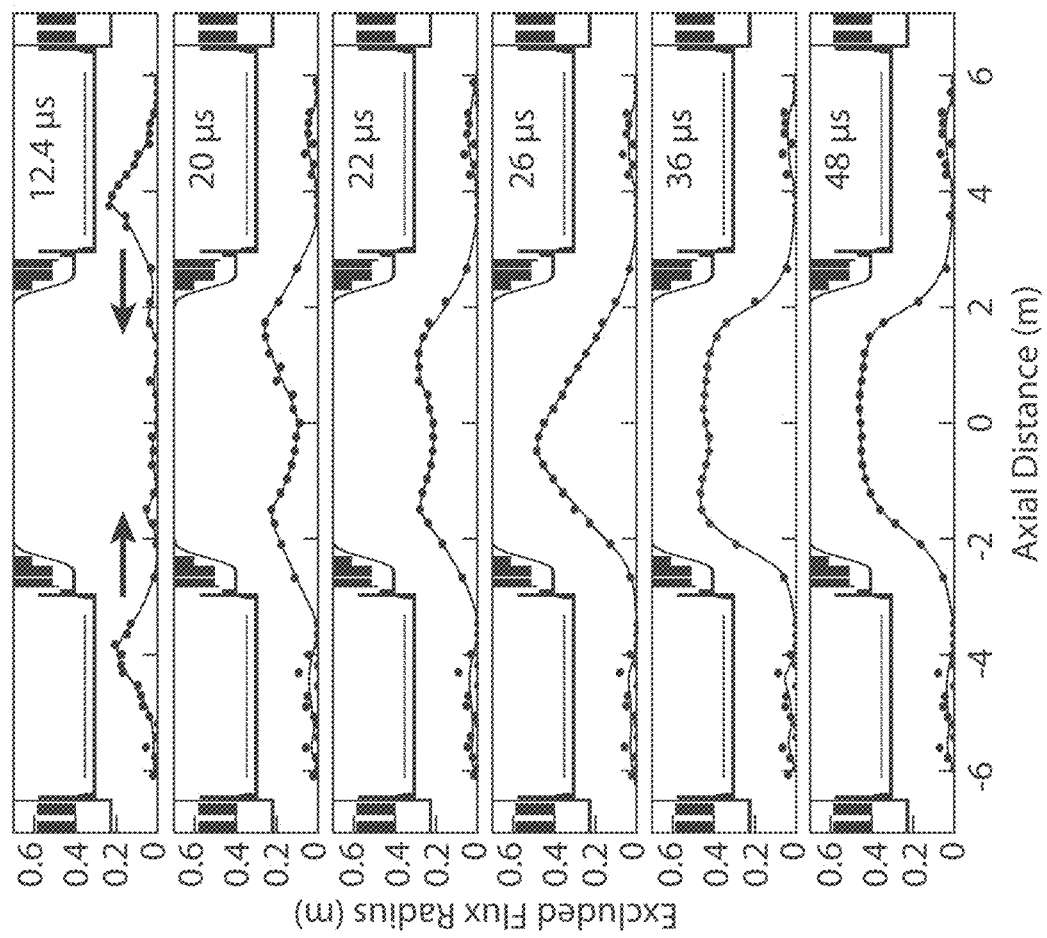
FIG. 12 illustrates the evolution of the excluded flux radius in the FRC system obtained from a series of external diamagnetic loops at the two field reversed theta pinch formation sections and magnetic probes embedded inside the central metal confinement chamber. Time is measured from the instant of synchronized field reversal in the formation sources, and distance z is given relative to the axial midplane of the machine.

FIG. 12 shows a typical time evolution of the excluded flux radius, $r_{\Delta\Phi}$, which approximates the separatrix radius, $r_s$, to illustrate the dynamics of the theta-pinch merging process of the FRC 450. The two (north and south) individual plasmoids are produced simultaneously and then accelerated out of the respective formation sections 200 at a supersonic speed, vz~250 km/s, and collide near the midplane at z=0. During the collision the plasmoids compress axially, followed by a rapid radial and axial expansion, before eventually merging to form an FRC 450. Both radial and axial dynamics of the merging FRC 450 are evidenced by detailed density profile measurements and bolometer-based tomography.

Figure 13A:
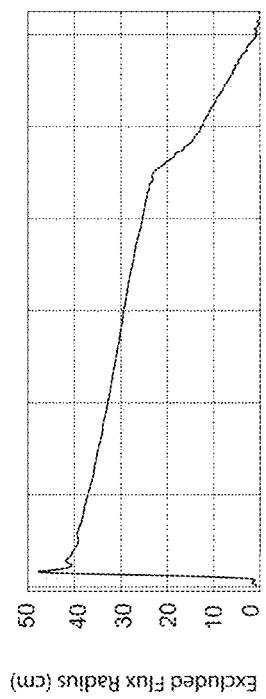
FIGS. 13A, 13B, 13C and 13D illustrate data from a representative non-HPF, un-sustained discharge on the present FRC system. Shown as functions of time are (FIG. 13A) excluded flux radius at the midplane, (FIG. 13B) 6 chords of line-integrated density from the midplane CO2 interferometer, (FIG. 13C) Abel-inverted density radial profiles from the CO2 interferometer data, and (FIG. 13D) total plasma temperature from pressure balance.

Data from a representative un-sustained discharge of the FRC system 10 are shown as functions of time in FIGS. 13A, 13B, 13C and 13D. The FRC is initiated at t=0. The excluded flux radius at the machine's axial mid-plane is shown in FIG. 13A. This data is obtained from an array of magnetic probes, located just inside the confinement chamber's stainless steel wall, that measure the axial magnetic field. The steel wall is a good flux conserver on the time scales of this discharge.

Figure 13B:
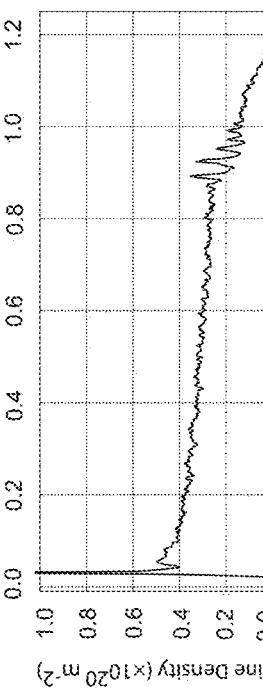
Figure 13C:
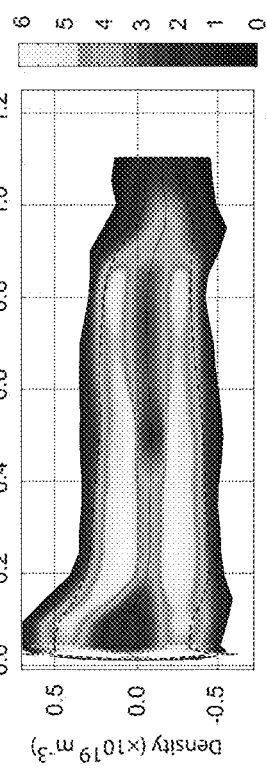

Line-integrated densities are shown in FIG. 13B, from a 6-chord $CO_2$/He—Ne interferometer located at z=0. Taking into account vertical (y) FRC displacement, as measured by bolometric tomography, Abel inversion yields the density contours of FIG. 13C. After some axial and radial sloshing during the first 0.1 ms, the FRC settles with a hollow density profile. This profile is fairly flat, with substantial density on axis, as required by typical 2-D FRC equilibria.

Figure 13D:
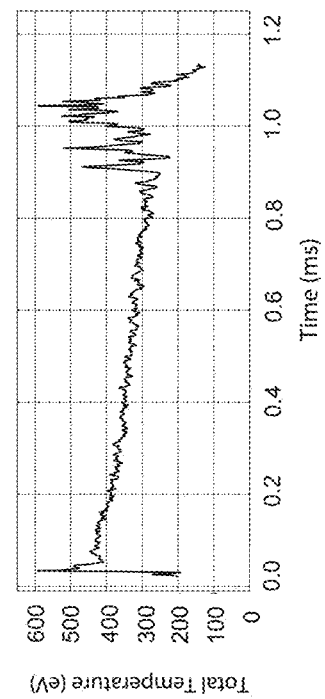

Total plasma temperature is shown in FIG. 13D, derived from pressure balance and fully consistent with Thomson scattering and spectroscopy measurements.

Figure 14:
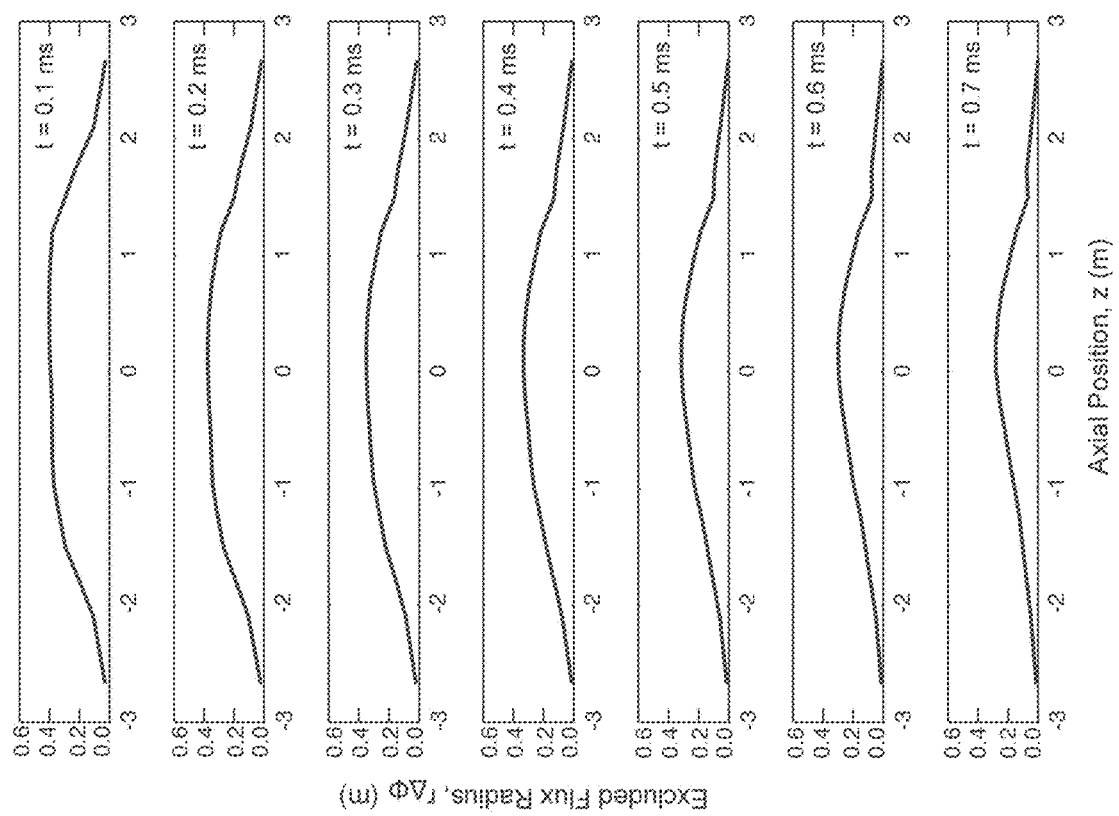
FIG. 14 illustrates the excluded flux axial profiles at selected times for the same discharge of the present FRC system shown in FIGS. 13A, 13B, 13C and 13D.

Analysis from the entire excluded flux array indicates that the shape of the FRC separatrix (approximated by the excluded flux axial profiles) evolves gradually from racetrack to elliptical. This evolution, shown in FIG. 14, is consistent with a gradual magnetic reconnection from two to a single FRC. Indeed, rough estimates suggest that in this particular instant about 10% of the two initial FRC magnetic fluxes reconnects during the collision.

The FRC length shrinks steadily from 3 down to about 1 m during the FRC lifetime. This shrinkage, visible in FIG. 14, suggests that mostly convective energy loss dominates the FRC confinement. As the plasma pressure inside the separatrix decreases faster than the external magnetic pressure, the magnetic field line tension in the end regions compresses the FRC axially, restoring axial and radial equilibrium. For the discharge discussed in FIGS. 13 and 14, the FRC magnetic flux, particle inventory, and thermal energy (about 10 mWb, $7 \times 10^{19}$ particles, and 7 kJ, respectively) decrease by roughly an order of magnitude in the first millisecond, when the FRC equilibrium appears to subside.

Sustained Operation—HPF Regime

The examples in FIGS. 12 to 14 are characteristic of decaying FRCs without any sustainment. However, several techniques are deployed on the FRC system 10 to further improve FRC confinement (inner core and edge layer) to the HPF regime and sustain the configuration.

Neutral Beams

First, fast (H) neutrals are injected perpendicular to $B_z$ in beams from the eight neutral beam injectors 600. The beams of fast neutrals are injected from the moment the north and south formation FRCs merge in the confinement chamber 100 into one FRC 450. The fast ions, created primarily by charge exchange, have betatron orbits (with primary radii on the scale of the FRC topology or at least much larger than the characteristic magnetic field gradient length scale) that add to the azimuthal current of the FRC 450. After some fraction of the discharge (after 0.5 to 0.8 ms into the shot), a sufficiently large fast ion population significantly improves the inner FRC's stability and confinement properties (see e.g. M W. Binderbauer and N. Rostoker, *Plasma Phys.* 56, part 3, 451 (1996)). Furthermore, from a sustainment perspective, the beams from the neutral beam injectors 600 are also the primary means to drive current and heat the FRC plasma.

In the plasma regime of the FRC system 10, the fast ions slow down primarily on plasma electrons. During the early part of a discharge, typical orbit-averaged slowing-down times of fast ions are 0.3-0.5 ms, which results in significant FRC heating, primarily of electrons. The fast ions make large radial excursions outside of the separatrix because the internal FRC magnetic field is inherently low (about 0.03 T on average for a 0.1 T external axial field). The fast ions would be vulnerable to charge exchange loss, if the neutral gas density were too high outside of the separatrix. Therefore, wall gettering and other techniques (such as the plasma gun 350 and mirror plugs 440 that contribute, amongst other things, to gas control) deployed on the FRC system 10 tend to minimize edge neutrals and enable the required build-up of fast ion current.

Pellet Injection

When a significant fast ion population is built up within the FRC 450, with higher electron temperatures and longer FRC lifetimes, frozen H or D pellets are injected into the FRC 450 from the pellet injector 700 to sustain the FRC particle inventory of the FRC 450. The anticipated ablation timescales are sufficiently short to provide a significant FRC particle source. This rate can also be increased by enlarging the surface area of the injected piece by breaking the individual pellet into smaller fragments while in the barrels or injection tubes of the pellet injector 700 and before entering the confinement chamber 100, a step that can be achieved by increasing the friction between the pellet and the walls of the injection tube by tightening the bend radius of the last segment of the injection tube right before entry into the confinement chamber 100. By virtue of varying the firing sequence and rate of the 12 barrels (injection tubes) as well as the fragmentation, it is possible to tune the pellet injection system 700 to provide just the desired level of particle inventory sustainment. In turn, this helps maintain the internal kinetic pressure in the FRC 450 and sustained operation and lifetime of the FRC 450.

Once the ablated atoms encounter significant plasma in the FRC 450, they become fully ionized. The resultant cold plasma component is then collisionally heated by the indigenous FRC plasma. The energy necessary to maintain a desired FRC temperature is ultimately supplied by the beam injectors 600. In this sense the pellet injectors 700 together with the neutral beam injectors 600 form the system that maintains a steady state and sustains the FRC 450.

CT Injector

Figure 22A:
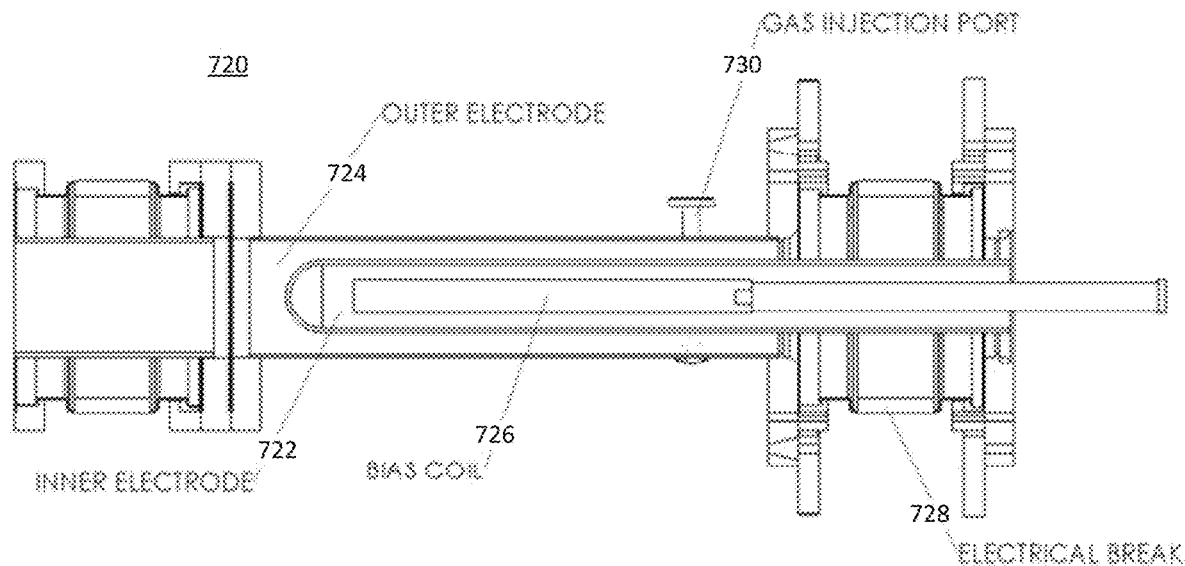
FIGS. 22A and 22B illustrate the basic layout of a compact toroid (CT) injector.
Figure 22B:
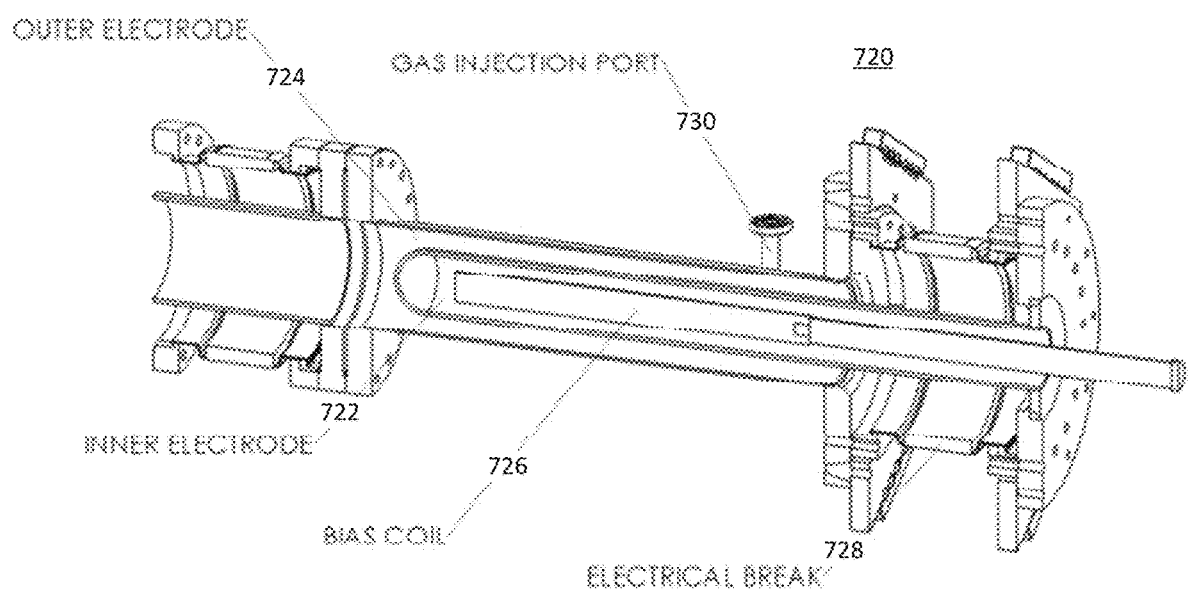
Figure 23A:
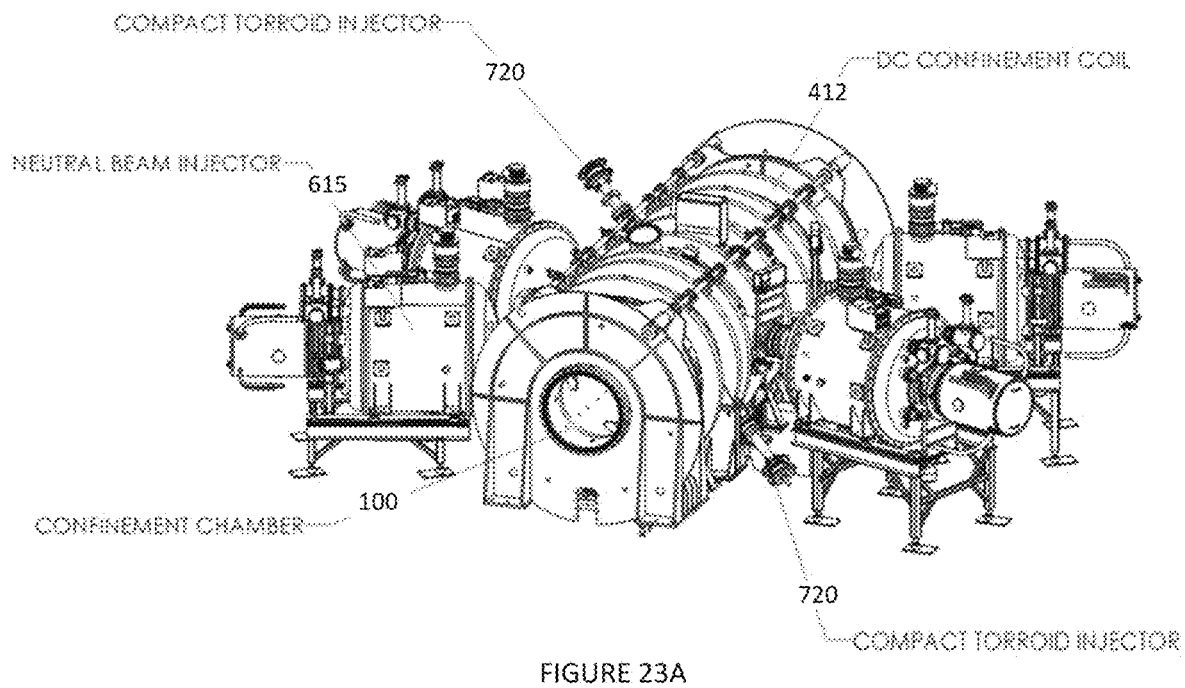
FIGS. 23A and 23B illustrate the central confinement vessel showing the CT injector mounted thereto.
Figure 23B:
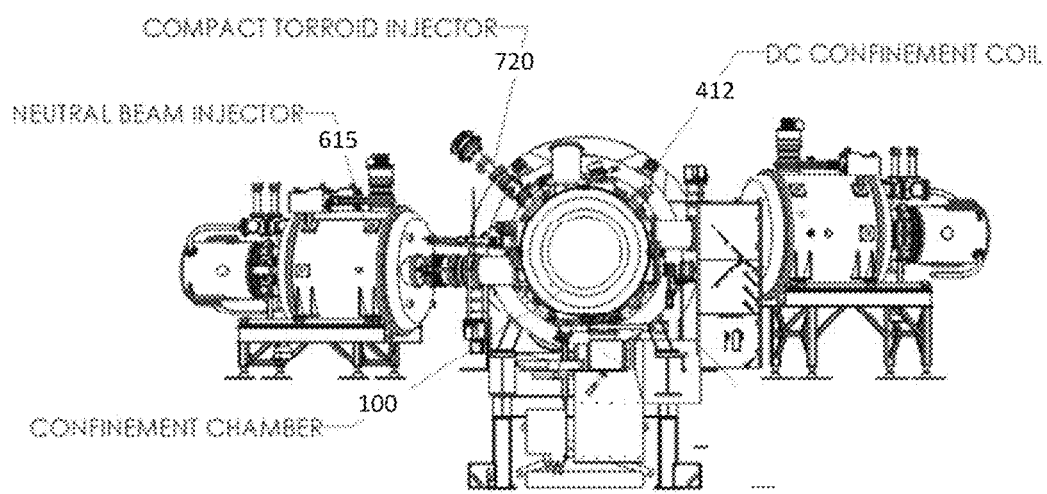

As an alternative to the pellet injector, a compact toroid (CT) injector is provided, mainly for fueling field-reversed configuration (FRCs) plasmas. The CT injector 720 comprises a magnetized coaxial plasma-gun (MCPG), which, as shown in FIGS. 22A and 22B, includes coaxial cylindrical inner and outer electrodes 722 and 724, a bias coil positioned internal to the inner electrode 726 and an electrical break 728 on an end opposite the discharge of the CT injector 720. Gas is injected through a gas injection port 730 into a space between the inner and outer electrodes 722 and 724 and a Spheromak-like plasma is generated therefrom by discharge and pushed out from the gun by Lorentz force. As shown in FIGS. 23A and 23B, a pair of CT injectors 720 are coupled to the confinement vessel 100 near and on opposition sides of the mid-plane of the vessel 100 to inject CTs into the central FRC plasma within the confinement vessel 100. The discharge end of the CT injectors 720 are directed towards the mid-plane of the confinement vessel 100 at an angel to the longitudinal axis of the confinement vessel 100 similar to the neutral beam injectors 615.

Figure 24A:
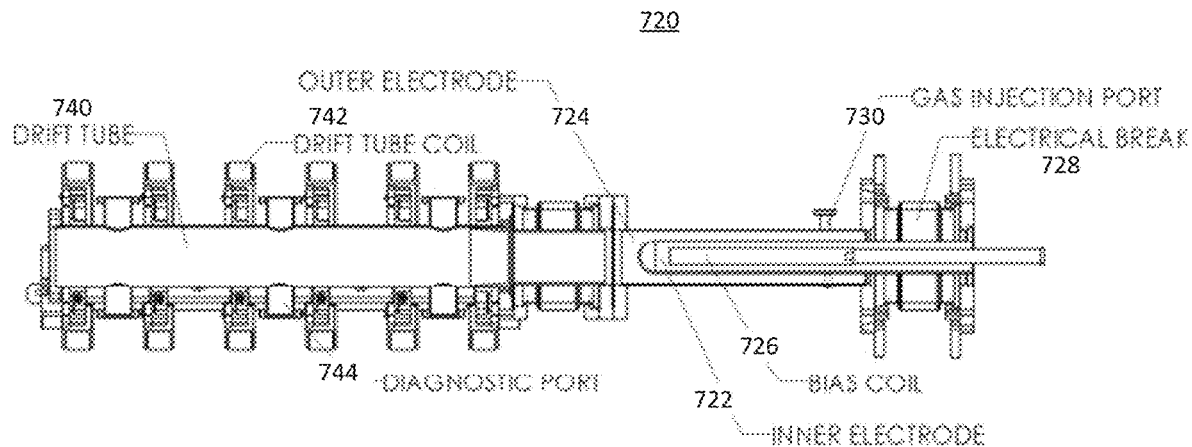
FIGS. 24A and 24B illustrate the basic layout of an alternative embodiment of the CT injector having a drift tube coupled thereto.
Figure 24B:
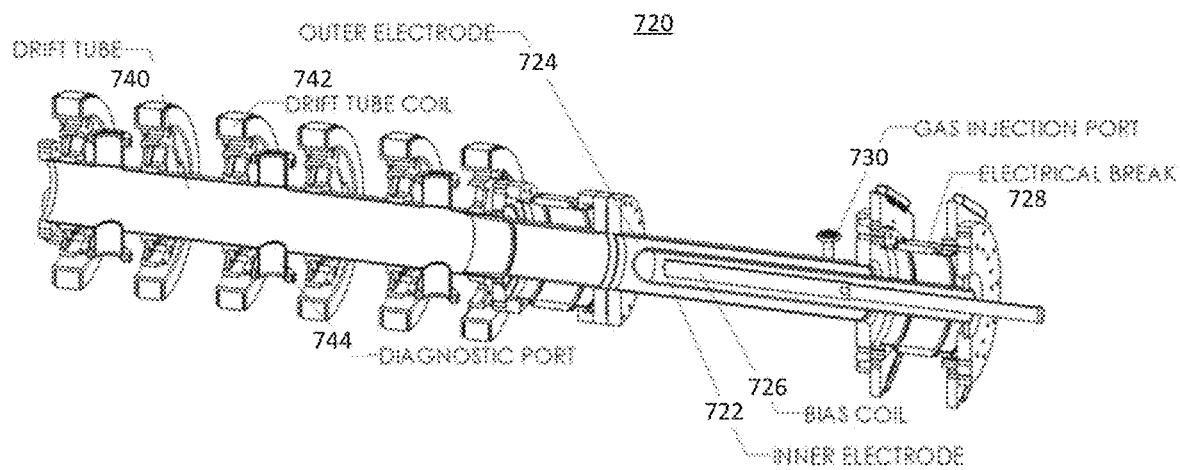

In an alternative embodiment, the CT injector 720, as shown in FIGS. 24A and 24B, includes a drift tube 740 comprising an elongate cylindrical tube coupled to the discharge end of the CT injector 720. As depicted, the drift tube 740 includes drift tube coils 742 positioned about and axially spaced along the tube. A plurality of diagnostic ports 744 are depicted along the length of the tube.

The advantages of the CT injector 720 are: (1) control and adjustability of particle inventory per injected CT; (2) warm plasma is deposited (instead of cryogenic pellets); (3) system can be operated in rep-rate mode so as to allow for continuous fueling; (4) the system can also restore some magnetic flux as the injected CTs carry embedded magnetic field. In an embodiment for experimental use, the inner diameter of an outer electrode is 83.1 mm and the outer diameter of an inner electrode is 54.0 mm. The surface of the inner electrode 722 is preferably coated with tungsten in order to reduce impurities coming out from the electrode 722. As depicted, the bias coil 726 is mounted inside of the inner electrode 722.

In recent experiments a supersonic CT translation speed of up to ~100 km/s was achieved. Other typical plasma parameters are as follows: electron density~5×1021 m−3, electron temperature~30-50 eV, and particle inventory of ~0.5-1.0×1019. The high kinetic pressure of the CT allows the injected plasma to penetrate deeply into the FRC and deposit the particles inside the separatrix. In recent experiments FRC particle fueling has resulted in ~10-20% of the FRC particle inventory being provide by the CT injectors successfully demonstrating fueling can readily be carried out without disrupting the FRC plasma.

Saddle Coils

To achieve steady state current drive and maintain the required ion current it is desirable to prevent or significantly reduce electron spin up due to the electron-ion frictional force (resulting from collisional ion electron momentum transfer). The FRC system 10 utilizes an innovative technique to provide electron breaking via an externally applied static magnetic dipole or quadrupole field. This is accomplished via the external saddle coils 460 depicted in FIG. 15. The transverse applied radial magnetic field from the saddle coils 460 induces an axial electric field in the rotating FRC plasma. The resultant axial electron current interacts with the radial magnetic field to produce an azimuthal breaking force on the electrons, $F_\theta = -\sigma V_{e\theta} <|B_r|^2>$. For typical conditions in the FRC system 10, the required applied magnetic dipole (or quadrupole) field inside the plasma needs to be only of order 0.001 T to provide adequate electron breaking. The corresponding external field of about 0.015 T is small enough to not cause appreciable fast particle losses or otherwise negatively impact confinement. In fact, the applied magnetic dipole (or quadrupole) field contributes to suppress instabilities. In combination with tangential neutral beam injection and axial plasma injection, the saddle coils 460 provide an additional level of control with regards to current maintenance and stability.

Mirror Plugs

The design of the pulsed coils 444 within the mirror plugs 440 permits the local generation of high magnetic fields (2 to 4 T) with modest (about 100 kJ) capacitive energy. For formation of magnetic fields typical of the present operation of the FRC system 10, all field lines within the formation volume are passing through the constrictions 442 at the mirror plugs 440, as suggested by the magnetic field lines in FIG. 2 and plasma wall contact does not occur. Furthermore, the mirror plugs 440 in tandem with the quasi-dc divertor magnets 416 can be adjusted so to guide the field lines onto the divertor electrodes 910, or flare the field lines in an end cusp configuration (not shown). The latter improves stability and suppresses parallel electron thermal conduction.

The mirror plugs 440 by themselves also contribute to neutral gas control. The mirror plugs 440 permit a better utilization of the deuterium gas puffed in to the quartz tubes during FRC formation, as gas back-streaming into the divertors 300 is significantly reduced by the small gas conductance of the plugs (a meager 500 L/s). Most of the residual puffed gas inside the formation tubes 210 is quickly ionized. In addition, the high-density plasma flowing through the mirror plugs 440 provides efficient neutral ionization hence an effective gas barrier. As a result, most of the neutrals recycled in the divertors 300 from the FRC edge layer 456 do not return to the confinement chamber 100. In addition, the neutrals associated with the operation of the plasma guns 350 (as discussed below) will be mostly confined to the divertors 300.

Finally, the mirror plugs 440 tend to improve the FRC edge layer confinement. With mirror ratios (plug/confinement magnetic fields) in the range 20 to 40, and with a 15 m length between the north and south mirror plugs 440, the edge layer particle confinement time $\tau_\parallel$ increases by up to an order of magnitude. Improving $\tau_\parallel$ readily increases the FRC particle confinement.

Assuming radial diffusive (D) particle loss from the separatrix volume 453 balanced by axial loss ($\tau_\parallel$) from the edge layer 456, one obtains $(2\pi r_s L_s)(Dn_s/\delta) = (2\pi r_s L_s \delta)(n_s/\tau_\parallel)$, from which the separatrix density gradient length can be rewritten as $\delta = (D\tau_\parallel)^{1/2}$. Here $r_s$, $L_s$ and $n_s$ are separatrix radius, separatrix length and separatrix density, respectively. The FRC particle confinement time is $\tau_N = [\pi r_s^2 L_s <n>]/[(2\pi r_s L_s)(Dn_s/\delta)] = (<n>/n_s)(\tau_\perp \tau_\parallel)^{1/2}$, where $\tau_\perp = a^2/D$ with $a = r_s/4$. Physically, improving $\tau_\parallel$ leads to increased $\delta$ (reduced separatrix density gradient and drift parameter), and, therefore, reduced FRC particle loss. The overall improvement in FRC particle confinement is generally somewhat less than quadratic because $n_s$ increases with $\tau_\parallel$.

A significant improvement in $\tau_\parallel$ also requires that the edge layer 456 remains grossly stable (i.e., no n=1 flute, firehose, or other MHD instability typical of open systems). Use of the plasma guns 350 provides for this preferred edge stability. In this sense, the mirror plugs 440 and plasma gun 350 form an effective edge control system.

Plasma Guns

The plasma guns 350 improve the stability of the FRC exhaust jets 454 by line-tying. The gun plasmas from the plasma guns 350 are generated without azimuthal angular momentum, which proves useful in controlling FRC rotational instabilities. As such the guns 350 are an effective means to control FRC stability without the need for the older quadrupole stabilization technique. As a result, the plasma guns 350 make it possible to take advantage of the beneficial effects of fast particles or access the advanced hybrid kinetic FRC regime as outlined in this disclosure. Therefore, the plasma guns 350 enable the FRC system 10 to be operated with saddle coil currents just adequate for electron breaking but below the threshold that would cause FRC instability and/or lead to dramatic fast particle diffusion.

As mentioned in the Mirror Plug discussion above, if $\tau_\parallel$ can be significantly improved, the supplied gun plasma would be comparable to the edge layer particle loss rate (~$10^{22}$/s). The lifetime of the gun-produced plasma in the FRC system 10 is in the millisecond range. Indeed, consider the gun plasma with density $n_e \sim 10^{13}$ cm$^{-3}$ and ion temperature of about 200 eV, confined between the end mirror plugs 440. The trap length L and mirror ratio R are about 15 m and 20, respectively. The ion mean free path due to Coulomb collisions is $\lambda_{ii} \sim 6 \times 10^3$ cm and, since $\lambda_{ii} \ln R/R < L$, the ions are confined in the gas-dynamic regime. The plasma confinement time in this regime is $\tau_{gd} \sim RL/2V_s \sim 2$ ms, where $V_s$ is the ion sound speed. For comparison, the classical ion confinement time for these plasma parameters would be $\tau_c \sim 0.5\tau_{ii}(\ln R + (\ln R)^{0.5}) \sim 0.7$ ms. The anomalous transverse diffusion may, in principle, shorten the plasma confinement time. However, in the FRC system 10, if we assume the Bohm diffusion rate, the estimated transverse confinement time for the gun plasma is $\tau_\perp > \tau_{gd} \sim 2$ ms. Hence, the guns would provide significant refueling of the FRC edge layer 456, and an improved overall FRC particle confinement.

Furthermore, the gun plasma streams can be turned on in about 150 to 200 microseconds, which permits use in FRC start-up, translation, and merging into the confinement chamber 100. If turned on around t~0 (FRC main bank initiation), the gun plasmas help to sustain the present dynamically formed and merged FRC 450. The combined particle inventories from the formation FRCs and from the guns is adequate for neutral beam capture, plasma heating, and long sustainment. If turned on at tin the range −1 to 0 ms, the gun plasmas can fill the quartz tubes 210 with plasma or ionize the gas puffed into the quartz tubes, thus permitting FRC formation with reduced or even perhaps zero puffed gas. The latter may require sufficiently cold formation plasma to permit fast diffusion of the reversed bias magnetic field. If turned on at t<−2 ms, the plasma streams could fill the about 1 to 3 m³ field line volume of the formation and confinement regions of the formation sections 200 and confinement chamber 100 with a target plasma density of a few $10^{13}$ cm$^{-3}$, sufficient to allow neutral beam build-up prior to FRC arrival. The formation FRCs could then be formed and translated into the resulting confinement vessel plasma. In this way the plasma guns 350 enable a wide variety of operating conditions and parameter regimes.

Electrical Biasing

Control of the radial electric field profile in the edge layer 456 is beneficial in various ways to FRC stability and confinement. By virtue of the innovative biasing components deployed in the FRC system 10 it is possible to apply a variety of deliberate distributions of electric potentials to a group of open flux surfaces throughout the machine from areas well outside the central confinement region in the confinement chamber 100. In this way radial electric fields can be generated across the edge layer 456 just outside of the FRC 450. These radial electric fields then modify the azimuthal rotation of the edge layer 456 and effect its confinement via E×B velocity shear. Any differential rotation between the edge layer 456 and the FRC core 453 can then be transmitted to the inside of the FRC plasma by shear. As a result, controlling the edge layer 456 directly impacts the FRC core 453. Furthermore, since the free energy in the plasma rotation can also be responsible for instabilities, this technique provides a direct means to control the onset and growth of instabilities. In the FRC system 10, appropriate edge biasing provides an effective control of open field line transport and rotation as well as FRC core rotation. The location and shape of the various provided electrodes 900, 905, 910 and 920 allows for control of different groups of flux surfaces 455 and at different and independent potentials. In this way a wide array of different electric field configurations and strengths can be realized, each with different characteristic impact on plasma performance.

A key advantage of all these innovative biasing techniques is the fact that core and edge plasma behavior can be affected from well outside the FRC plasma, i.e. there is no need to bring any physical components in touch with the central hot plasma (which would have severe implications for energy, flux and particle losses). This has a major beneficial impact on performance and all potential applications of the HPF concept.

Experimental Data—HPF Operation

Injection of fast particles via beams from the neutral beam guns 600 plays an important role in enabling the HPF regime. FIGS. 16A, 16B, 16C and 16D illustrate this fact. Depicted is a set of curves showing how the FRC lifetime correlates with the length of the beam pulses. All other operating conditions are held constant for all discharges comprising this study. The data is averaged over many shots and, therefore, represents typical behavior. It is clearly evident that longer beam duration produces longer lived FRCs. Looking at this evidence as well as other diagnostics during this study, it demonstrates that beams increase stability and reduce losses. The correlation between beam pulse length and FRC lifetime is not perfect as beam trapping becomes inefficient below a certain plasma size, i.e., as the FRC 450 shrinks in physical size not all of the injected beams are intercepted and trapped. Shrinkage of the FRC is primarily due to the fact that net energy loss (~4 MW about midway through the discharge) from the FRC plasma during the discharge is somewhat larger than the total power fed into the FRC via the neutral beams (~2.5 MW) for the particular experimental setup. Locating the beams at a location closer to the mid-plane of the vessel 100 would tend to reduce these losses and extend FRC lifetime.

FIGS. 17A, 17B, 17C and 17D illustrate the effects of different components to achieve the HPF regime. It shows a family of typical curves depicting the lifetime of the FRC 450 as a function of time. In all cases a constant, modest amount of beam power (about 2.5 MW) is injected for the full duration of each discharge. Each curve is representative of a different combination of components. For example, operating the FRC system 10 without any mirror plugs 440, plasma guns 350 or gettering from the gettering systems 800 results in rapid onset of rotational instability and loss of the FRC topology. Adding only the mirror plugs 440 delays the onset of instabilities and increases confinement. Utilizing the combination of mirror plugs 440 and a plasma gun 350 further reduces instabilities and increases FRC lifetime. Finally adding gettering (Ti in this case) on top of the gun 350 and plugs 440 yields the best results—the resultant FRC is free of instabilities and exhibits the longest lifetime. It is clear from this experimental demonstration that the full combination of components produces the best effect and provides the beams with the best target conditions.

As shown in FIG. 1, the newly discovered HPF regime exhibits dramatically improved transport behavior. FIG. 1 illustrates the change in particle confinement time in the FRC system 10 between the conventionally regime and the HPF regime. As can be seen, it has improved by well over a factor of 5 in the HPF regime. In addition, FIG. 1 details the particle confinement time in the FRC system 10 relative to the particle confinement time in prior conventional FRC experiments. With regards to these other machines, the HPF regime of the FRC system 10 has improved confinement by a factor of between 5 and close to 20. Finally and most importantly, the nature of the confinement scaling of the FRC system 10 in the HPF regime is dramatically different from all prior measurements. Before the establishment of the HPF regime in the FRC system 10, various empirical scaling laws were derived from data to predict confinement times in prior FRC experiments. All those scaling rules depend mostly on the ratio $R^2/\rho_i$, where R is the radius of the magnetic field null (a loose measure of the physical scale of the machine) and $\rho_i$ is the ion larmor radius evaluated in the externally applied field (a loose measure of the applied magnetic field). It is clear from FIG. 1 that long confinement in conventional FRCs is only possible at large machine size and/or high magnetic field. Operating the FRC system 10 in the conventional FRC regime CR tends to follow those scaling rules, as indicated in FIG. 1. However, the HPF regime is vastly superior and shows that much better confinement is attainable without large machine size or high magnetic fields. More importantly, it is also clear from FIG. 1 that the HPF regime results in improved confinement time with reduced plasma size as compared to the CR regime. Similar trends are also visible for flux and energy confinement times, as described below, which have increased by over a factor of 3-8 in the FRC system 10 as well. The breakthrough of the HPF regime, therefore, enables the use of modest beam power, lower magnetic fields and smaller size to sustain and maintain FRC equilibria in the FRC system 10 and future higher energy machines. Hand-in-hand with these improvements comes lower operating and construction costs as well as reduced engineering complexity.

Figure 18A:
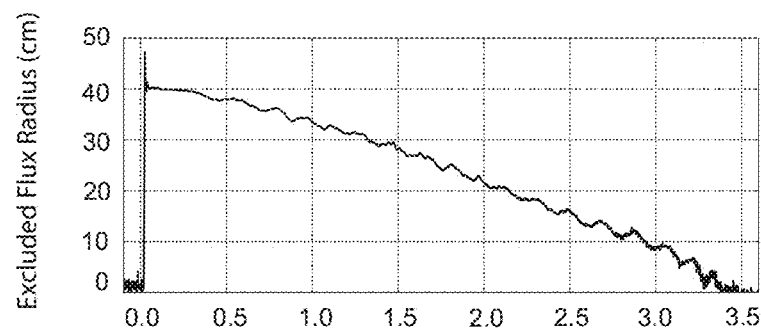
FIGS. 18 A, 18B, 18C and 18D illustrate data from a representative HPF, un-sustained discharge on the present FRC system. Shown as functions of time are (FIG. 18A) excluded flux radius at the midplane, (FIG. 18B) 6 chords of line-integrated density from the midplane CO2 interferometer, (FIG. 18C) Abel-inverted density radial profiles from the CO2 interferometer data, and (FIG. 18D) total plasma temperature from pressure balance.

For further comparison, FIGS. 18A, 18B, 18C and 18D show data from a representative HPF regime discharge in the FRC system 10 as a function of time. FIG. 18A depicts the excluded flux radius at the mid-plane. For these longer timescales the conducting steel wall is no longer as good a flux conserver and the magnetic probes internal to the wall are augmented with probes outside the wall to properly account for magnetic flux diffusion through the steel. Compared to typical performance in the conventional regime CR, as shown in FIGS. 13A, 13B, 13C and 13D, the HPF regime operating mode exhibits over 400% longer lifetime.

Figure 18B:
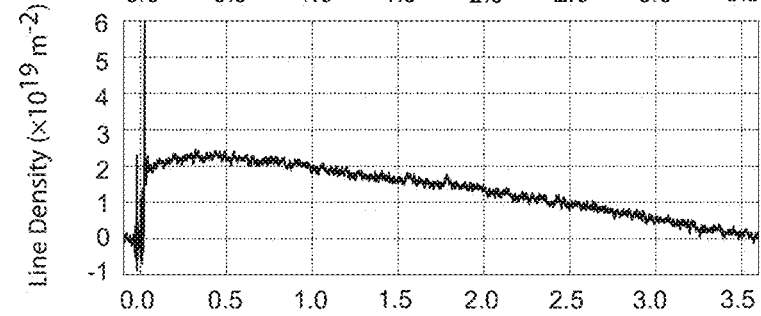
Figure 18C:
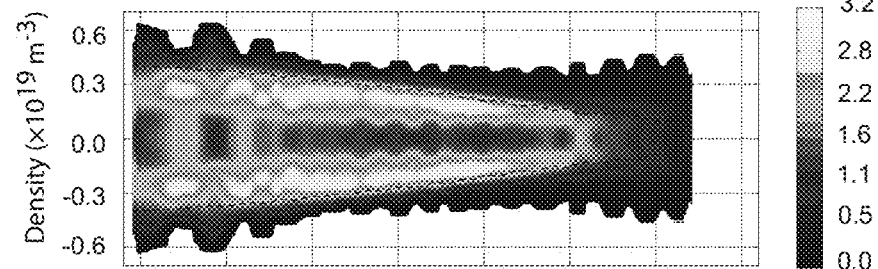
Figure 18D:
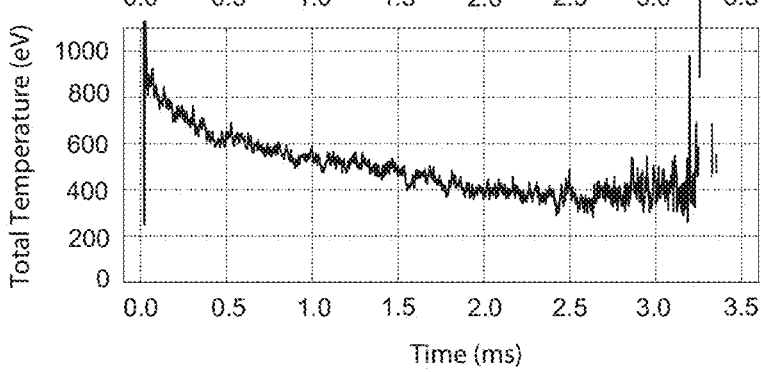

A representative cord of the line integrated density trace is shown in FIG. 18B with its Abel inverted complement, the density contours, in FIG. 18C. Compared to the conventional FRC regime CR, as shown in FIGS. 13A, 13B, 13C and 13D, the plasma is more quiescent throughout the pulse, indicative of very stable operation. The peak density is also slightly lower in HPF shots—this is a consequence of the hotter total plasma temperature (up to a factor of 2) as shown in FIG. 18D.

For the respective discharge illustrated in FIGS. 18A, 18B, 18C and 18D, the energy, particle and flux confinement times are 0.5 ms, 1 ms and 1 ms, respectively. At a reference time of 1 ms into the discharge, the stored plasma energy is 2 kJ while the losses are about 4 MW, making this target very suitable for neutral beam sustainment.

Figure 19:
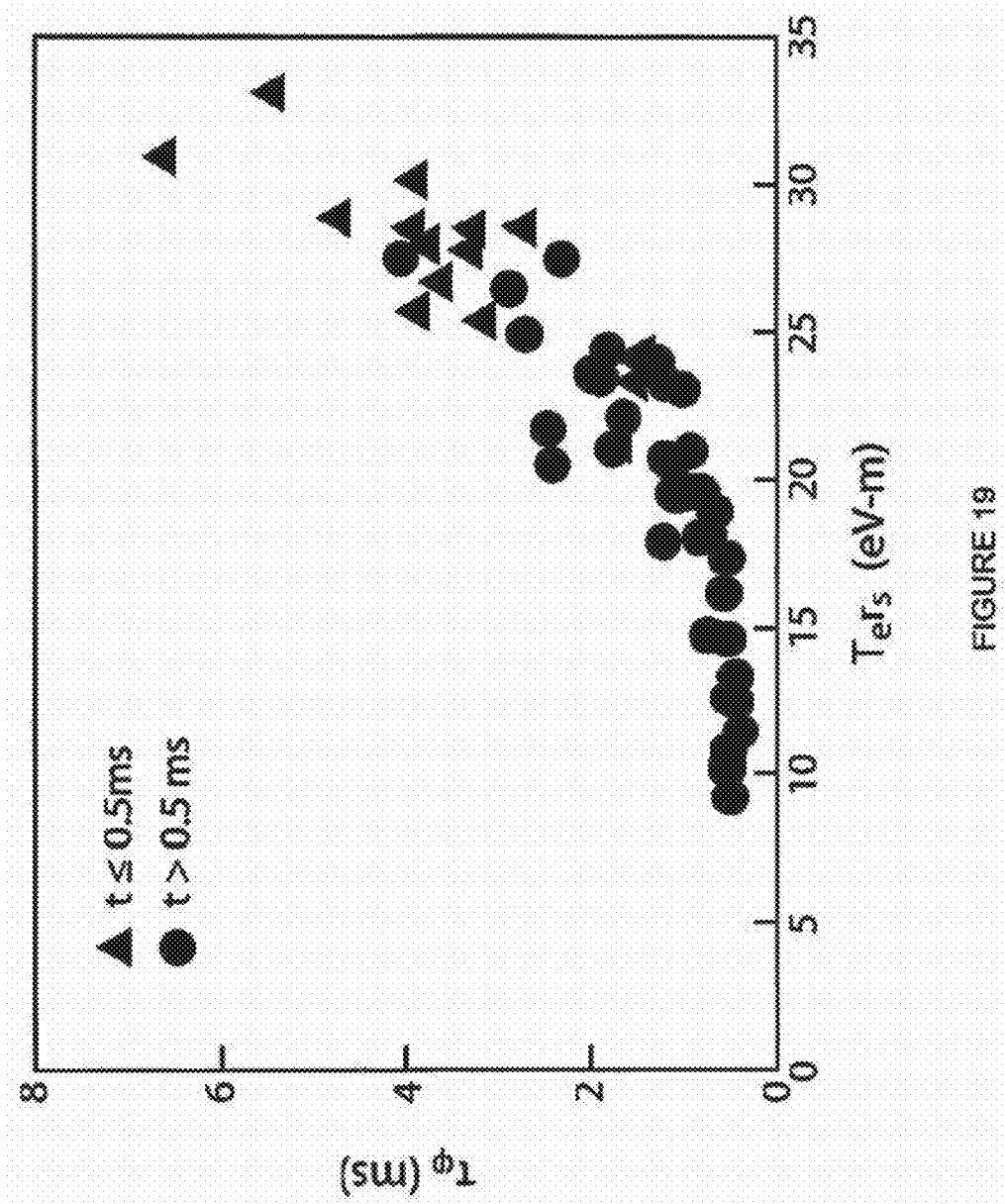
FIG. 19 illustrates flux confinement as a function of electron temperature ($T_e$). It represents a graphical representation of a newly established superior scaling regime for HPF discharges.

FIG. 19 summarizes all advantages of the HPF regime in the form of a newly established experimental HPF flux confinement scaling. As can be seen in FIG. 19, based on measurements taken before and after t=0.5 ms, i.e., t≤0.5 ms and t>0.5 ms, the flux confinement (and similarly, particle confinement and energy confinement) scales with roughly the square of the electron Temperature ($T_e$) for a given separatrix radius ($r_s$). This strong scaling with a positive power of $T_e$ (and not a negative power) is completely opposite to that exhibited by conventional tokamaks, where confinement is typically inversely proportional to some power of the electron temperature. The manifestation of this scaling is a direct consequence of the HPF state and the large orbit (i.e. orbits on the scale of the FRC topology and/or at least the characteristic magnetic field gradient length scale) ion population. Fundamentally, this new scaling substantially favors high operating temperatures and enables relatively modest sized reactors.

With the advantages the HPF regime presents, FRC sustainment or steady state driven by neutral beams is achievable, meaning global plasma parameters such as plasma thermal energy, total particle numbers, plasma radius and length as well as magnetic flux are sustainable at reasonable levels without substantial decay. For comparison, FIG. 20 shows data in plot A from a representative HPF regime discharge in the FRC system 10 as a function of time and in plot B for a projected representative HPF regime discharge in the FRC system 10 as a function of time where the FRC 450 is sustained without decay through the duration of the neutral beam pulse. For plot A, neutral beams with total power in the range of about 2.5-2.9 MW were injected into the FRC 450 for an active beam pulse length of about 6 ms. The plasma diamagnetic lifetime depicted in plot A was about 5.2 ms. More recent data shows a plasma diamagnetic lifetime of about 7.2 ms is achievable with an active beam pulse length of about 7 ms.

As noted above with regard to FIGS. 16A, 16B, 16C and 16D, the correlation between beam pulse length and FRC lifetime is not perfect as beam trapping becomes inefficient below a certain plasma size, i.e., as the FRC 450 shrinks in physical size not all of the injected beams are intercepted and trapped. Shrinkage or decay of the FRC is primarily due to the fact that net energy loss (~4 MW about midway through the discharge) from the FRC plasma during the discharge is somewhat larger than the total power fed into the FRC via the neutral beams (~2.5 MW) for the particular experimental setup. As noted with regard to FIG. 3C, angled beam injection from the neutral beam guns 600 towards the mid-plane improves beam-plasma coupling, even as the FRC plasma shrinks or otherwise axially contracts during the injection period. In addition, appropriate pellet fueling will maintain the requisite plasma density.

Plot B is the result of simulations run using an active beam pulse length of about 6 ms and total beam power from the neutral beam guns 600 of slightly more than about 10 MW, where neutral beams shall inject H (or D) neutrals with particle energy of about 15 keV. The equivalent current injected by each of the beams is about 110 A. For plot B, the beam injection angle to the device axis was about 20°, target radius 0.19 m. Injection angle can be changed within the range 15°-25°. The beams are to be injected in the co-current direction azimuthally. The net side force as well as net axial force from the neutral beam momentum injection shall be minimized. As with plot A, fast (H) neutrals are injected from the neutral beam injectors 600 from the moment the north and south formation FRCs merge in the confinement chamber 100 into one FRC 450.

The simulations that where the foundation for plot B use multi-dimensional hall-MHD solvers for the background plasma and equilibrium, fully kinetic Monte-Carlo based solvers for the energetic beam components and all scattering processes, as well as a host of coupled transport equations for all plasma species to model interactive loss processes. The transport components are empirically calibrated and extensively benchmarked against an experimental database.

As shown by plot B, the steady state diamagnetic lifetime of the FRC 450 will be the length of the beam pulse. However, it is important to note that the key correlation plot B shows is that when the beams are turned off the plasma or FRC begins to decay at that time, but not before. The decay will be similar to that which is observed in discharges which are not beam-assisted—probably on order of 1 ms beyond the beam turn off time—and is simply a reflection of the characteristic decay time of the plasma driven by the intrinsic loss processes.

Turning to FIGS. 21A, 21B, 21C, 21D and 21E, experiment results illustrated in the figures indicate achievement of FRC sustainment or steady state driven by angled neutral beams, i.e., global plasma parameters such as plasma radius, plasma density, plasma temperature as well as magnetic flux are sustainable at constant levels without decay in correlation with NB pulse duration. For example, such plasma parameters are essentially being kept constant for ~5+ms. Such plasma performance, including the sustainment feature, has a strong correlation NB pulse duration, with diamagnetism persisting even several milliseconds after NB termination due to the accumulated fast ions. As illustrated, the plasma performance is only limited by the pulse-length constraints arising from finite stored energies in the associated power supplies of many critical systems, such as the NB injectors as well as other system components.

Multi-Scaled Capture Type Vacuum Pumps

As noted above with regard to FIGS. 3A, 3B, 3C, 3D, 3E and 8, the neutral atom beams 600 are deployed on the FRC system 10 to provide heating and current drive as well as to develop fast particle pressure. The individual beam lines comprising neutral atom beam injector systems 600 are located around the central confinement chamber 100 and, as shown in FIGS. 3C, 3D and 3E, are preferably angled to inject neutral particles towards the mid-plane of the confinement chamber 100. To ramp-up plasma temperatures and elevate system energies, the present FRC system 10 includes a neutral beam injector (NBI) system 600 of elevated power and expanded pulse length, e.g., for exemplary purposes only, power of about 20+ MW with up to 30 ms pulse length.

Figure 25:
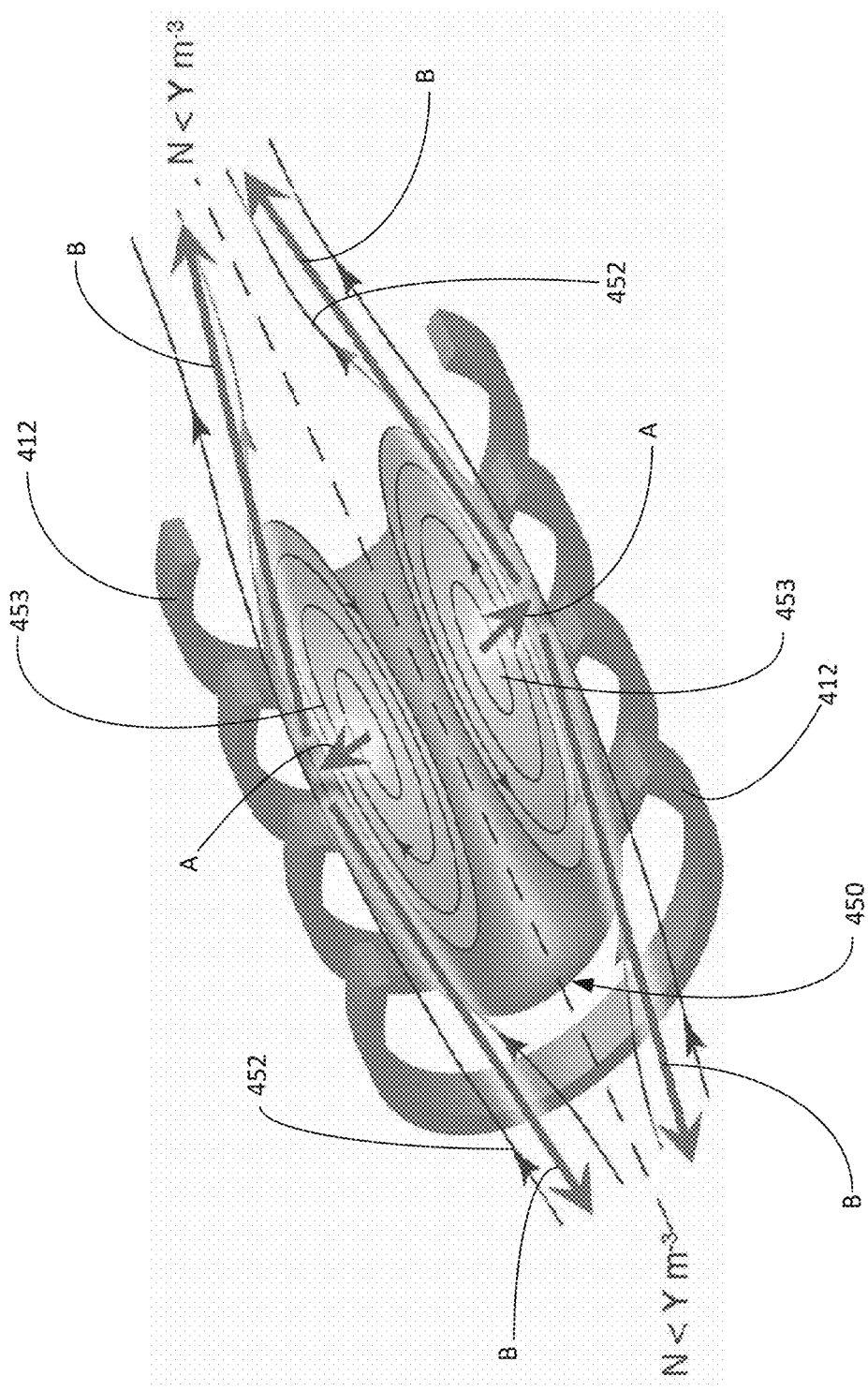
FIG. 25 illustrates an isometric view of the FRC plasma core and the confinement chamber DC coils, and the path of charged particles flowing from the FRC plasma core.

To further improve FRC sustainment and demonstrate FRC ramp-up to high plasma temperatures and elevated system energies, the present FRC system 10 also includes multi-scaled capture type vacuum pumps in the outer and inner divertors 300 and 302 to prevent the buildup of neutralized gas in the divertors 300 and 302. As illustrated in FIG. 25, through various mechanisms, charged plasma particles (such as, e.g., hydrogen and deuterium) are lost, as indicated by arrows A, from the interior or core 453 of the FRC plasma 450 to the open field line plasma. From there, the charged particles flow, as indicated by arrows B, along the open magnetic field lines 452 out of the central confinement vessel 100 to each of the four divertors 300 and 302 on either side of the confinement vessel 100.

Once in the divertors 300 and 302, the charged particles will hit surfaces within the divertor chambers 310, such as, e.g., bias electrodes 910 in divertors 300 and 302 (FIGS. 3A, 3D, 10 and 26), become neutralized and come off as neutralized gas. Keeping the density of such neutralized gas sufficiently low is necessary for FRC sustainment and ramp-up to high plasma temperatures and elevated system energies because electrons in the plasma along the open field lines 452 will ionize the neutral gas in the divertors 300 and 302 and, thus, lose energy (cooling) in the process. Electrons that are too cold cause excessive drag on and slow down energetic ions orbiting around the plasma core of the FRC plasma 450. Below a predetermined neutral gas density, electron cooling from ionization tends not to be significant.

To avoid a buildup of such neutralized gas in the divertors 300 and 302, the neutralized gas must be pumped away to prevent the gas density level N from exceeding a predetermined maximum level of Y, i.e., N<Y m$^{-3}$. For example, in certain embodiments, this gas buildup cannot exceed the density level N of $10^{18}$ m$^{-3}$ ($3 \times 10^{-5}$ Torr pressure equivalent at 300K) in the inner divertors 302, and $2 \times 10^{18}$ m$^{-3}$ ($6 \times 10^{-5}$ Torr pressure equivalent at 300K) in the outer divertors 300. The level of pumping required to prevent exceeding this maximum density/pressure limit is determined by the rate of charged particles flowing into each of the four divertors 300 and 302. The level of pumping required is analogous to pouring water into a leaky bucket having one or more holes. The faster water is poured into the bucket, the higher the level to which the water level rises. While the bigger the leak, i.e., the greater the size and or number of holes, the lower the level to which the water level drops. With a big enough leak (i.e., a pump) the water level (i.e., particle density/pressure) can be maintained below a water level limit (i.e., a predetermined particle density/pressure limit; e.g., about $10^{18}$ m$^{-3}$) while water is poured into the bucket (i.e., charge particles flow into the divertors 300 and 302).

Figure 27:
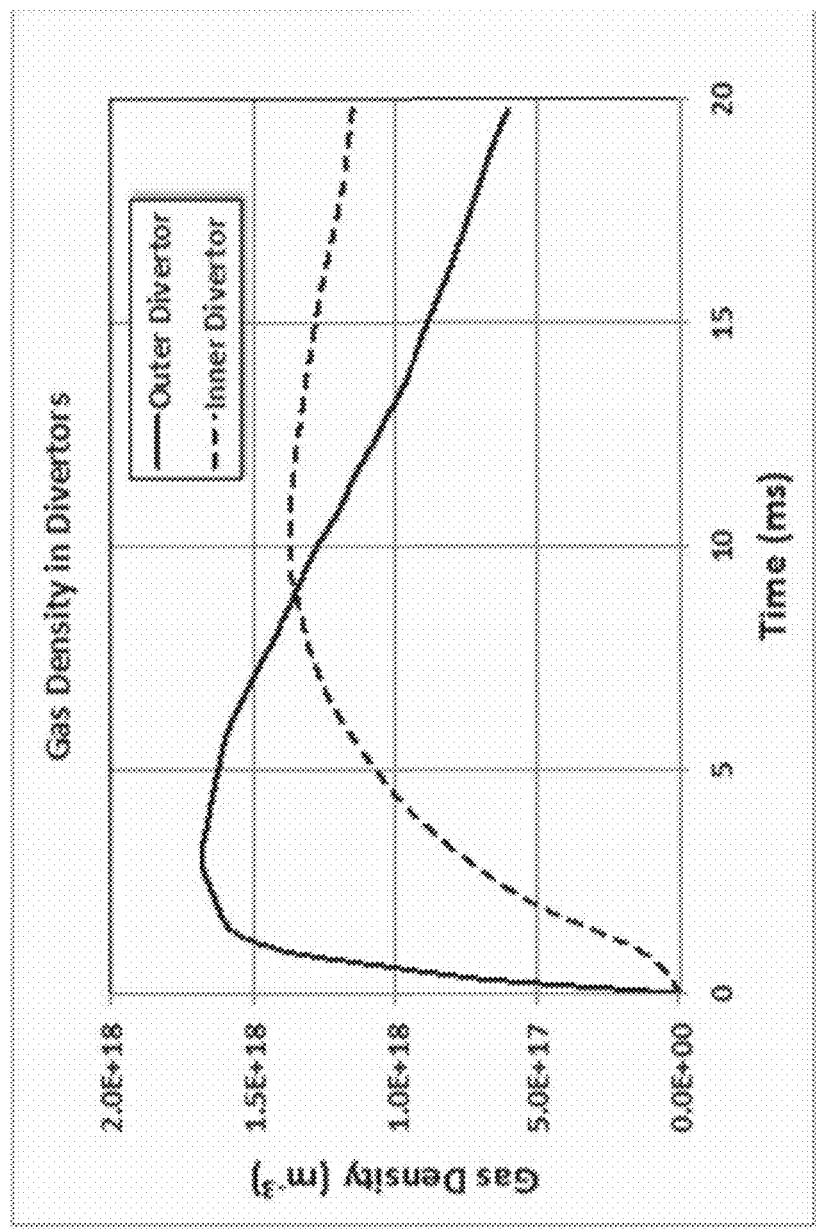
FIG. 27 is a graph illustrating the density of neutral gas accumulating in the inner and outer divertors as a function of time during operation of the present FRC system.

In operation of the present FRC system 10, as shown in FIG. 27, all the charged plasma particles flowing towards the divertors 300 and 302 are expected to initially flow into the two outer divertors 300 with a maximum rate of about $1.25 \times 10^{22}$ #/s, which in more familiar vacuum units is about 400 Torr-L/s. Embodiments of the present FRC system 10 are configured to change to magnetic fields shortly after FRC formation, e.g., within about 5 milliseconds, to switch 75% of the total particle flow from the outer divertors 300 to the inner divertors 302. For example, the initial flow rate into the inner divertors 302 will be about 300 Torr-L/s. Within a short time, e.g., about 5-10 milliseconds, following the switching of particle flow from the outer divertors 300 to the inner divertors 302, plasma confinement in the FRC 450 will improve such that the expected particle flow rates tend to drop down 4 to 5 fold, e.g., down to about 60 Torr-L/s. A simple zero dimension simulation model showed that a combination of a 2 million L/s vacuum pump plus 15 m$^3$ of volumetric pumping (letting gas expand into an empty volume) was required in each of the four divertors 300 and 302 to keep the hydrogen gas density below preferred maximum limits. Deuterium requires 1.5 million L/s worth of pumping.

To handle these particles loads while keeping the gas density low enough requires an enormous amount of pumping. Conventional pumping solutions are unable to provide the necessary amount of pumping within the constraints associated with the divertors 300 and 302 of the present FRC system 10, which include but are not limited to, for example, cost, as well as limited volumetric space (e.g., about 15 m$^3$) and surface area (e.g., about 10 m$^2$) inside each divertor 300 and 302.

The cheapest way to pump particles such as, e.g., hydrogen and deuterium, is to use Titanium films deposited onto the surfaces of the chambers 310 of the divertors 300 and 302 to cause the particles to stick to the surfaces of the chambers 310 in the form a capture type vacuum pump (discussed in further detail below). About 2.2 L/cm$^2$s of pumping is achievable at room temperature, which corresponds to the probability of the hydrogen particles sticking and being captured by the film of 5%. This is called the sticking factor, which can range from 0 to 100%. Using a limited surface area of about 10 m$^2$ of area will only yield a total pump speed of 22,000 L/s at this sticking factor. This pump speed is about 100 times less than what is required to handle the particles loads of the present FRC system 10 while keeping the gas density below a predetermined maximum.

To meet the pumping needs of the present FRC system 10, a combination of two pumping solutions is employed. First, a titanium film is deposited on to cryogenically cooled surfaces, e.g., surfaces that are cryogenically cooled to about 77K. Such cooling tends to increase the sticking factor up to about 4 fold, e.g., from about 5% to about 20%. Second, the pumping surfaces are configured into a plurality of multi-scaled self-similar surfaces to further increase the sticking factor about 3 to 4 fold, e.g., from about 20% to about 70%. With such increases in sticking factor, a 100 fold increase in pump speed is achieved. For example, for hydrogen a pump speed of 2,400,000 L/s is achieved and for deuterium a pump speed of 1,500,000 L/s is achieved using just 7.3 m² of the available surface area, which fits inside a 15 m³ vacuum vessel of the divertors 300 and 302. These pumps can handle the total amount of gas (capacity) generated from a plasma shot on the present FRC system 10. The pump keeps 95% of its pump speed from this amount of gas, and can be regenerated to 100% by depositing more titanium.

Capture Type Vacuum Pump

Gas molecules can be captured onto a surface of a flat plate 312 (FIG. 28) by sticking to the surface of the plate 312. The capture of gas molecules can happen via various physical processes such as condensation, as well as physical or chemical adsorption onto surfaces that can be composed of many different types of materials. Each time a gas molecule hits this surface it can be captured with a probability of sticking between 0 to 100%. This probability of sticking onto a flat surface from a single hit to the surface is called the sticking factor (SF). If the gas molecule doesn't stick it will typically leave that surface in a random direction according to the cosine law. The sticking factor of a flat surface is independent of the size of the flat surface. However, a pump's total pumping speed does depend on the surface area, sticking factor and average speed of the gas molecules, and is given by formula (1):

$$\text{Speed} = \tfrac{1}{4} \langle v \rangle SF \times \text{Area} \quad (1)$$

Figure 28:
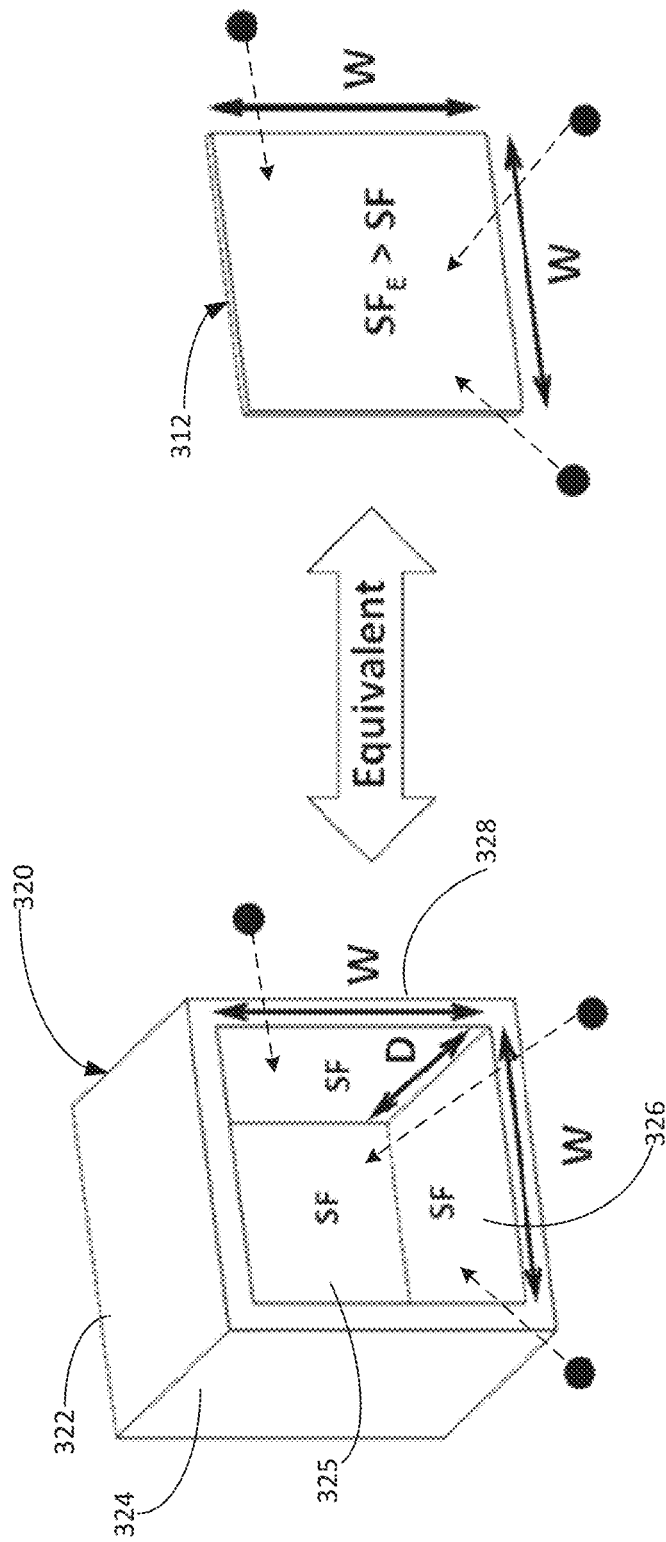
FIG. 28 illustrates an isometric view of an individual pump object in the form of an open face cube and a flat plate equivalent in size to the open face of the cube.

The effective sticking factor, and hence pump speed, can be increased by combining two or more surfaces together such that the surfaces have views of each other. For example, as shown in FIG. 28, five flat square shaped walls 322, 324, 326, 328 and 325 can be combined to create five sides of a cube 320 with one open side such that the internal surfaces of the walls 322, 324, 326, 328 and 325 have a view of each other. A gas molecule entering into this cube 320 on the open side will hit one of the five surfaces and stick with a probability SF. If the gas molecule doesn't stick to the surface it initially hits, the gas molecule can head back out of the open side of the cube 320 the gas molecule just entered from or the gas molecule can hit one of the other four surfaces of the cube 320 it has a view of with yet another chance of sticking to a surface by a probability of SF. A gas molecule can bounce around hitting the surfaces of the cube 320 many times before either sticking to one of the surfaces or leaving out through the open side of the cube 320. This effectively increases the probably of a gas molecule sticking to a surface in the cube 320 compared to a flat square surface 312 of the same size as the opening of the cube 320. The cube 320 effectively equates to a flat surface 312, but has a higher effective SF than the flat surface 312 where the flat surface has the same area as the open side of the cube 320.

Figure 29:
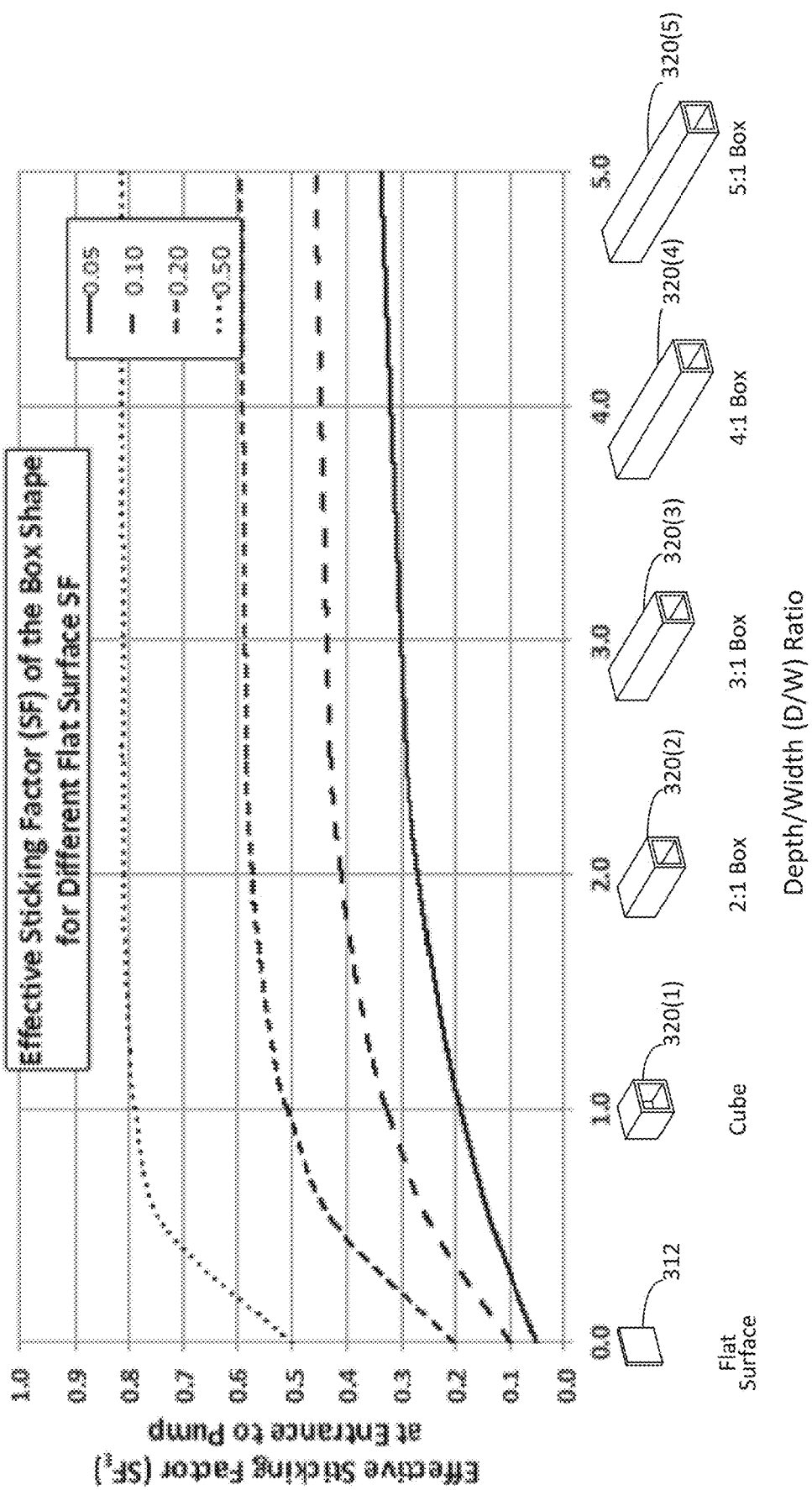
FIG. 29 is a graph illustrating the effective sticking factor of the square opening of a box shaped pump object as a function of the depth/width ratio of the box for a given sticking factor for flat surfaces that make up the box.
Figure 30:
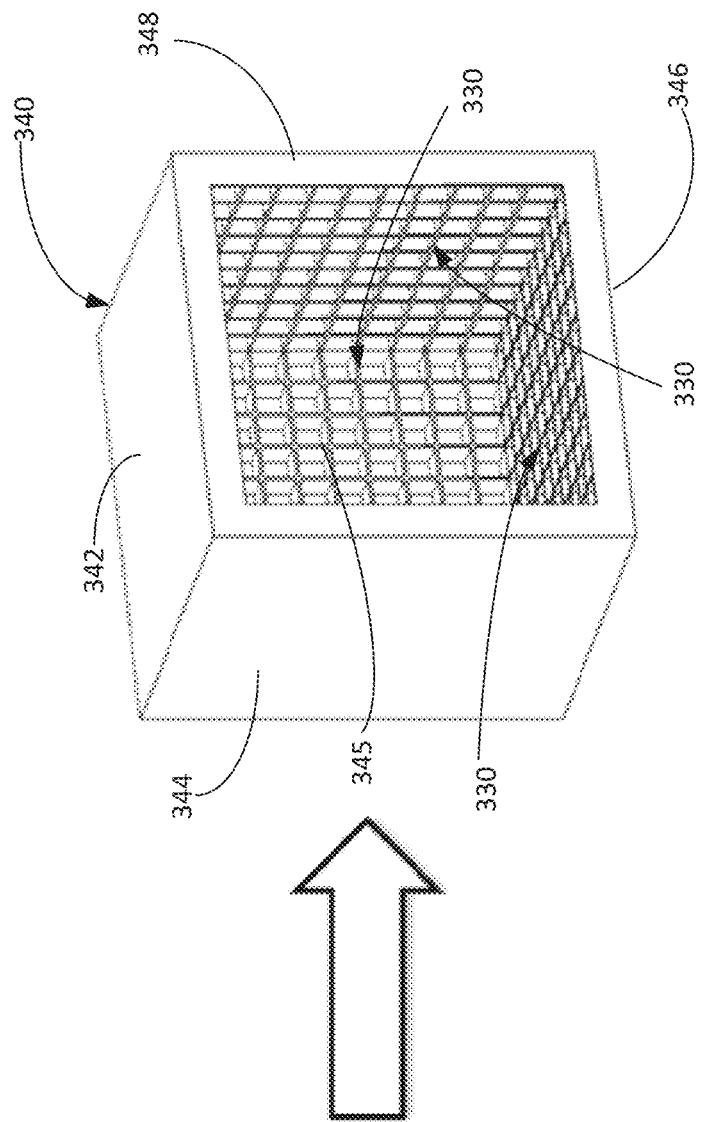
FIG. 30 illustrates an isometric view of a self-similar surfaced capture pump comprising an open sided cube formed from sides comprising an array of individual pumps comprising an open faced cube.
Figure 30:
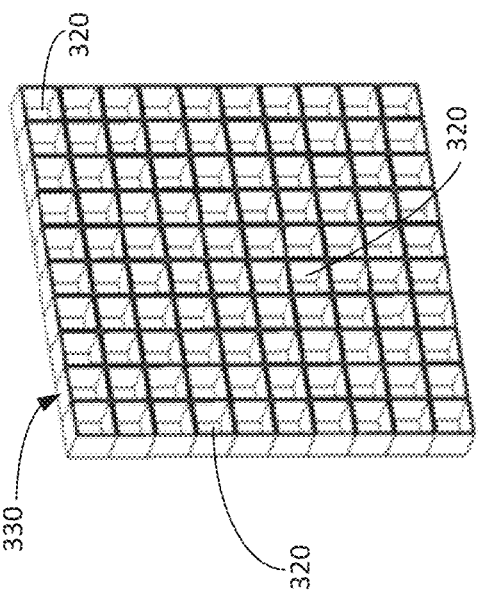

When combining two or more surfaces together such that the surfaces have views of each other, the resulting shape need not necessarily form the shape of a cube. The resultant shape can be any shape having multiple surfaces that form more than just a flat surface such as an open sided chamber, cavity or channel. For example, as shown in FIG. 29, a box with a square opening like the cube 320 shown in FIG. 28 can be formed but with a depth that varies. FIG. 29 provides a plot of the effective SF of the square opening of the box as a function of the Depth/Width ratio of the box for a given SF for flat surfaces that make up the box. A box with zero depth (Depth/Width=0 too) is just a flat surface 312, so the effective SF will be the same as the given SF of the box's flat surfaces. Sample SFs for a flat surface are shown to include 0.05, 0.10, 0.20 and 0.50. For a Depth/Width ratio of Depth/Width=1, the box 320(1) is a cube. Boxes 320(2), 320(3), 320(4) and 320(5) have Depth/Width ratios of 2:1, 3:1, 4:1 and 5:1, respectively.

In addition to the Depth/Width ratio being variable, the shape and the number of open sides may vary. The open sides need not to be square, but can be any shape including, but not limited to, hexagonal, circular, rectangular, triangular, star, etc., as long as two or more internal surfaces have a view of each other. The shape also doesn't have to be made of a number of discrete flat surfaces. It can be a continuously curved surface like a hemisphere. To calculate the effective SF for the hemisphere, the curved surface is assumed to be composed of an infinite number of infinitely small flat surfaces.

Self-Similar Surfaced Capture Pumps

One can take a basic shape to build self-similar structures on many scale levels that will dramatically increase the effective SF. For example, the individual pump object in the form of the five sided cube 320 described above (FIGS. 28 and 29), can be assembled with a plurality of cubes 320 into a 10×10 array of cubes to form a panel or wall 330. The array of cubes panel 330 can then be used to form the five (5) walls 342, 344, 345, 346 and 348 of a larger five (5) sided cube 340.

Figure 31:
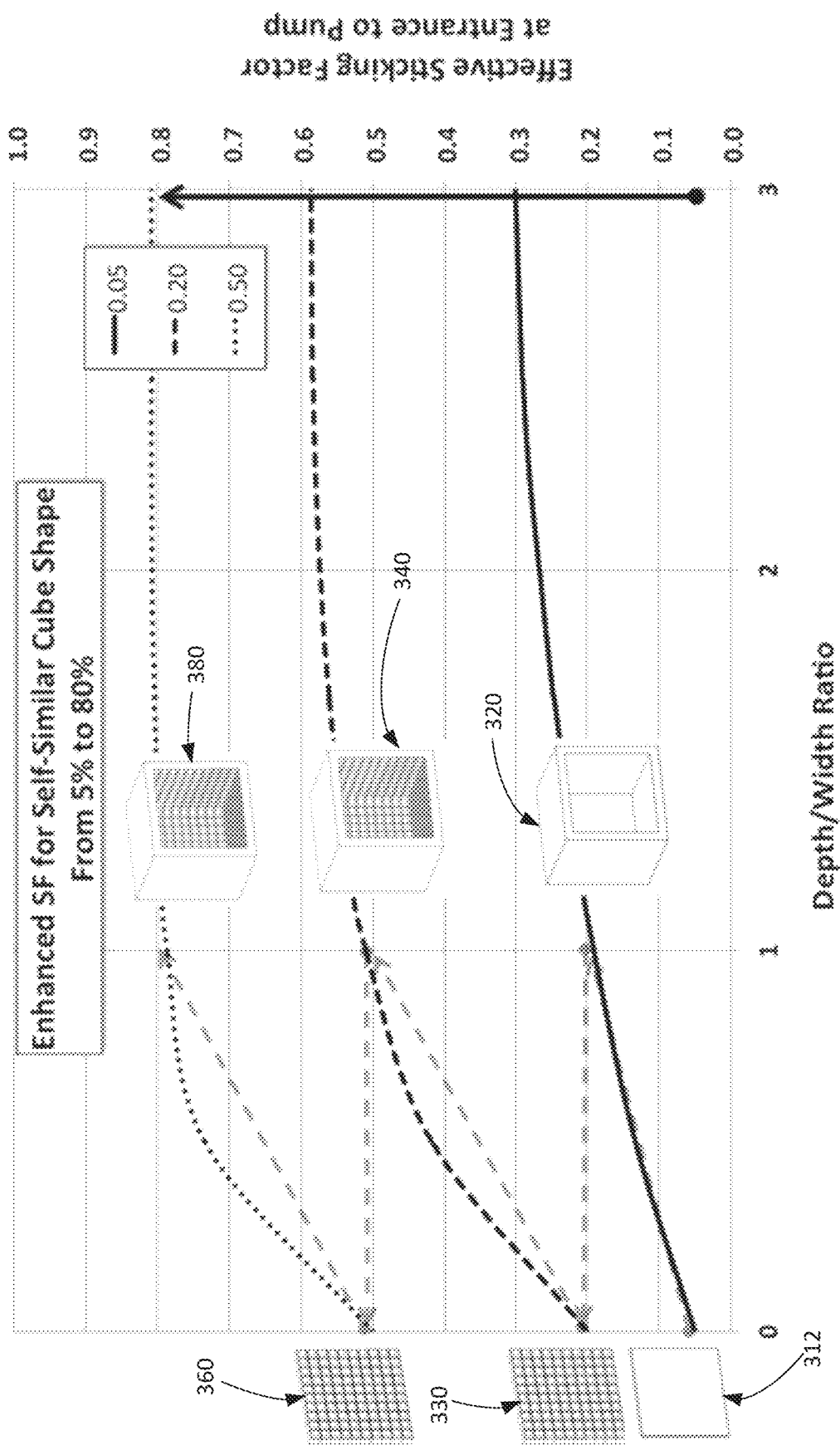
FIG. 31 is a graph illustrating the increase in effective sticking factor of a self-similar surfaced capture pump as a function of discrete scale levels of self-similarity.
Figure 32:
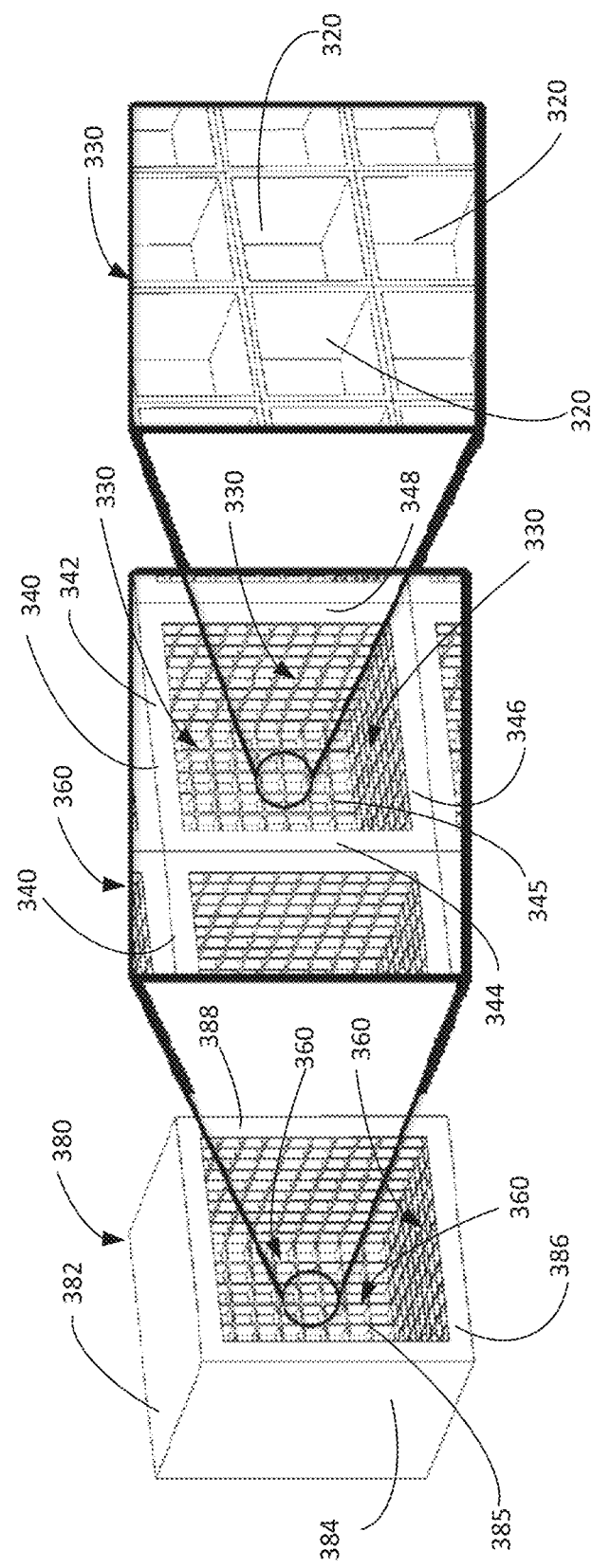
FIG. 32 illustrates isometric detail views showing the scale levels of self-similarity of a self-similar surfaced capture pump.

This process can be replicated over and over again increasing the SF and hence pump's speed and capacity. For example, as illustrated in FIGS. 31 and 32, if a flat square plate 312 having an SF of 5% is used to form a five sided cube 320, the SF of the opening of the cube 320 will increase to 20%. The cube 320 can then be assembled with a plurality of cubes 320 in a 10×10 array of cubes to form a "flat" square plane or wall 330 with a SF equal to 20%. If the array of cubes wall 330 having an SF of 20% is used to form a five sided cube 340, with sides 342, 344, 345, 346 and 348, the SF of the opening of the cube 340 will increase to 50%. The cube 340 can then be assembled with a plurality of cubes 340 in a 10×10 array of cubes to form a "flat" square plane or wall 360 with a SF equal to 50%. If the array of cubes wall 360 having an SF of 50% is used to form a five sided cube 380, with sides 382, 384, 385, 386 and 388, the SF of the opening of the cube 380 will increase to 80%. This process can be repeated as desired to reach an optimal SF level.

Figure 26:
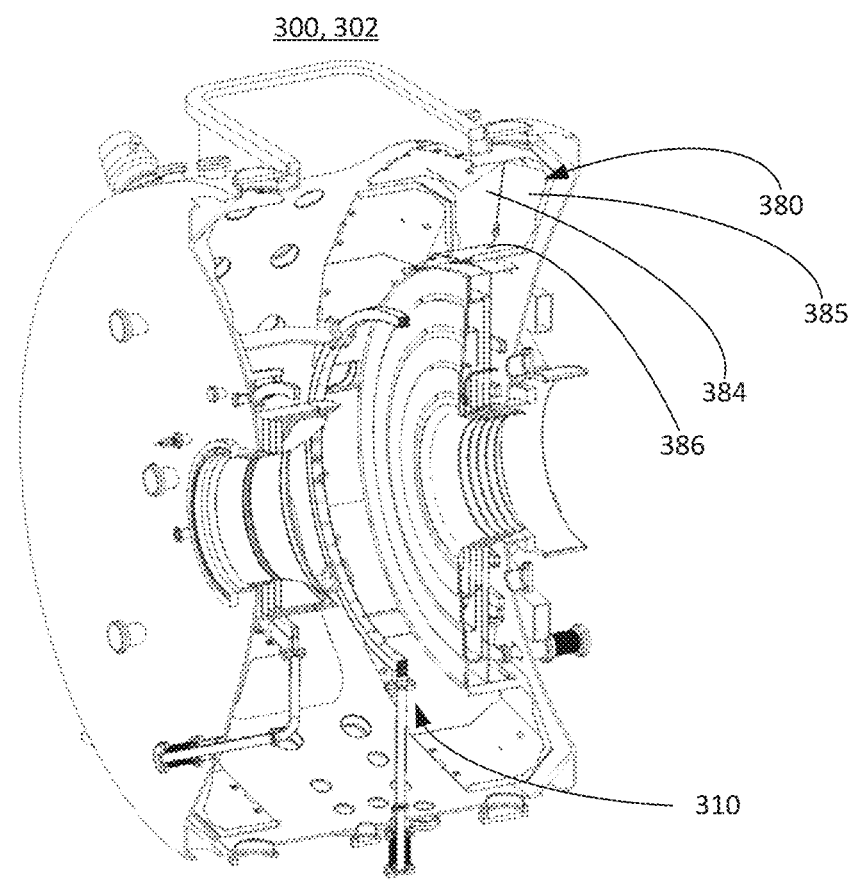
FIG. 26 illustrates an isometric view of a divertor.

As shown in FIG. 26, a plurality of the larger boxes 380 are positioned about the interior of the chamber 310 of the divertors 300 and 302. As shown in FIG. 31 and partially shown FIG. 26, the box 380 is a five sided cube formed by side and bottom plates 384 and 386 and opposing side and top plates extending at a first end of the side, bottom and top plates from an end plate 385. The box 380 having an opening opposite the end plate 385 at a second end of the side, bottom and top plates.

SF doesn't depend on size. The increase of SF associated with the cubes of the previous example can achieved by cubes of the same size opening rather than making the opening larger. Stated differently, by transitioning from configuration of the first cube 320 to the configuration of third cube 380 while keeping the opening of the first and third cubes 320 and 380 the same size, a four-fold increase in SF and, hence, pump speed is achieved relative to the SF of a flat plate corresponding to the opening area. This is an example of discrete scale levels of self-similarity. The first cube 320 is only a one scale cube, i.e., the internal surfaces of the walls of the cube 320 comprise flat surfaces. However, the internal surfaces of the walls of the second cube 340 are not flat but rather include an array of the first cubes 320. Similarly, the internal surfaces of the third cube 380 include an array of the second cubes 340.

As far as increasing the pump's SF, speed and capacity, there is no requirement that the individual pump objects used to convert a flat surface into a three (3) dimensional surface have to have the same shapes or sizes. The individual pump objects just have to have a shape that can increase the SF relative to a flat plate corresponding to the opening of the individual pump objects. In the examples provided above, a 10:1 ratio is used in the scale sizes of the self-similar cubes, but this ratio can be anything. The number of scale levels, shape and size can be optimized per situation.

As was mentioned above, a combination of cryogenically cooled surfaces and self-similar shapes are employed in the present FRC system 10 to achieve a sticking factor of about 80% or above. In certain situations, the SF gets reduced down to 70% from some shields that prevent the titanium from depositing out through the opening of the individual pumps.

There are ways to naturally produce these types of self-similar structures. Titanium films grown on cryogenically cooled (77K) surface under different pressures of argon will produce sub-micron structures that exhibit self-similarity and will increase sticking factor of the surface. However, the self-similar structures, such as, e.g., cubes 320, 340 and 380, are purposely-engineered self-similar structures that are not grown from deposited films but can be used in conjunction with deposited films.

There are many other ways that gas can be trapped onto surfaces besides titanium coatings. NEGs (Non-Evaporable Getters), cryogenically cooled activated charcoal, are two of the more common.

NEGs (Non-Evaporable Getters) pumps are commonly used throughout particle accelerators. These are made from alloy powders mixtures of Titanium, Vanadium, Aluminum, Zirconium, and Iron.

Typically, this NEG powder is sintered into disks that are arranged spaced stacks, or onto metallic heater ribbon, which are then bent into shapes. So they do employ shapes to increase the sticking factor, but only at one scale level. They are not shaped into self-similar structures on multi scale sizes. These NEG powders could be sintered into self-similar shaped structures to increase their low sticking factors and hence pump speed without increasing the size of the pump. Increased NEG pump speed would help improve the vacuum performance of particle accelerators.

Activated charcoal cooled to 10K can capture Hydrogen gas and cooled further to 4K can capture Helium gas. It is one of the few ways to pump Helium gas. It is used as a pump in fusion devices such as Tokamaks and Neutral Beams. Adhering a powdered activated charcoal onto a self-similar structure will increase the sticking factor and pump speeds.

According to an embodiment of the present disclosure, a method for generating and maintaining a magnetic field with a field reversed configuration (FRC) comprising forming an FRC about a plasma in a confinement chamber, injecting a plurality of neutral beams into the FRC plasma at an angle toward the mid-plane of the confinement chamber, pumping neutralized gas molecules accumulating in first and second diametrically opposed divertors coupled to the confinement chamber with first and second capture vacuum pumps positioned in the first and second divertors and comprising two or more sides with surfaces having a view of each other and an open side, wherein the first and second capture vacuum pumps having a sticking factor more than four (4) times greater than a sticking factor of a flat plate defining an area equivalent to the open side of the first and second capture pumps.

According to a further embodiment of the present disclosure, at least one of the two or more sides of the first and second capture vacuum pumps comprising an array of individual capture vacuum pumps.

According to a further embodiment of the present disclosure, each of the individual capture vacuum pumps comprising two or more sides with surfaces having a view of each other and an open side, wherein each of the individual capture vacuum pumps having a sticking factor greater than a sticking factor of a flat plate defining an area equivalent to the open side of each of the individual capture vacuum pumps.

According to a further embodiment of the present disclosure, at least one of the two or more sides of each of the individual capture vacuum pumps comprising a second array of individual capture vacuum pumps.

According to a further embodiment of the present disclosure, each of the individual capture vacuum pumps of the second array comprising two or more sides with surfaces having a view of each other and an open side, wherein each of the individual capture vacuum pumps of the second array having a sticking factor greater than a sticking factor of a flat plate defining an area equivalent to the open side of each of the individual capture vacuum pumps of the second array.

According to a further embodiment of the present disclosure, the first and second capture vacuum pumps having a sticking factor that is N times greater than a sticking factor of a flat plate defining an area equivalent to the open side of the first and second capture pumps, wherein N is $4<N<16$.

According to a further embodiment of the present disclosure, the surfaces of the flat plate and the first and second vacuum pumps includes a film of titanium deposited thereon.

According to a further embodiment of the present disclosure, the method further includes maintaining the FRC at or about a constant value without decay by injecting beams of fast neutral atoms from neutral beam injectors into the FRC plasma at an angle towards the mid through plane of the confinement chamber.

According to a further embodiment of the present disclosure, the method further comprising generating a magnetic field within the confinement chamber with quasi dc coils extending about the confinement chamber and a mirror magnetic field within opposing ends of the confinement chamber with quasi dc mirror coils extending about the opposing ends of the confinement chamber.

According to a further embodiment of the present disclosure, the method further comprising generating a magnetic field within the confinement chamber with quasi dc coils extending about the confinement chamber and a mirror magnetic field within opposing ends of the confinement chamber with quasi dc mirror coils extending about the opposing ends of the confinement chamber.

According to a further embodiment of the present disclosure, forming the FRC includes forming a formation FRC in opposing first and second formation sections coupled to the confinement chamber and accelerating the formation FRC from the first and second formation sections towards the mid through plane of the confinement chamber where the two formation FRCs merge to form the FRC.

According to a further embodiment of the present disclosure, forming the FRC includes one of forming a formation FRC while accelerating the formation FRC towards the mid-plane of the confinement chamber and forming a formation FRC then accelerating the formation FRC towards the mid through plane of the confinement chamber.

According to a further embodiment of the present disclosure, accelerating the formation FRC from the first and second formation sections towards the mid-plane of the confinement chamber includes passing the formation FRC from the first and second formation sections through first and second inner divertors coupled to opposite ends of the confinement chamber interposing the confinement chamber and the first and second formation sections.

According to a further embodiment of the present disclosure, passing the formation FRC from the first and second formation sections through first and second inner divertors includes inactivating the first and second inner divertors as the formation FRC from the first and second formation sections passes through the first and second inner divertors.

According to a further embodiment of the present disclosure, the method further comprising guiding magnetic flux surfaces of the FRC into the first and second inner divertors.

According to a further embodiment of the present disclosure, the method further comprising guiding magnetic flux surfaces of the FRC into first and second outer divertors coupled to the ends of the formation sections.

According to a further embodiment of the present disclosure, the method further comprising generating a magnetic field within the formation sections and the first and second outer divertors with quasi-dc coils extending about the formation sections and divertors.

According to a further embodiment of the present disclosure, the method further comprising generating a magnetic field within the formation sections and first and second inner divertors with quasi-dc coils extending about the formation sections and divertors.

According to a further embodiment of the present disclosure, the method further comprising generating a mirror magnetic field between the first and second formation sections and the first and second outer divertors with quasi-dc mirror coils.

According to a further embodiment of the present disclosure, the method further comprising generating a mirror plug magnetic field within a constriction between the first and second formation sections and the first and second outer divertors with quasi-dc mirror plug coils extending about the constriction between the formation sections and the divertors.

According to a further embodiment of the present disclosure, the method further comprising generating a mirror magnetic field between the confinement chamber and the first and second inner divertors with quasi-dc mirror coils and generating a necking magnetic field between the first and second formation sections and the first and second inner divertors with quasi-dc low profile necking coils.

According to a further embodiment of the present disclosure, the method further comprising generating one of a magnetic dipole field and a magnetic quadrupole field within the chamber with saddle coils coupled to the chamber.

According to a further embodiment of the present disclosure, the method further comprising conditioning the internal surfaces of the chamber and the internal surfaces of first and second formation sections, first and second divertors interposing the confinement chamber and the first and second formation sections, and first and second outer divertors coupled to the first and second formation sections with a gettering system.

According to a further embodiment of the present disclosure, the gettering system includes one of a Titanium deposition system and a Lithium deposition system.

According to a further embodiment of the present disclosure, the method further comprising axially injecting plasma into the FRC from axially mounted plasma guns.

According to a further embodiment of the present disclosure, the method further comprising controlling the radial electric field profile in an edge layer of the FRC.

According to a further embodiment of the present disclosure, controlling the radial electric field profile in an edge layer of the FRC includes applying a distribution of electric potential to a group of open flux surfaces of the FRC with biasing electrodes.

According to a further embodiment of the present disclosure, the method further comprising injecting compact toroid (CT) plasmas from first and second CT injectors into the FRC plasma at an angle towards the mid-plane of the confinement chamber, wherein the first and second CT injectors are diametrically opposed on opposing sides of the mid-plane of the confinement chamber.

According to a further embodiment of the present disclosure, a capture vacuum pump comprising two or more sides with surfaces having a view of each other and an open side, wherein capture vacuum pump having a sticking factor more than four (4) times greater than a sticking factor of a flat plate defining an area equivalent to the open side of the capture pump.

According to a further embodiment of the present disclosure, at least one of the two or more sides of the first and second capture vacuum pumps comprising an array of individual capture vacuum pumps.

According to a further embodiment of the present disclosure, each of the individual capture vacuum pumps comprising two or more sides with surfaces having a view of each other and an open side, wherein each of the individual capture vacuum pumps having a sticking factor greater than a sticking factor of a flat plate defining an area equivalent to the open side of each of the individual capture vacuum pumps.

According to a further embodiment of the present disclosure, at least one of the two or more sides of each of the individual capture vacuum pumps comprising a second array of individual capture vacuum pumps.

According to a further embodiment of the present disclosure, each of the individual capture vacuum pumps of the second array comprising two or more sides with surfaces having a view of each other and an open side, wherein each of the individual capture vacuum pumps of the second array having a sticking factor greater than a sticking factor of a flat plate defining an area equivalent to the open side of each of the individual capture vacuum pumps of the second array.

According to a further embodiment of the present disclosure, the first and second capture vacuum pumps having a sticking factor that is N times greater than a sticking factor of a flat plate defining an area equivalent to the open side of the first and second capture pumps, wherein N is $4<N<16$.

According to a further embodiment of the present disclosure, the surfaces of the flat plate and the first and second vacuum pumps includes a film of titanium deposited thereon.

According to a further embodiment of the present disclosure, a system for generating and maintaining a magnetic field with a field reversed configuration (FRC) comprising a confinement chamber, first and second diametrically opposed FRC formation sections coupled to the confinement chamber and including first and second capture vacuum pumps positioned within the first and second divertors and comprising two or more sides with surfaces having a view of each other and an open side, wherein the first and second capture vacuum pumps having a sticking factor more than four (4) times greater than a sticking factor of a flat plate defining an area equivalent to the open side of the first and second capture pumps, one or more of a plurality of plasma guns, one or more biasing electrodes and first and second mirror plugs, wherein the plurality of plasma guns includes first and second axial plasma guns operably coupled to the first and second divertors, the first and second formation sections and the confinement chamber, wherein the one or more biasing electrodes being positioned within one or more of the confinement chamber, the first and second formation sections, and the first and second outer divertors, and wherein the first and second mirror plugs being position between the first and second formation sections and the first and second divertors, a gettering system coupled to the confinement chamber and the first and second divertors, a plurality of neutral atom beam injectors coupled to the confinement chamber and angled toward a mid-plane of the confinement chamber.

According to a further embodiment of the present disclosure, the system is configured to generate an FRC and maintain the FRC without decay while the neutral beams are injected into the.

According to a further embodiment of the present disclosure, the first and second divertors comprise first and second inner divertors interposing the first and second formation sections and the confinement chamber, and further comprising first and second outer divertors coupled to the first and second formation sections, wherein the first and second formation sections interposing the first and second inner divertors and the first and second outer divertors.

According to a further embodiment of the present disclosure, the system further comprising first and second axial plasma guns operably coupled to the first and second inner and outer divertors, the first and second formation sections and the confinement chamber.

According to a further embodiment of the present disclosure, the system further comprising two or more saddle coils coupled to the confinement chamber.

According to a further embodiment of the present disclosure, the formation section comprises modularized formation systems for generating an FRC and translating it toward a midplane of the confinement chamber.

According to a further embodiment of the present disclosure, the biasing electrodes includes one or more of one or more point electrodes positioned within the containment chamber to contact open field lines, a set of annular electrodes between the confinement chamber and the first and second formation sections to charge far-edge flux layers in an azimuthally symmetric fashion, a plurality of concentric stacked electrodes positioned in the first and second divertors to charge multiple concentric flux layers, and anodes of the plasma guns to intercept open flux.

According to a further embodiment of the present disclosure, the system further comprising first and second compact toroid (CT) injectors coupled to the confinement chamber at an angle towards the mid-plane of the confinement chamber, wherein the first and second CT injectors are diametrically opposed on opposing sides of the mid-plane of the confinement chamber.

The example embodiments provided herein, however, are merely intended as illustrative examples and not to be limiting in any way.

All features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. Express recitation of every possible combination and substitution is overly burdensome, especially given that the permissibility of each and every such combination and substitution will be readily recognized by those of ordinary skill in the art upon reading this description.

In many instances, entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A method for generating and maintaining a magnetic field with a field reversed configuration (FRC) comprising the steps of:
    forming an FRC about a plasma in a confinement chamber to form an FRC plasma,
    injecting a plurality of neutral beams into the FRC plasma at an angle toward the mid-plane of the confinement chamber, and
    pumping neutralized gas molecules accumulating in first and second diametrically opposed divertors coupled to the confinement chamber with first and second capture vacuum pumps positioned in the first and second divertors and comprising an open sided chamber including an end plate having a surface, two or more side plates with surfaces facing each other and an open side, the two or more side plates being coupled to the end plate at a first end of the two or more side plates and extending to an opening defined by a second end of the two or more side plates, wherein the opening defining an area equivalent to the surface of the end plate, wherein the first and second capture vacuum pumps having a sticking factor more than four (4) times greater than a sticking factor of a flat plate defining an area equivalent to the opening of the first and second capture pumps, wherein at least one of the two or more sides of the first and second capture vacuum pumps comprising an array of individual capture vacuum pumps, wherein each of the individual capture vacuum pumps comprising an end plate having a surface and two or more side plates with surfaces facing each other and coupled to the end plate at a first end of the two or more side plates and extending to an opening defined by a second end of the two or more side plates, wherein the opening defining an area equivalent to the surface of the end plate, wherein each of the individual capture vacuum pumps having a sticking factor greater than a sticking factor of a surface of a flat plate defining an area equivalent to the opening of each of the individual capture vacuum pumps.

2. The method of claim 1, wherein at least one of the two or more side plates of each of the individual capture vacuum pumps comprising a second array of individual capture vacuum pumps.

3. The method of claim 2, wherein each of the individual capture vacuum pumps of the second array comprising an end plate having a surface and two or more side plates with surfaces facing each other and coupled to the end plate at a first end of the two or more side plates and extending to an opening defined by a second end of the two or more side plates, wherein the opening defining an area equivalent to the surface of the end plate, wherein each of the individual capture vacuum pumps of the second array having a sticking factor greater than a sticking factor of a surface of a flat plate defining an area equivalent to the opening of each of the individual capture vacuum pumps of the second array.

4. The method of claim 1, wherein the first and second capture vacuum pumps having a sticking factor that is N times greater than a sticking factor of a surface of a flat plate defining an area equivalent to the open side of the first and second capture pumps, wherein N is 4<N<16.

5. The method of claim 4, wherein the surfaces of the flat plate and the first and second vacuum pumps includes a film of titanium deposited thereon.

6. The method of claim 4, further includes maintaining the FRC plasma at or about a constant value without decay by injecting beams of fast neutral atoms from neutral beam injectors into the FRC plasma at an angle towards the mid through plane of the confinement chamber.

7. The method of claim 6, further comprising the step of generating a magnetic field within the confinement chamber with quasi dc coils extending about the confinement chamber and a mirror magnetic field within opposing ends of the confinement chamber with quasi dc mirror coils extending about the opposing ends of the confinement chamber.

8. The method of claim 7, wherein the step of the forming the FRC plasma includes forming a formation FRC plasma in opposing first and second formation sections coupled to the confinement chamber and accelerating the formation FRC plasma from the first and second formation sections towards the mid through plane of the confinement chamber where the two formation FRC plasmas merge to form the FRC plasma.

9. The method of claim 1, wherein the surfaces of the flat plate and the first and second vacuum pumps includes a film of titanium deposited thereon.

10. The method of claim 9, further includes maintaining the FRC plasma at or about a constant value without decay by injecting beams of fast neutral atoms from neutral beam injectors into the FRC plasma at an angle towards the mid through plane of the confinement chamber.

11. The method of claim 1, further includes maintaining the FRC plasma at or about a constant value without decay by injecting beams of fast neutral atoms from neutral beam injectors into the FRC plasma at an angle towards the mid through plane of the confinement chamber.

12. The method of claim 11, further comprising the step of generating a magnetic field within the confinement chamber with quasi dc coils extending about the confinement chamber and a mirror magnetic field within opposing ends of the confinement chamber with quasi dc mirror coils extending about the opposing ends of the confinement chamber.

13. The method of claim 12, wherein the step of the forming the FRC plasma includes forming a formation FRC plasma in opposing first and second formation sections coupled to the confinement chamber and accelerating the formation FRC plasma from the first and second formation sections towards the mid through plane of the confinement chamber where the two formation FRC plasmas merge to form the FRC plasma.

14. The method of claim 13, wherein the step of forming the FRC plasma includes one of forming a formation FRC plasma while accelerating the formation FRC plasma towards the mid through plane of the confinement chamber and forming a formation FRC plasma then accelerating the formation FRC plasma towards the mid through plane of the confinement chamber.

15. The method of claim 13, wherein the step of accelerating the formation FRC plasma from the first and second formation sections towards the mid plane of the confinement chamber includes passing the formation FRC plasma from the first and second formation sections through first and second divertors coupled to opposite ends of the confinement chamber interposing the confinement chamber and a first end of the first and second formation sections.

16. The method of claim 15, wherein the step of passing the formation FRC plasma from the first and second formation sections through first and second divertors includes inactivating the first and second divertors as the formation FRC plasma from the first and second formation sections passes through the first and second inner divertors.

17. The method of claim 15, further comprising the step of guiding magnetic flux surfaces of the FRC plasma into the first and second divertors.

18. The method of claim 17, further comprising the step of generating a magnetic field within the formation sections and first and second inner divertors with quasi-dc coils extending about the formation sections and divertors.

19. The method of claim 14, further comprising the step of guiding magnetic flux surfaces of the FRC plasma into third and fourth divertors coupled to a second end of the first and second formation sections.

20. The method of claim 19, further comprising the step of generating a magnetic field within the formation sections and the first and second outer third and fourth divertors with quasi-dc coils extending about the formation sections and divertors.

\* \* \* \* \*